(12) United States Patent
Burgueno et al.

(10) Patent No.: US 7,232,605 B2
(45) Date of Patent: Jun. 19, 2007

(54) HYBRID NATURAL-FIBER COMPOSITES WITH CELLULAR SKELETAL STRUCTURES

(75) Inventors: Rigoberto Burgueno, Okemos, MI (US); Amar K. Mohanty, Okemos, MI (US); Mario John Quagliata, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 313 days.

(21) Appl. No.: 10/892,859

(22) Filed: Jul. 16, 2004

(65) Prior Publication Data

US 2005/0013982 A1 Jan. 20, 2005

Related U.S. Application Data

(60) Provisional application No. 60/487,971, filed on Jul. 17, 2003.

(51) Int. Cl.
- *B32B 13/02* (2006.01)
- *E04C 2/34* (2006.01)
- *D04H 1/00* (2006.01)

(52) U.S. Cl. .......... 428/294.7; 52/793.1; 52/576; 52/577; 52/793.11; 428/292.1

(58) Field of Classification Search .......... 428/117, 428/292.1, 294.4, 297.7; 52/576, 577, 793.1, 52/793.11
See application file for complete search history.

(56) References Cited

U.S. PATENT DOCUMENTS

| | | | | |
|---|---|---|---|---|
| 3,015,873 A | * | 1/1962 | Dietzsch et al. | 428/373 |
| 4,330,494 A | * | 5/1982 | Iwata et al. | 264/46.2 |
| 5,202,295 A | * | 4/1993 | McCauley | 502/65 |
| 5,309,690 A | * | 5/1994 | Symons | 52/309.9 |
| 5,508,085 A | * | 4/1996 | Lockshaw et al. | 428/178 |
| 5,527,584 A | * | 6/1996 | Darfler et al. | 428/116 |
| 5,679,433 A | * | 10/1997 | Hayashi et al. | 428/116 |
| 5,718,096 A | * | 2/1998 | Nowara | 52/794.1 |
| 6,399,690 B2 | * | 6/2002 | Lan et al. | 524/445 |
| 6,673,415 B1 | * | 1/2004 | Yamazaki et al. | 428/117 |
| 6,737,472 B2 | * | 5/2004 | Zhou et al. | 524/789 |
| 6,767,619 B2 | * | 7/2004 | Owens | 428/304.4 |
| 6,841,607 B2 | * | 1/2005 | Twardowska-Baxter et al. | 524/445 |
| 6,974,848 B2 | * | 12/2005 | Twardowska et al. | 524/81 |

* cited by examiner

*Primary Examiner*—N. Edwards
(74) *Attorney, Agent, or Firm*—Ian C. McLeod; Steven E. Merritt

(57) ABSTRACT

The present invention relates to composite structural members comprising polymers, natural and synthetic fibers, and nano-scale platelets arranged in two- or three-dimensional cellular skeletal structure; more particularly referring to a low-cost natural-fiber based structural member with material hybridization and material layout for improved behavior that leads to efficient structural beam and plate/panel components that can be used in a plurality of modular structures, resulting in lower cost and reduced environmental impact.

20 Claims, 65 Drawing Sheets

*Periodic cellular beam and plate*

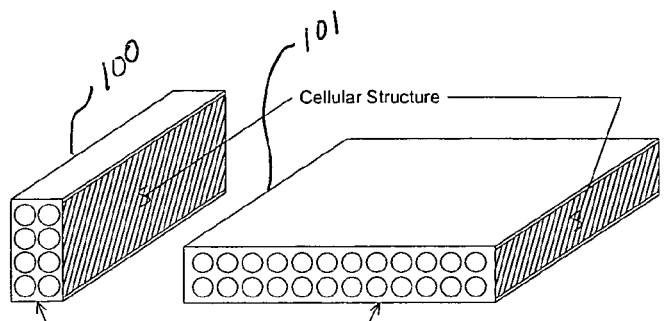
Fig. 4A - Periodic cellular beam and plate
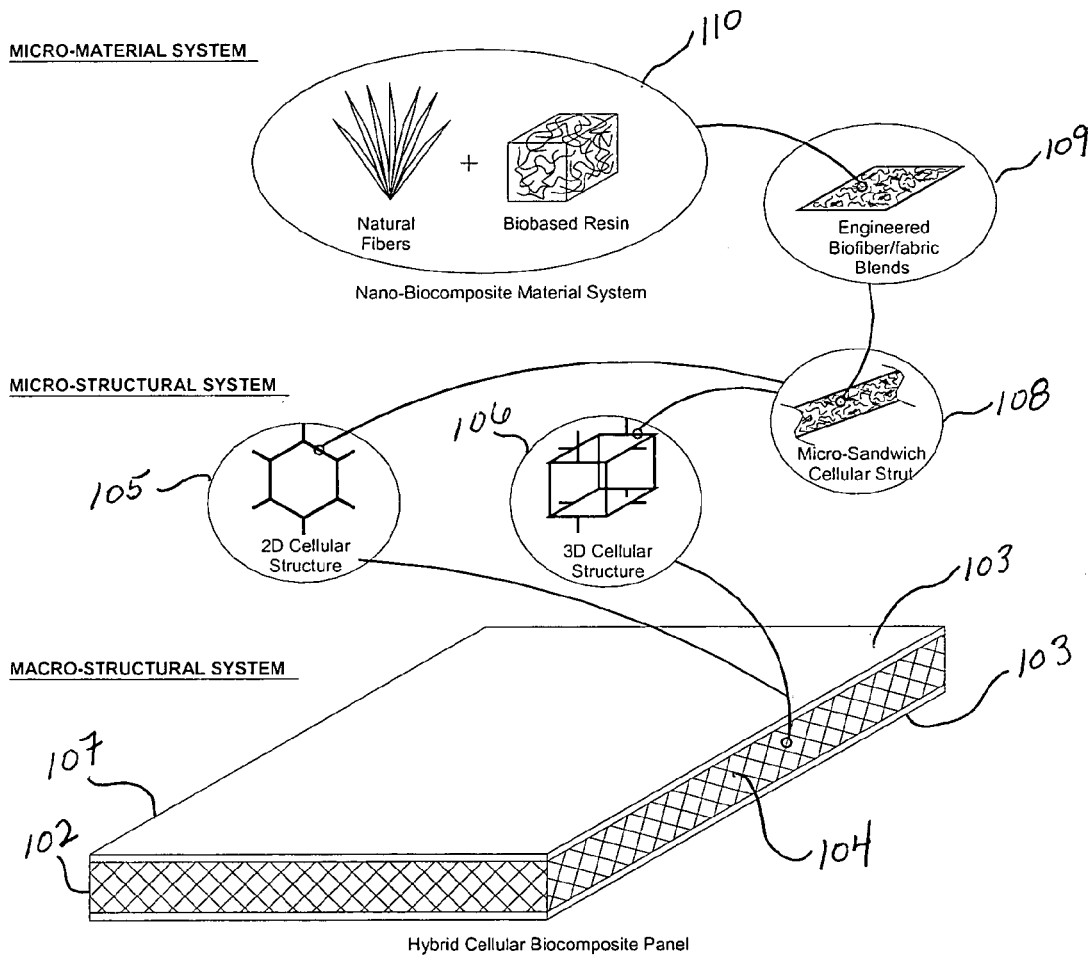
Fig. 4C - Schematic of hybrid cellular biocomposite panel

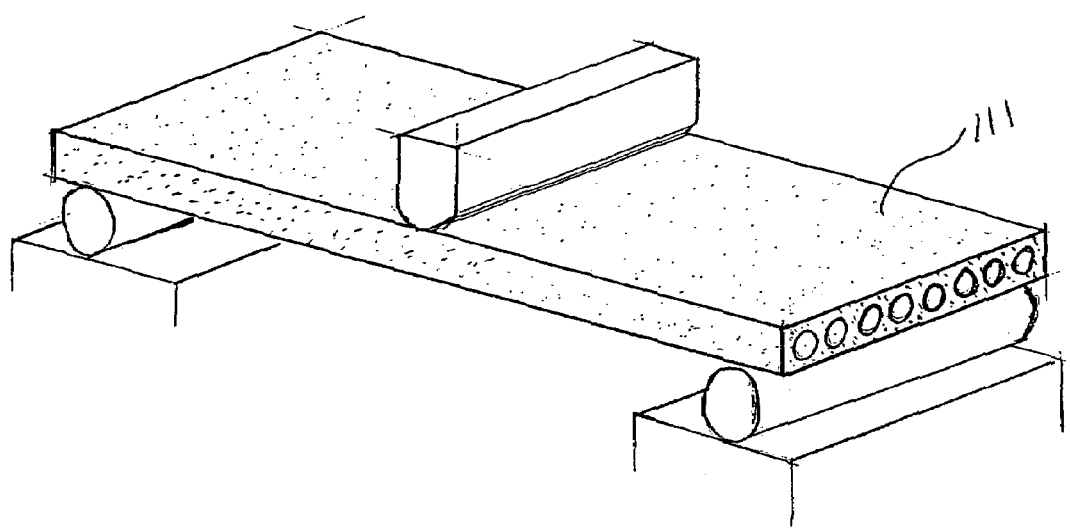
FIG. 4B – Cellular Biocomposite Panel

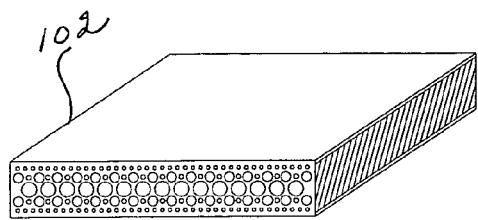
Fig. 4D - Hierarchical sandwich plate
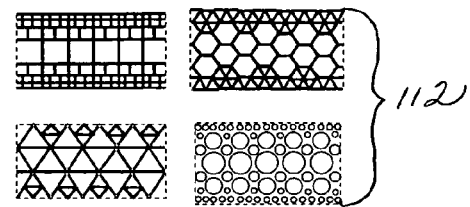
Fig. 4E - Potential hierarchical designs

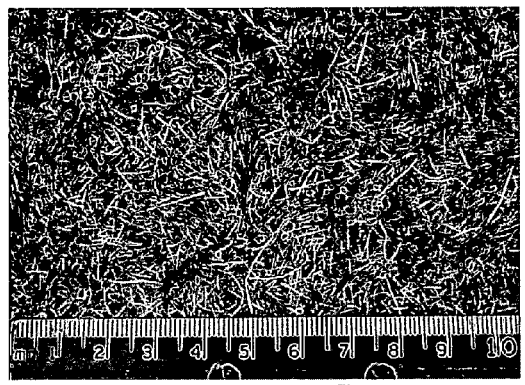 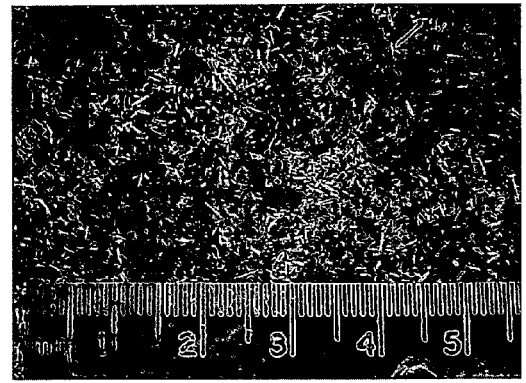
Fig 6A Green hemp fibers   Fig 6B Chopped flax, 50% fibers, 50% core

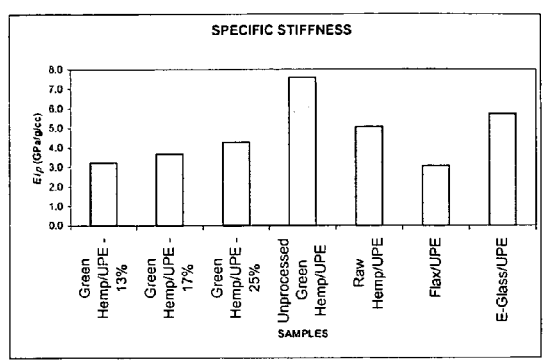 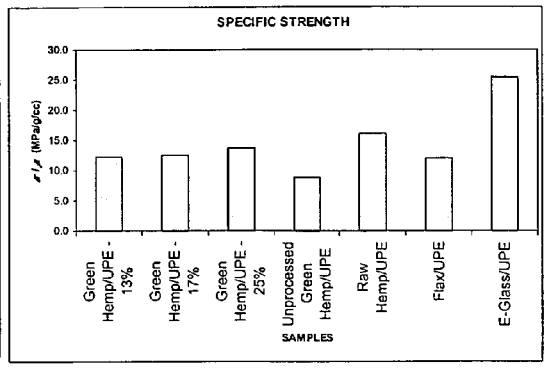
Fig 11A Specific stiffness  Fig 11B Specific strength

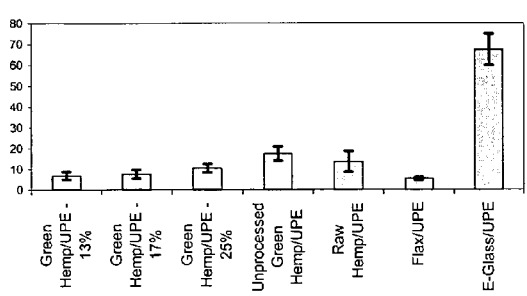
Fig 12A Notched Izod impact test results
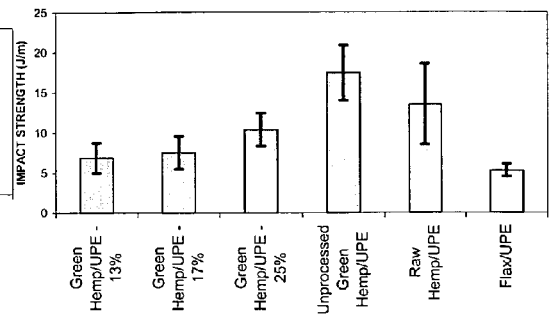
Fig 12B Impact test results for biocomposite materials only

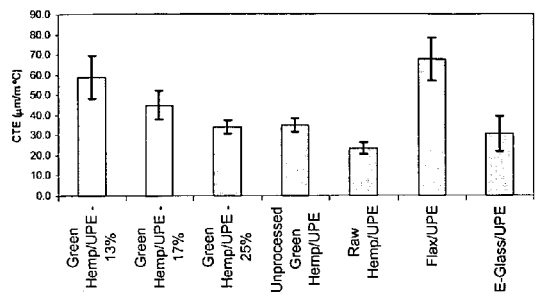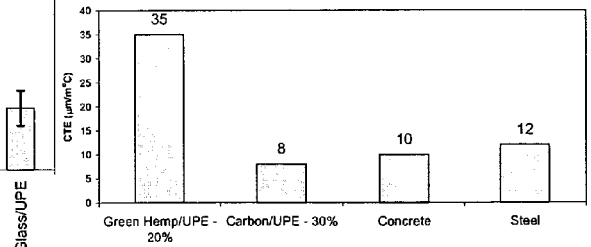
Fig 13A CTE test results    Fig 13B Comparison of CTE with conventional materials

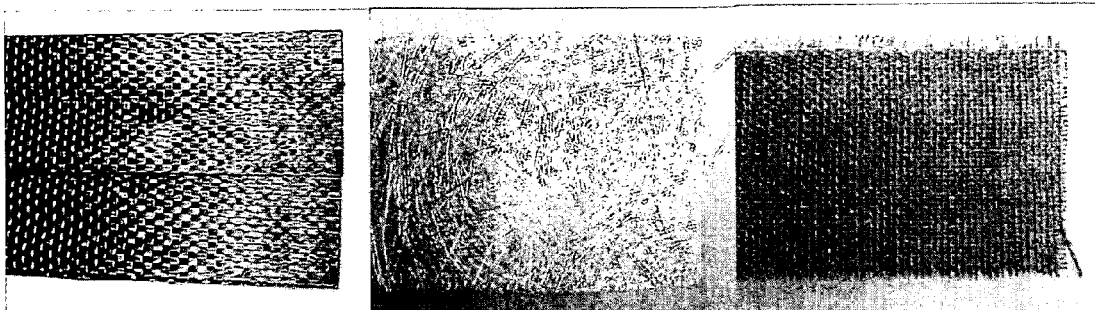
Fig 15A Unidirectional carbon fabric    Fig 15B Randomly oriented glass mat    Fig 15C Woven jute mat

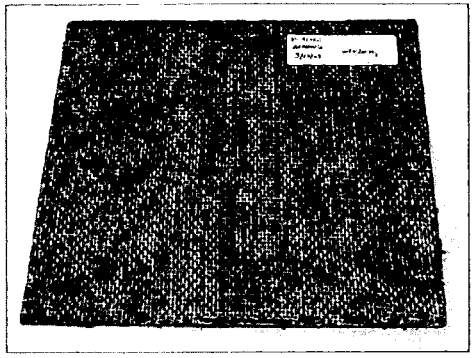 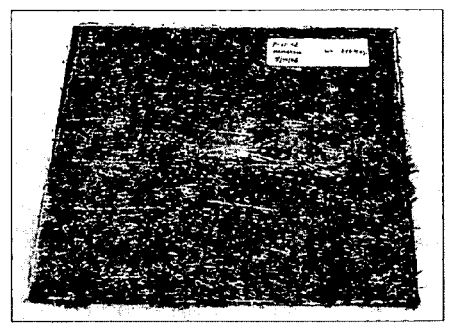
Fig 16A Raw hemp core with jute weave fabric face sheets
Fig 16B Raw hemp core with glass strand mat face sheets

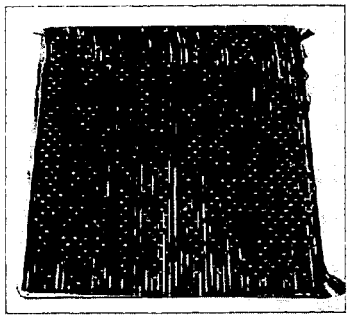 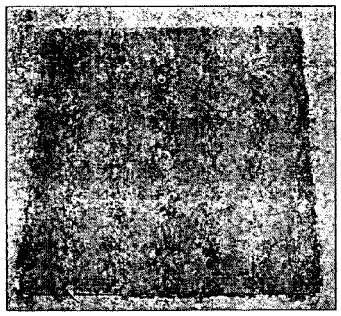 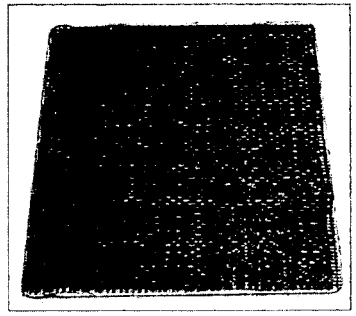
Fig 18A Unidirectional Carbon    Fig 18B Randomly orientated glass    Fig 18C Woven Jute

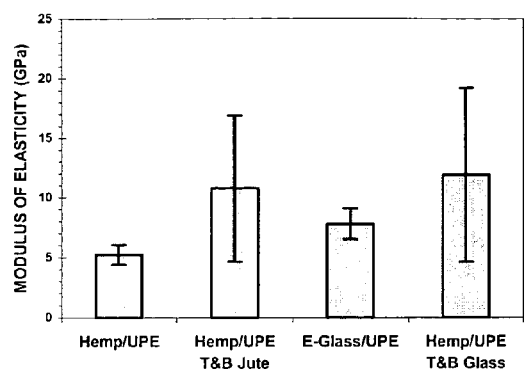 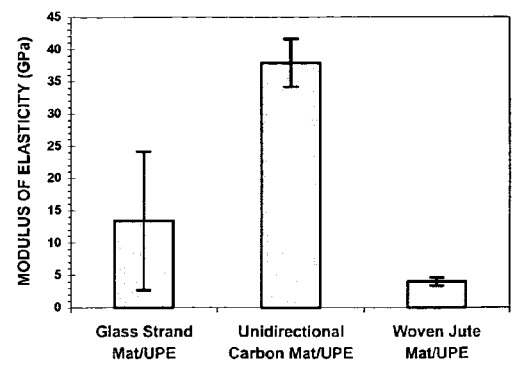
Fig 19A MOE of solid materials and hybrid materials    Fig 19B MOE of face sheet materials

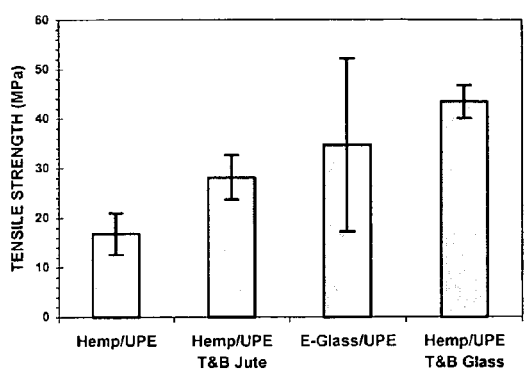
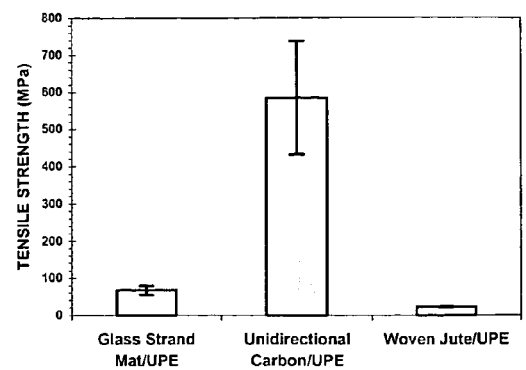
Fig 20A UTS of solid materials and hybrid materials
Fig 20B UTS of face sheet materials

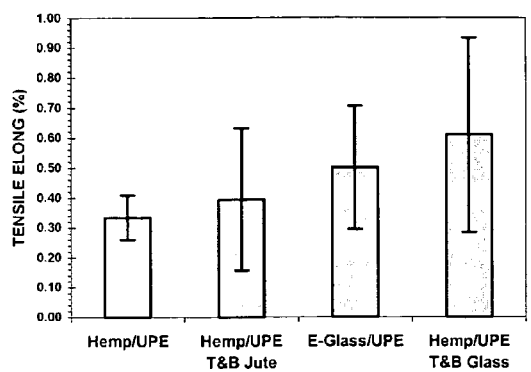 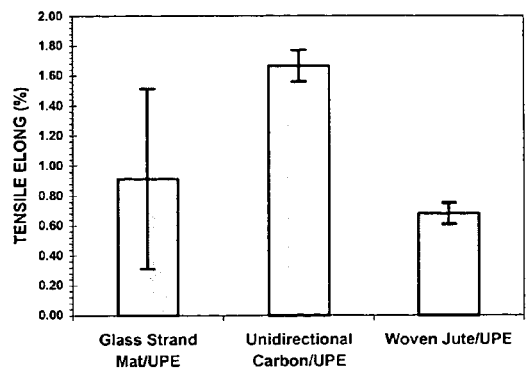
Fig 21A TEB for solid and hybrid materials
Fig 21B TEB for face sheet materials

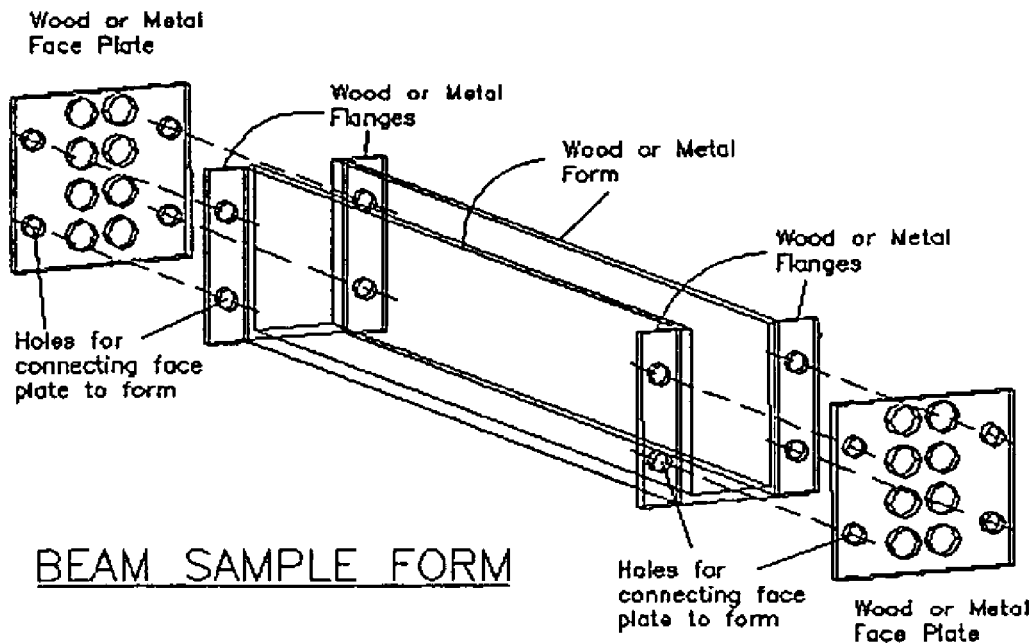
Fig 26A Cellular beam manufacturing mold
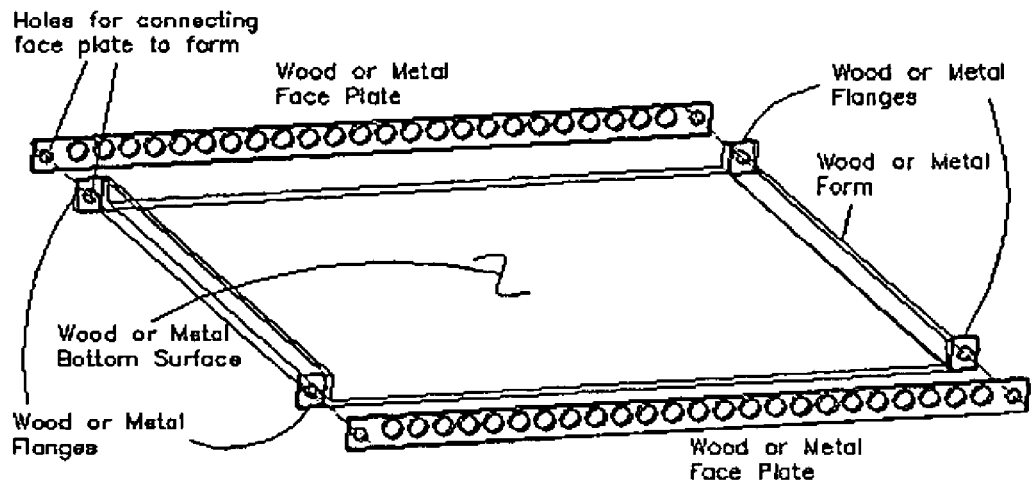
Fig 26C Cellular plate manufacturing mold

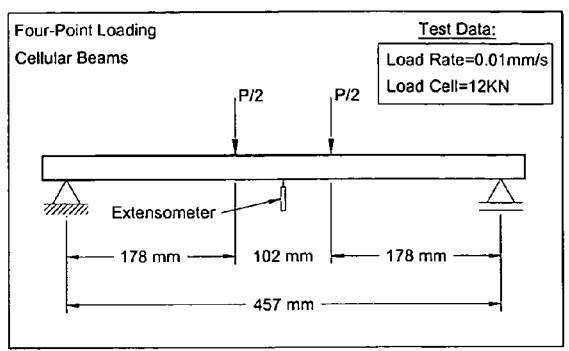
Fig 28A Four-point bending
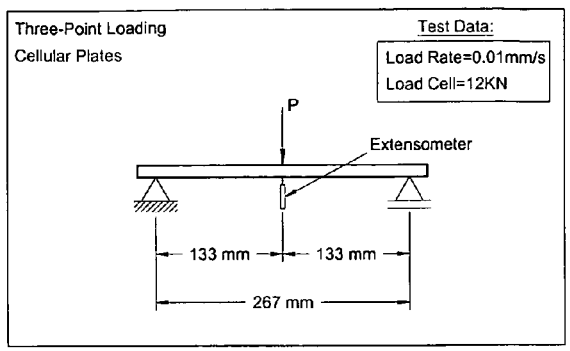
Fig 28B Three-point bending

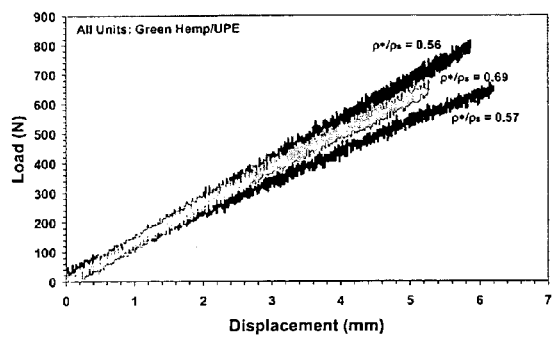
Fig 29A Cellular biocomposite beams
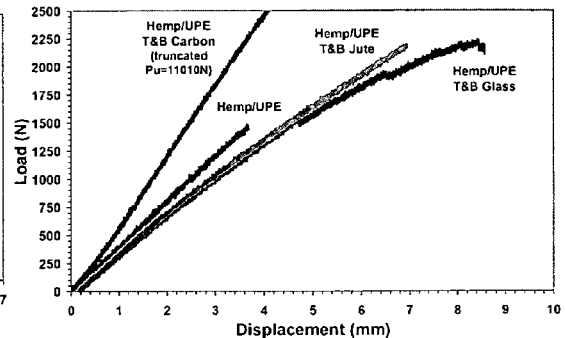
Fig 29B Cellular biocomposite plates

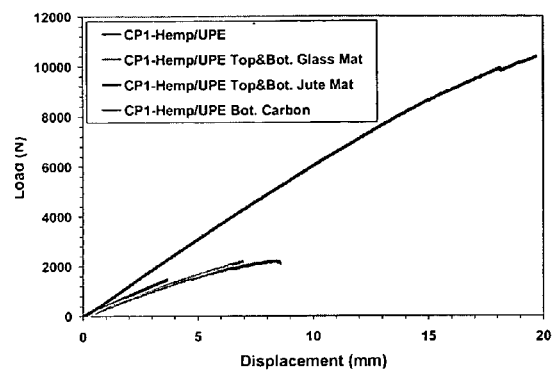
Fig 30A Hybrid cellular biocomposite panels
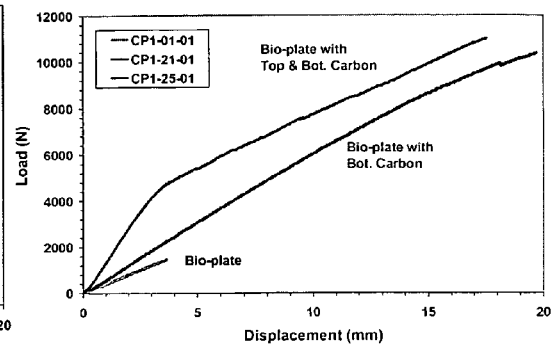
Fig 30B Comparison of carbon hybrid biocomposite panels

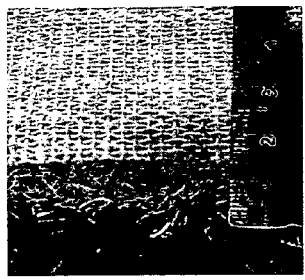 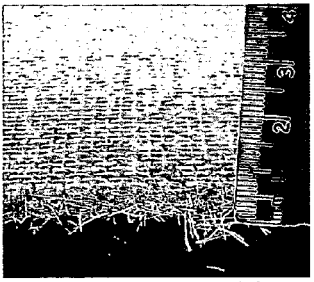 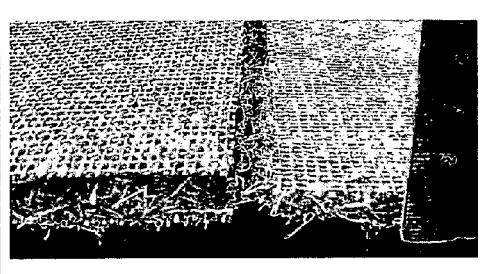
Fig 32A Uncompressed dry preform
Fig 32B Compressed dry preform (80 psi at 100 °C for 5 minutes)
Fig 32C Thickness comparison of dry hybrid preforms

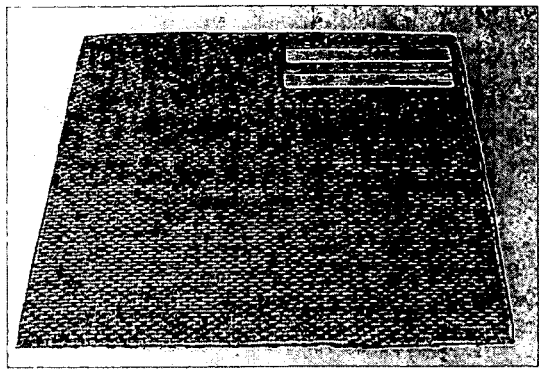 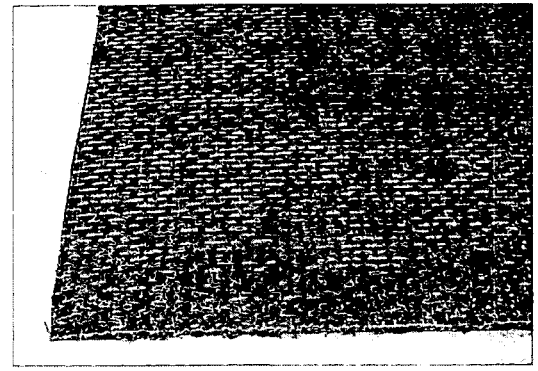
Fig 35A Bio-fabric sample    Fig 35B Wet-out of the top surface Fig. 36A Multi-fabric layout
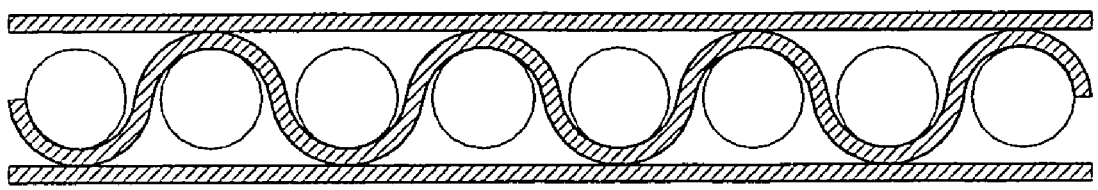
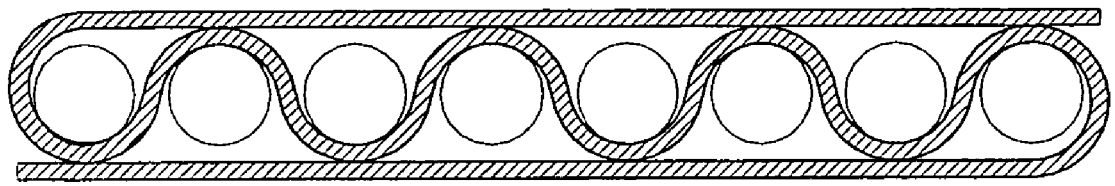
Fig 36B Wrapped fabric layout

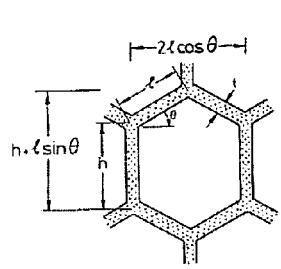 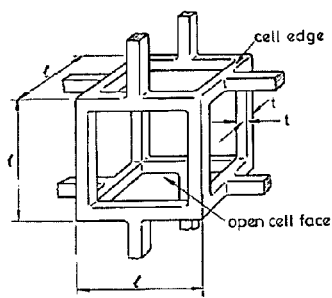 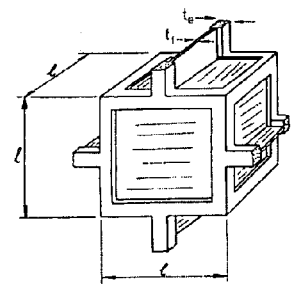
Fig 48A Hexagonal model for honeycomb    Fig 48B Cubic model for open cell foam    Fig 48C Cubic model for closed cell foam

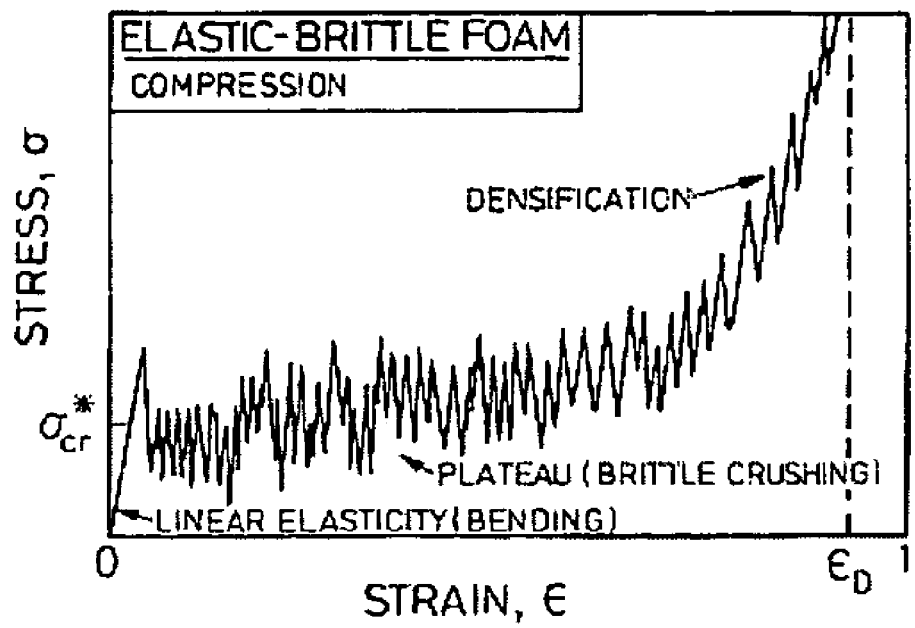
Fig 49A Compressive stress-strain response
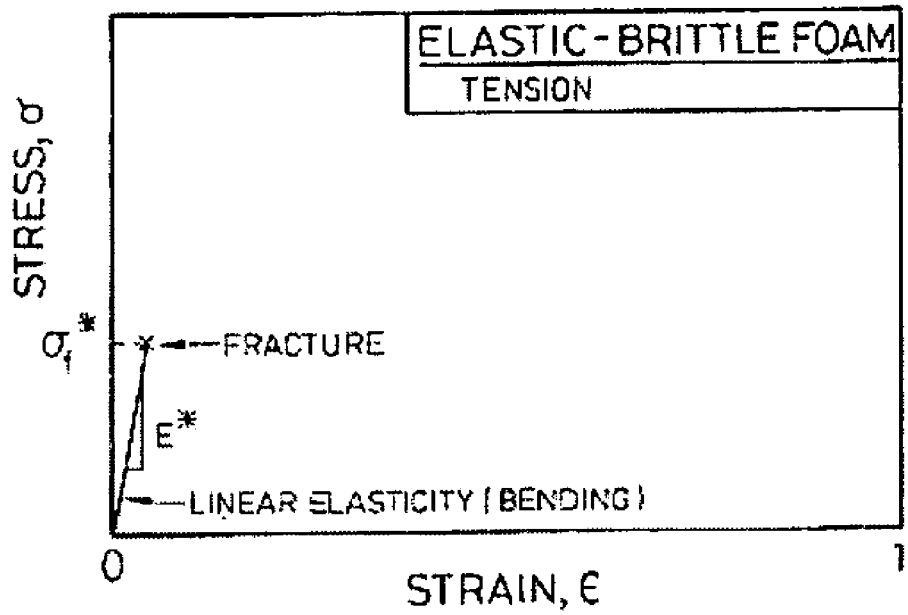
Fig 49B Tensile stress-strain response

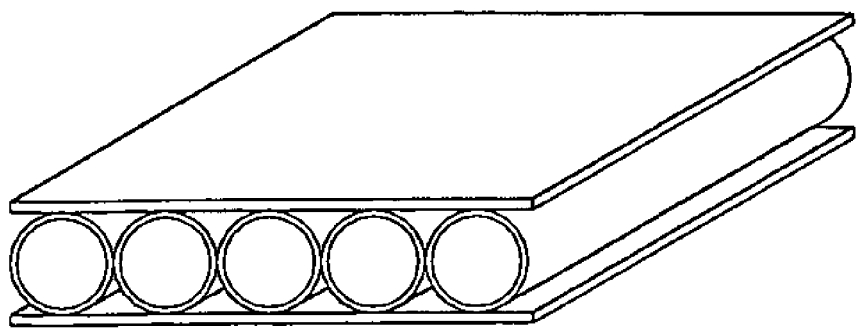
Fig 50A Tubular core
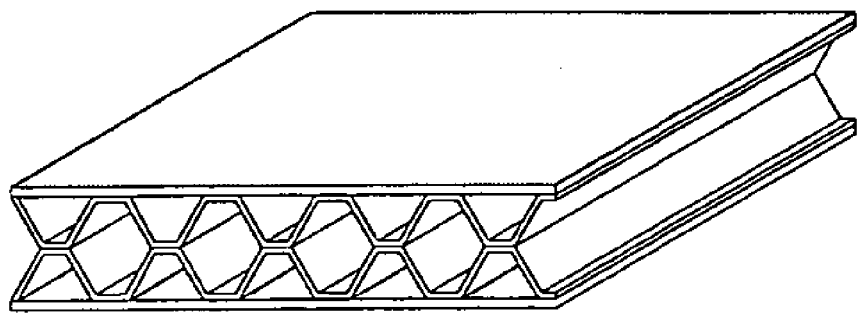
Fig 50B Double truss core

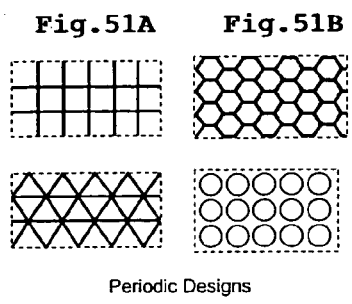
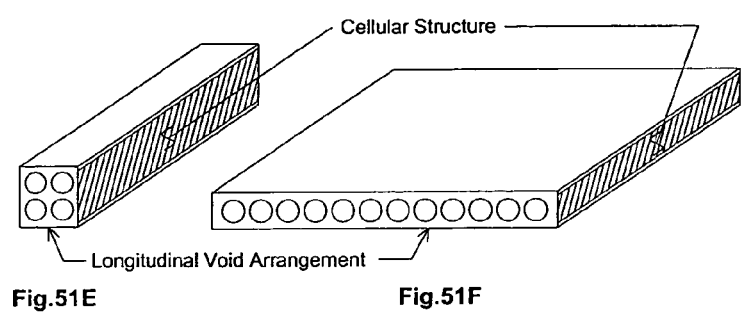
Fig. 51A  Fig. 51B
Periodic Designs
Fig. 51C  Fig. 51D  Fig. 51E  Fig. 51F
Cellular Structure
Longitudinal Void Arrangement Fig. 53A
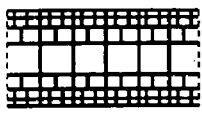
Fig. 53B
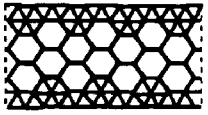
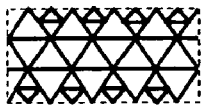
Fig 53C
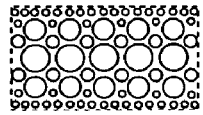
Fig 53D
Hierarchical designs
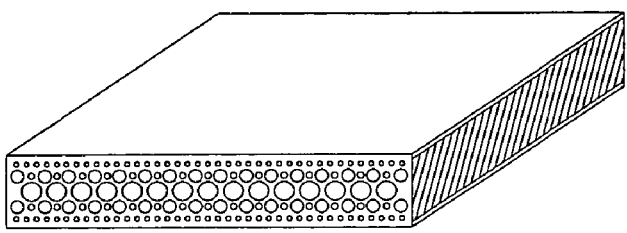
Fig 53E Hierarchical cellular sandwich panel $$[A,B,D] \propto \int_{-h/2}^{h/2} [\overline{Q}^*] dz$$
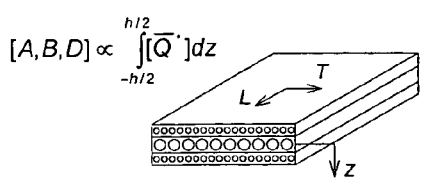
Lamination Theory
2D Hierarchical Panel  or  3D Hierarchical Panel
$$[A,B,D] \propto \int_{-h/2}^{h/2} [\overline{Q}^*] dz$$
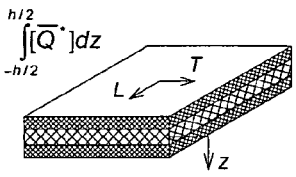
Fig. 55A
Fig. 55B

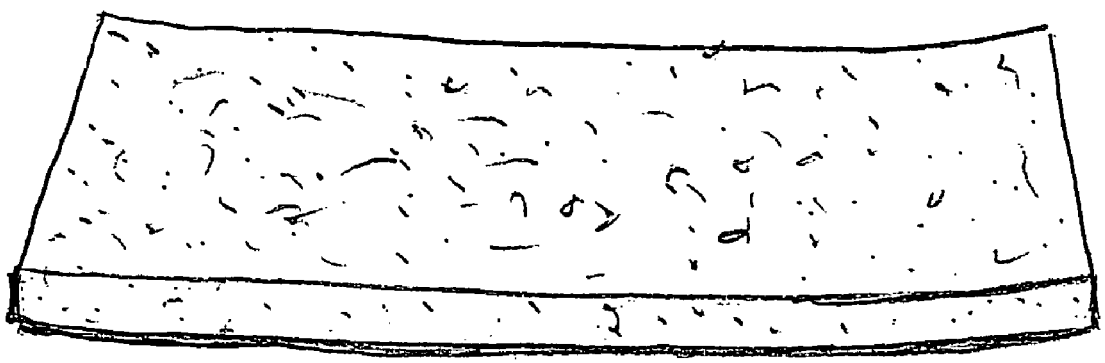
Fig.56A - Top Side
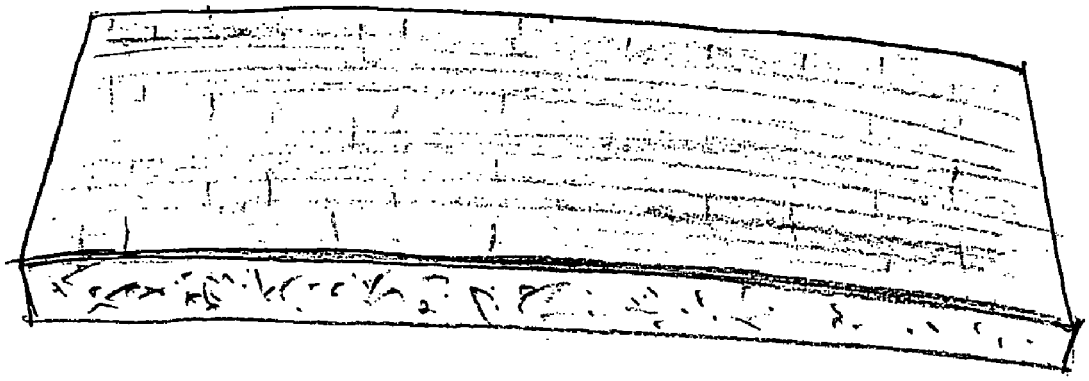
Fig.56B - Bottom Side

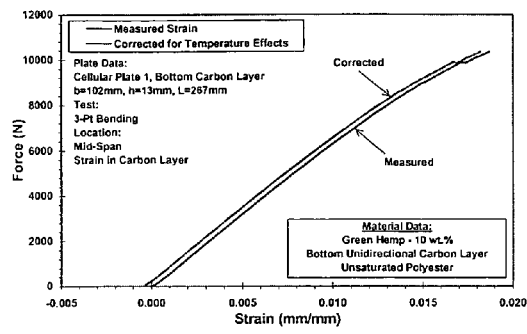 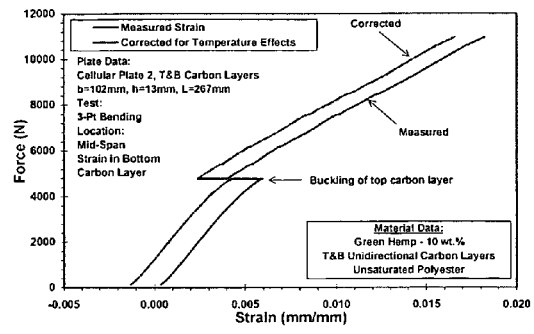
Fig 59A Cellular Biocomposite Plate CP1-C  Fig 59B Hybrid Cellular Biocomposite Plate CP1-C

HYBRID NATURAL-FIBER COMPOSITES WITH CELLULAR SKELETAL STRUCTURES

CROSS-REFERENCE TO RELATED APPLICATIONS

This application claims the benefit of U.S. Provisional Application Ser. No. 60/487,971, filed Jul. 17, 2003.

STATEMENT REGARDING FEDERALLY SPONSORED RESEARCH OR DEVELOPMENT

Not Applicable

BACKGROUND OF THE INVENTION (1) Field of the Invention

The present invention relates to composite structural members comprising polymers, natural and synthetic fibers, and preferably nano-scale platelets, arranged in two- or three-dimensional cellular skeletal structure; more particularly referring to a low-cost natural-fiber based structural member with material hybridization and material layout for improved behavior that leads to efficient structural beam and plate/panel components that can be used in a plurality of modular structures, resulting in lower cost and reduced environmental impact.

(2) Background of the Invention

Fiber reinforced polymer (FRP) composites have surpassed their initial target applications in the aerospace industry to become a viable material alternative in the sporting goods, automotive, and construction industries. High performance FRP composites made with synthetic fibers such as carbon, glass or aramid embedded in polymeric matrices provide the advantages of high stiffness and strength to weight ratio and increased chemical inertness compared to conventional construction materials, i.e., wood, clay, concrete and steel. In spite of these advantages, the widespread use of synthetic FRP composites has been limited, among several factors, due to their higher initial material costs, their use in non-efficient structural forms and their environmental impact.

Increased environmental awareness and the interest in long-term sustainability of construction materials have thus challenged the development of environmentally friendlier alternatives to synthetic oil-based FRP composites (Mohanty et al. *Macromol Mater Eng*, Vol. 276/277, 1-24 (2000)). Natural-fiber-reinforced polymer composites, or biocomposites, have emerged in the past decade as an environmentally friendly and cost-effective option to synthetic FRP composites. Despite the interest and environmental appeal of biocomposites, their use has been limited to non-primary, or non-load-bearing applications due to their lower strength and stiffness compared with synthetic FRP composites (Biswas et al., "Development of Natural Fibre Composites in India", Proceedings of the Composites Fabricators Association's Composites, Tampa, Fla. (2001)). Recent developments, however, have shown that the properties of "engineered" biocomposites (Mohanty et al., "Surface modifications of Natural Fibers and performance of the Resulting Biocomposites: An Overview," Composite Interfaces, 8, 313-343 (2001); and Mishra et al., Mishra, S., et al., Composite Science and Technology 63 1377-1385 (2003)) are a technical, economical, and environmentally conscious alternative to E-glass fiber reinforced composites (the most common synthetic fiber composite) without sacrificing performance.

While biocomposite materials with specific properties equivalent to entry-level structural materials are feasible, this performance level is still not enough to make them able to compete with existing construction materials. However, the structural performance of a component depends on both its material and structural properties. The lower material stiffness of biocomposites can thus be overcome by using efficient structural configurations that place the material in specific locations for highest structural efficiency. Cellular and sandwich structures are structural configurations that yield high structural performance for minimum material use and thus minimum weight (Gibson, et al., Cellular Solids: Structure and Properties. Pergamon Press, Oxford (1988)). This concept has been recognized for some time and has recently gained new attention due to the way that natures own materials and structures follow these principles.

Natural fibers embedded in a natural or synthetic polymeric matrix, known as biocomposites, have gained recent interest because of their low material and manufacturing costs, light weight, high specific modulus (elastic modulus over density), and environmentally friendly appeal (Mohanty et al., *Macromol Mater Eng*, Vol. 276/277, 1-24 (2000)). Natural fibers are categorized depending on their source as either leaf or bast fibers. Bast fibers have the highest mechanical properties and thus are ones typically considered for structural applications. The most common bast fibers are flax, hemp, jute, and kenaf. Typical mechanical properties of these fibers together with E-glass fibers are given in Table 1. All natural fibers are lingo-cellulosic in nature with the basic components being cellulose and lignin. The density of natural fibers is about half that of E-glass (Table 1), which makes their specific strength quite comparable, while the elastic modulus and specific modulus is comparable or even superior to E-glass fibers.

TABLE 1

Mechanical Properties for Selected Natural Fibers and E-Glass Fiber

| Fiber Type | Density (g/cm$^3$) | Elastic Modulus (GPa) | Tensile Strength (MPa) | Specific Modulus (GPa/g/cm$^3$) | Specific Strength (MPa/g/cm$^3$) |
|---|---|---|---|---|---|
| E-glass | 2.55 | 73 | 2000–3500 | 29 | 780–1370 |
| Hemp | 1.48 | 70 | 690 | 47 | 466 |
| Flax | 1.4 | 60–80 | 345–1100 | 43–57 | 250–785 |
| Jute | 1.46 | 10–30 | 400–750 | 7–21 | 275–510 |
| Sisal | 1.33 | 38 | 450–640 | 29 | 340–480 |

The applications for which biocomposites have been studied include interior paneling of automobiles (Biswas et al., Proceedings of the International Conference and Exhibition on Reinforced Plastics, Indian Institute of Technology, Madras, 26-36 (2002)) and replacement of wood in housing applications such as plywood, roof surface paneling, partitioning and furniture (Biswas et al. Proceedings of the Composites Fabricators Association's Composites, Tampa, Fla. (2001)). The current market uses of natural fiber composites in North America are shown in FIG. 1 (Mohanty et al., *Macromol Mater Eng*, Vol. 276/277, 1-24 (2000)). However, the uses in these markets have been limited to non-structural applications where weight and cost can be reduced (Biswas et al., Proceedings of the Composites Fabricators Association's Composites, Tampa, Fla. (2001)).

Consideration of biocomposites for load-bearing, or structural applications has been neglected due to their low stiffness and strength in comparison with conventional construction materials, and only limited research and development projects have considered potential structural uses (Scott, C. T., et al., *Wood and Fiber Science,* 27(4): 402-412, (October 1995); and Shenton III, H. W., et al., "Manufacture of Fiber-Reinforced-Foam Composite Sandwich Structures", Proceedings of the International Conference on Advances in Building Technology, Hong Kong, China (December 2002)). However, recent research on biocomposites has shown that "engineered," or treated, natural fibers can lead to biocomposites with properties that can compete with glass fiber composites (see FIG. 2). This has motivated further research initiatives that consider biocomposites as a technical and environmentally conscious alternative to E-glass reinforced fiber composite (the most common synthetic fiber composite) without sacrificing performance. Natural fiber unsaturated polyester composites show lower density, equal flexural modulus, comparable flexural strength but relatively poor impact strength as compared to a glass fiber composite as shown in FIG. 2 (Mishra et al., *Polymer Composites,* 23, 164-170 (2002), Mohanty et al., *Journal of Polymers and the Environment,* Vol. 10, Nos. 1/2, (April 2002)).

Increased environmental awareness and interest in long-term sustainability of material resources has motivated considerable advancements in composite materials made from natural fibers and resins. Natural and wood fiber plastic composites are among the most rapidly growing markets within the plastics industry. Applications for these composites range from building products, automotive, and consumer/industrial applications. However, despite the developments on biocomposites technology and the many applications thus far, their lower stiffness and strength properties have limited their applications to non-load-bearing components. Technical developments on natural fiber-reinforced composites, or biocomposites, have shown that they are a technical, economical, and environmentally conscious alternative to E-glass fiber reinforced composites (the most common synthetic fiber composite) without sacrificing performance. In spite of these achievements, biocomposites are hindered by the hydrophilic nature of the natural fibers and the heat susceptibility of the polymer matrix. In addition, while the properties of biocomposites can compete with those of E-glass composites, their strength, and particularly stiffness, is smaller than that of conventional structural materials.

Development in biobased polymers in our group has shown that blending of functionalized soybean oil with petro-based resins can increase the toughness of a petroleum-based thermoset resin without compromising stiffness and improving its environmental friendliness (Belcher, L., Polymeric Materials Science and Engineering, American Chemical Society, 87, 256-257 (2002)). Emerging research on layered silicate polymer composites, consisting of nano-clay sheets within a polymer, have shown that a small amount (~1-2%) of nano-scale layered silicate particles can significantly enhance and stabilize the mechanical and thermal properties of the base polymer and improve its fire retardancy (Garcés, J. M., et al., *Advanced Materials,* Vol. 12, no. 23, pp. 1835-1839 (2000); and Vaia, R., "Polymer Nanocomposites open a New dimension for Plastics and Composites," The AMTIAC Newsletter, Vol. 6, No. 1) without sacrificing viscosity. The true value of layered silicate composites is not solely the enhancement of the neat resin but rather the value-added properties it provides to the fiber-reinforced composite. Thus, natural fibers must remain as the predominant reinforcement for providing stiffness and strength. Finally, scrutiny of nature's materials shows that high structural efficiency can be achieved by optimized hybrid designs that efficiently combine constituents and material arrangement, or shapes, that maximize performance with as little material as possible, i.e., sandwich structures (Gunderson, S. L., et al., "Natural Cellular and Sandwich Structures for Innovative Design Concepts," Proceedings of the ASC 8$^{th}$ Annual Technical Conference, Cleveland, Ohio, 431-440 (19-21 Oct. 1993); and Nogata, F., "Learning About Design Concepts From Natural Functionally Graded Materials," Composites and Functionally Graded Materials, ASME, MD, 80,Dallas, Tex., 11-18 (1997)).

The invention thus focuses on natural-based composites, or biocomposites, that can serve as a sustainable alternative to synthetic load-bearing panels by designing them and manufacturing them in novel sandwich structures obtained from optimized hybrid designs that encompass material constituents, shape and scale effects.

Hybrid biocomposite cellular structures can be used in multi applications (e.g., building walls, floors and roofs, bridge and ship decks, aircraft floors) with tailorable integrated multi-functions (i.e., stiffness, strength, thermal insulation, fire protection, and user friendliness). The sustainability and social acceptance of the proposed components, stemming from its large constituency on rapidly renewable resources, will pioneer the use of agricultural commodities in markets aimed at load-bearing materials and structures.

OBJECTS

It is therefore an object of the present invention to provide novel composites which can be used in load bearing applications, particularly as a replacement for lumber. Further, it is an object of the present invention to provide methods for the preparation of such composites. Further still, it is an object of the present invention to provide composites which are easily and economically fabricated. These and other objects will become increasingly apparent from the following description and the drawings.

SUMMARY OF THE INVENTION

The present invention relates to a hybrid 107 composite comprising a hierarchical 102 two-dimensional 105 or three-dimensional 106 cellular skeletal structure embedded in a matrix comprising a polymer and optionally the polymer comprising of nano-scale clay platelets/sheets, and comprising a fiber which is primarily (>80%) natural fiber).

The present invention also relates to the composite as a structural member in a sandwich configuration 107 where the core comprises the three-dimensional 106, 108 cellular skeletal structure and a skin on the core comprises a polymer and a natural fiber as a two-dimensional mat 109 and wherein optionally, the polymer is plain or nano-clay reinforced.

The present invention also relates to a composite as a structural member in a sandwich configuration 107 where the core 101 comprises the three-dimensional cellular skeletal structure and a skin 103 on the core comprises a polymer and a synthetic fiber material as a two-dimensional mat 109 and wherein optionally, the polymer is plain or nano-clay reinforced.

The present invention also relates to composite structures which comprise:

(a) an elongate structure comprising at least one continuous 100, 101 channel along a length of the composite perpendicular to a direction of the compression;

(b) a matrix of a polymer, which polymer is optionally mixed with nano-sized clay sheets 110 and with randomly oriented natural and/or synthetic fiber which surrounds and optionally impregnates the elongate structure; and (c) a synthetic or bio-based (30% functionalized soybean/vegetable oil) polymer reinforced with 1-8% nano-sized clay platelets/sheets.

The present invention also relates to composite structures which comprise:

(a) a hierarchy of elongate prismatic (e.g. circular) cells; and (b) a matrix of a polymer and randomly oriented chopped fibers comprising a natural fiber surrounding the prismatic cells.

The present invention also relates to a method for producing a composite which comprises:

(a) providing a hierarchical 102 two- or three-dimensional cellular skeletal structure in a mold;

(b) embedding the cellular skeletal structure with a matrix of a moldable polymer and a fiber which is in its greatest part (>80%) a natural fiber 110;

(c) molding the matrix around the cellular skeletal structure to produce the composite product 111; and (d) preferably molding nano-clay-reinforced 110 polymer matrix together with hybrid natural/synthetic 109 reinforcement to produce the composite product 102, 111.

The term "cellular skeletal structure means that there are openings along at least one dimension of the composite which are optimally arranged in the final composite.

The term "hierarchical" 102, 108, 112 means that the cellular skeletal structure is arranged in an organized manner and with multiple levels of size and structural periodicity within the core of the composite along with a polymer and fiber matrix.

New environmental regulations, societal concerns, and growing environmental awareness have motivated a search for new products and processes that are compatible with the environment. While industry has soundly succeeded in creating innovative products, lesser attention has been paid to their environmental consequences. The move towards a sustainable society is thus critical for our prosperity and survival.

The invention thus focuses on developing the scientific and engineering basis for the value-added use of agricultural resources by enhancing the properties of biocomposites through optimized hybrid designs for multifunctional structural sandwich panels. The approach innovatively combines a holistic view of hybridization by considering the combination of different monolithic materials for composite hybrids, optimized material arrangements for shape hybrids, and scale-dependent mechanical properties for sub-micron hybrids.

Natural fibers can equal the performance of E-glass fibers (most commonly used synthetic fiber), at approximately one-third of the cost (Biswas, S., et al., "Development of Natural Fibre Composites in India," Technology Information, Forecasting and Assessment Council: Staff Publications [online] Available: http://www.tifac.org.in/news/cfa/htm(Accessed 19 Sep. 2002); and Mohanty, A. K., et al., *Macromolecular Materials and Engineering*, 276/277, 1-24 (2000)). In addition, while it takes 6,500 BTUs of natural energy to produce one pound of Kenaf (U.S. grown natural fiber), the production of one pound of glass requires four times that amount (23,500 BTUs) (Mohanty, A. K., et al., *Macromolecular Materials and Engineering*, 276/277, 1-24 (2000)). Development of structural materials and components from agricultural commodities, particularly the use of under-utilized co-products and residuals from agricultural operations, implies a progressive move towards a reduction in throughput and energy.

Most natural, plant biofibers are under-utilized as ropes, sacks etc. High-value composite materials from renewable resource-based biofiber and bioplastic can provide an additional revenue stream to the agricultural sector of the economy. The natural fiber composite market in North America is projected to grow 40-50% in 2000 and demand for Eco-friendly materials is progressively increasing. With the development of sustainable new technology such as proposed here, growth of jobs and income can be expected to be enhanced significantly.

Use of 'Green/biobased' polymers and fibers for new alternative 'sustainable" materials will satisfy the requirements of the Biomass Research and Development Act of 2000 (US Public Law 106-224), presidential executive order 13134 (calling for tripling America's use of biobased products by 2010) and the recent "Farm Bill" (encouraging use of biobased materials as a replacement of petroleum-based materials). The use of biobased alternatives provides a route to reduce the US dependence on foreign oil, 80 million tons of which are used per year in the US to produce plastics.

The invention is in alignment with the sustainability goals of the U.S. economy by making feasible the development of non-food high-value products from under-utilized agricultural co-products. The bioboased materials will decrease energy requirements for equal-performance petro-based materials, the layered silicates will decrease the amount of toxic fire retardants commonly used in fiberglass composites, and the use of optimized hybrid designs of sandwich structures will minimize material use while satisfying safety and functionality requirements. The presented invention can pioneer the use of agricultural derivatives for structural consumer products and enable the U.S. to continue its path towards a sustainable materials economy.

Thus a more efficient way of improving the performance of biocomposite components is to use them in high-performance structural forms. Scrutiny into nature's materials shows that high structural efficiency can be achieved by strategic material organization. Optimized hierarchical cellular structure arrangement of the material leads to enhanced and efficient use of the base material and thus sustainable structural components at reduced cost.

The stiffness shortcomings of biocomposites are overcome by efficient structural configurations. Nature has efficient structures—and among the most common are cellular sandwich structures, which consist of a dense skin integrally connected to a low-density cellular core as shown in FIG. 3A (Gibson and Ashby 1988). Cellular materials have the general form of either honeycombs (FIG. 3B) or foams (FIG. 3C). Their cellular structure gives rise to a unique stress-strain response that depends on the solid material composition, the volume fraction of the solid, and the arrangement and geometry of the cells (Gibson and Ashby, Cellular Solids: Structure and Properties. Pergamon Press, Oxford (1988)). Designs for advanced composite panels based on cellular and sandwich structures have been found to maximize material and structural performance (Evans et al., "The Topological Design of Multifunctional Cellular Metals", $7^{th}$ International Conference on Aluminum Alloys, Charlottesville, Va. (2000)).

The above concepts have been integrated in the present invention where "engineered" composites and their arrangement in efficient cellular and sandwich configurations are shown to lead to environmentally friendly and structurally efficient components, i.e. beams and panels. The development, manufacturing, and characterization, both experimental and analytical, of beams and plates are described. The potential of cellular biocomposites for full-size load-bearing structural components is discussed by comparing extrapolated results to the documented performance of commercial components made with conventional materials.

Thus the invention relates to the engineering, design, and manufacturing of hybrid 108 cellular biocomposites 105, 106 for structural beams 100 and panels 101, 102, 107. Hybrid cellular composites are defined as the enhanced structural system obtained by the synergistic combination of a synthetic resin reinforced with natural fibers (or hybrid combination of different natural fibers and/or limited synthetic fibers), and strategically arranged in optimized cellular forms for use as load-bearing, or structural, beams and panels. Hybrid cellular biocomposites can be used for beam and panel (i.e., plate, or shell) components for multiple-use (e.g., building walls, floors and roofs, bridge decks, ship top decking, aircraft flooring, wings, etc.) with tailorable integrated multi-functions (i.e., stiffness, strength, toughness, thermal insulation, and user friendliness).

The invention is schematically depicted in FIGS. 4A to 4E. The composites can be constructed by hand lay-up methods or automated processes. Hand lay-up methods have been successfully used for the manufacturing of two-dimensional cellular beams 100 and plates 101, 111 (FIG. 4B). A VARTM automated process has been preliminarily developed and validated.

The invention overcomes the gaps limiting the use of biocomposite materials for load bearing structural elements by combining the developments in biocomposites with structural engineering designs that mimic natural materials and systems. Hybrid cellular biocomposite 107 structural beams 100 and panels 101, 109, 111 provide an environmentally friendly and sustainable alternative to fiberglass composite load-bearing structural components. The specific advantages are:

Bio-based Resin: Most of the biocomposite research has been done with unsaturated polyester (UP) resin systems due its low cost and the desire to select a cost-compatible matrix for the bio-fibers. Rising oil prices in the 1970s initiated the early interest in biobased polymers, leading nowadays to a diverse availability of products. Biobased polymers derived from renewable resources are attracting economical, social and industrial attentions. The US is a major producer of soybean (42% of total world production) and we have surplus of ~60 billion pounds of soybean each year. Soybeans typically contain about 20% oil and 40% protein. Research in our group has shown the potential of using both the protein and oil of soybeans for plastic and composite applications (Mehta, G., et al., "Bio-based resin as a means to toughen biocomposites", 14$^{th}$ International Conference on Composite Materials (ICCM-14), San Diego, Calif., USA, Jul. 14-18, 2003, FULL paper published in the ICCM-14 conference proceeding, # 1754) and (Tummala, P., et al., "Eco-composite Materials from Novel Soyprotein-based Bioplastics and Natural Fibers", 14$^{th}$ International Conference on Composite Materials (ICCM-14), San Diego, Calif., USA, Jul. 14-18, 2003, FULL paper published in the ICCM-14 conference proceeding, # 1759). Non-food use of soy-oil in resin formulations will add more value to the US soybean production thus increasing economic markets with the added advantage of eco-friendliness.

Nano-clay Reinforced Polymer: Layered silicate based polymer represent a new alternative to conventionally filled polymers by being constituted by discrete clay sheets in the order of a few nanometers (Vaia, R., "Polymer Nanocomposites Open a New Dimension for Plastics and Composites," The AMTIAC Newsletter, Volume 6, No. 1). Uniform dispersion of these nanoscopically-sized particles produces an ultra-large interfacial area per unit volume between the nanoelement and the host polymer (Vaia, R., "Polymer Nanocomposites Open a New Dimension for Plastics and Composites," The AMTIAC Newsletter, Volume 6, No. 1), which leads to unique properties that provide opportunities to circumvent performance gaps of moisture and thermal dimensional instability of natural-fiber reinforced polymers (Garcés, J. M. et al., "Polymeric Nanocomposites for Automotive Applications," *Advanced Materials*, Vol. 12, No. 23, pp. 1835-1839, 2000) and (Vaia, R., "Polymer Nanocomposites Open a New Dimension for Plastics and Composites," The AMTIAC Newsletter, Volume 6, No. 1). The most common type of layered nano-clay is Monmorillonite (MMT) and the two main processing methods for PNCs are itercalation and exfoliation, where exfoliation allows for better performance gains (Biswas, M., et al., "Recent Progress in Synthesis and Evaluation of Polymer-Montmorillonite Nanocomposites," *Advances in Polymer Science*, Vol. 155, pp. 155-170, 2001) and (Vaia, R., "Polymer Nanocomposites Open a New Dimension for Plastics and Composites," The AMTIAC Newsletter, Volume 6, No. 1). Research within the past 10 years have demonstrated that adding as little as 2-vol % of layered clay can double the tensile modulus and strength of numerous thermoset resins without sacrificing impact resistance (Garcés, J. M. et al., "Polymeric Nanocomposites for Automotive Applications," *Advanced Materials*, Vol. 12, No. 23, pp. 1835-1839, 2000) and (Vaia, R., "Polymer Nanocomposites Open a New Dimension for Plastics and Composites," The AMTIAC Newsletter, Volume 6, No. 1). In addition, well-dispersed clay nano-particles make the polymer less permeable to liquids and gasses, more flame retardant and tougher (Garcés, J. M. et al., "Polymeric Nanocomposites for Automotive Applications," *Advanced Materials*, Vol. 12, No. 23, pp. 1835-1839, 2000) and (Vaia, R., "Polymer Nanocomposites Open a New Dimension for Plastics and Composites," The AMTIAC Newsletter, Volume 6, No. 1). The later benefit is also advantageous to minimize the content of the common costly and toxic flame retardants (Asahi Chemical Industry Co. Ltd., U.S. Pat. No. 6,454,969).

Hybrid Materials and Structures: Hybrid materials are traditionally viewed as the combination of two monolithic materials. However, depending on the scale of deconstruction, this definition presents problems when materials such as composites, alloys, and wood are treated as monolithic materials. For example, at a small scale, wood is composed of multiple hollow cells made of layered sheets of cellulose fibers embedded in a lignin adhesive—a hybrid composition. Thus, a more holistic definition of a hybrid material is the "combination of two or more materials in a predetermined geometry and scale, optimally serving a specific engineering purpose" (Ashby, M. F. et al., "Designing Hybrid Materials, *Acta Materialia*, Vol. 51, pp. 5801-5821, 2003). The concept, illustrated in FIG. 4, has been paraphrased (Ashby, M. F. et al., "Designing Hybrid Materials, *Acta Materialia*, Vol. 51, pp. 5801-5821, 2003) as "A+B+shape+scale," which allows for a wide possible choice of materials A and B including when one of them is simply space. This new vision of hybrid materials expands the design space allowing the attainment of properties that are not possible with a single material.

Particulate and fibrous composites: or A+B hybrids [4], can be thought of as a subset of the possibility of hybrid materials. In these systems, any two monolithic materials are combined to make a composite and they can be mixed in diverse geometries. On a macroscopic scale (larger than the size of the constituents) a composite behaves like a homogeneous solid with its own set of thermo-mechanical properties.

Shape Hybrid Composites: Hybridization through shape can be used to enhance stiffness, strength, and provide damage tolerance. Sections of shaped material carry load more efficiently than solid sections, where efficiency means that for a given structural demand the section uses as little material as possible, and is therefore as light as possible. For example, beams with hollow-box or I-sections are stiffer and stronger in bending than solid sections of the same cross-sectional area. The same is true for panels with stiffeners or those with an expanded core that create a sandwich (Ashby, M. F., "Materials and Shape," *Acta metal. Mater.*, Vol. 39, No. 6, pp. 1025-1039, 1991) and (Ashby, M. F. et al., "Designing Hybrid Materials, *Acta Materialia*, Vol. 51, pp. 5801-5821, 2003). Thus, the material distribution, or topology, generates shapes that permit increases in structural performance. While sections can achieve efficiency through their macroscopic shape, structural efficiency can also be manipulated through shape at a smaller scale: microscopic or micro-structural shape. Wood is again as an example, where the solid component of wood (a composite of cellulose, lignin and other polymers) is shaped into multiple prismatic cells of varying sizes distributed throughout the cross-section. In both macro- and micro-structural shape hybridization, the effect is to disperse the solid component further from the axis of bending or twisting of the section, thus increasing its flexural stiffness and strength (Ashby, M. F., "Materials and Shape," *Acta metal. Mater.*, Vol. 39, No. 6, pp. 1025-1039, 1991) and (Ashby, M. F. et al., "Designing Hybrid Materials, *Acta Materialia*, Vol. 51, pp. 5801-5821, 2003).

Scale Hybridization: The advantages discussed for constituent ("A+B") and shape hybridization are independent of scale. However, mechanical and transport properties are scale dependent when the hybrid microstructure is submicron. Small particles and fine fibers are generally stronger than bulk samples of the same materials due to the lower amount of defects and flaws. Thus, scale can have a significant effect on the mechanical properties of a hybrid. The scale effect is efficiently exploited by nature, where its constituents consist of platelets and fibers at the nanometer scale.

Hybrid Reinforcement: Hybrid reinforcement 109, 110 strategies with engineered biofiber/fabric blends 108, 109 leads to added strength and ease of handling of discrete biofiber reinforcement. The use of hybrid synthetic and natural fibers gives the hybrid biocomposites comparable performance to synthetic fiber composite materials at a reduced cost. In addition, the difference in thermal properties can be advantageously used to introduce prestressing to the material system and effectively increase its load carrying capacity.

Cellular Materials and Structural Components: The specific properties of the nano-reinforced biocomposite are further enhanced through topological (i.e., material layout or distribution) design of the material in cellular arrangements. Scrutiny into nature's materials shows that high structural efficiency can be achieved by strategic material organization 102, 112. Optimized hierarchical cellular arrangement of the material leads to enhanced and efficient use of the base material and thus sustainable structural components at reduced cost.

Prestressed Hybrid Biocomposite Structural Components. The use of hybrid reinforcements of synthetic fibers and biocomposite materials allows the introduction of a prestressed state to the extreme fibers of the section (due to differential temperature effects from manufacturing) that result in enhanced load and deformation capacity.

Multiuse: The invention can be configured in custom design configurations (i.e., beam, plate, or shell [curved plate]), thus allowing to serve for multiple uses such as beams, walls, floors, roofs, decks, automotive body panels, aircraft wings, etc.

Multifunctional: The invention can be designed to serve multiple simultaneous functions such as strength, stiffness, toughness, thermal insulation, and fire protection.

Cost reduction: Natural fibers, whose performance can equal that of E-glass fibers (most commonly used synthetic fiber), is approximately three times cheaper than E-glass fibers.

Environmental impact: Environmental gains can be made using renewable natural fibers instead of man-made synthetic glass fibers.

Energy use: While it takes 6,500 BTUs of natural energy to produce one pound of Kenaf (U.S. grown natural fiber), the production of one pound of glass requires four times that amount (23,500 BTUs).

Sustainability: The invention is largely constituted from rapidly renewable resources, i.e., bio-based, it is controllable biodegradable, and socially acceptable.

Temperature/Sound Insulation: Natural fibers are efficient thermal and sound insulators and outperform glass fibers. Biocomposite panels are thus an efficient alternative for energy/sound insulation requirements.

Natural Hazards: The low weight density of biofibers (~½ of E-glass) and the cellular material arrangement will reduce mass-dependent seismic forces, and improve hurricane debris impact response in housing and building construction applications.

Industrial production of full-scale nano-biocomposite beams and panels is feasible through conventional manufacturing methods for fiber-reinforced composites such as vacuum assisted resin transfer molding (VARTM) and pultrusion.

The invention provides for the engineering, design, and manufacturing of hybrid 110 cellular 105, 106, 102, 112 nanoreinforced biocomposites, or nano-biocomposites, for structural beams 100 and panels 101. Hybrid cellular nano-biocomposites are defined here for the first time as the enhanced material system obtained by the synergistic combination of a biobased resin reinforced with nano-scale clay particles 110 and natural fibers (or hybrid combination of different natural fibers and/or limited synthetic fibers), and strategically arranged in optimized cellular forms 112 for use as load-bearing, or structural, beams 100 and panels 101. The cellular nano-biocomposite can be used for beam and panel (i.e., plate, or shell) components for multiple use (e.g., building walls, floors and roods, bridge decks, ship top decking, aircraft flooring, wings, etc.) with tailorable integrated multi-functions (i.e., stiffness, strength, toughness, thermal insulation, and user friendliness).

Hybrid cellular biocomposite structural beams and panels can be used for civil, transportation and aerospace structural systems. In the civil sector beams and panels can be used in residential, industrial, and bridge construction. In residential and industrial construction, cellular biocomposite beams and panels can serve as elements in modular pre-fabricated post-and-beam and panelized (using pre-manufactured walls, floors, and roofs) construction. In bridge construction, the invention can be used for deck systems in highway bridges and complete superstructures of small pedestrian bridges. Transportation applications are conceived for automobile and light-rail train bodies and components. While the aerospace industry has traditionally considered only high-end composite materials, new trends towards unmanned-air-vehicles (UAVs) dictate the use of low-cost materials with good performance without concerns of ultra-high-performance. The availability of a structural system of equal performance to synthetic composites at lower cost and based on sustainable resources will be a great asset for current and future structural applications.

The substance and advantages of the present invention will become increasingly apparent by reference to the following drawings and the description.

BRIEF DESCRIPTION OF THE DRAWINGS

FIGS. 4A to 4E are illustrations of hybrid cellular composite structural beams and plates.

FIGS. 6A and 6B are close-up photographs of natural fibers used for cellular beam and plate manufacturing.

FIGS. 11A and 11B are graphs showing specific stiffness and strength of biocomposite material systems.

FIGS. 12A and 12B are graphs showing impact strength test results for biocomposite material systems.

FIGS. 13A and 13B are graphs showing coefficient of thermal expansion (CTE) test results for biocomposite material systems.

FIG. 15A to 15C are photographs showing fiber weave and mat fabrics used for hybrid plates.

FIGS. 16A and 16B are photographs of compression molded plates.

FIGS. 18A to 18C are photographs showing compression molded plates of the fiber mat materials and polyester resin.

FIGS. 19A and 19B are graphs showing the modulus of elasticity (MOE) test results for hybrid materials and face sheets.

FIGS. 20A and 20B are graphs showing the ultimate tensile strength (UTS) test results for hybrid material systems and face sheets.

FIGS. 21A and 21B are graphs showing the tensile elongation at break (TEB) test results for hybrid material systems and face sheets.

FIGS. 26A to 26D are drawings showing specially designed molds used for manufacturing the cellular beams and plates.

FIGS. 28A and 28B are schematic illustrations of flexural test setups.

FIGS. 29A and 29B are graphs of force versus displacement response of cellular biocomposite beams and plates.

FIGS. 30A and 30B are graphs of force versus displacement response at midspan of hybrid cellular composite panels.

FIGS. 32A to 32C are photographs of a dry hybrid hemp/jute biofiber/fabric preform.

FIGS. 35A and 35B are photographs of a VARTM hybrid bio-fabric plate sample (45% fibers by weight).

FIGS. 36A and 36B are illustrations of a layout of engineered hybrid preform for cellular panel.

FIGS. 48A to 48C are unit cell models for the mechanical behavior of cellular solids (Gibson, L. J., et al., *Cellular Solids: Structure and Properties* Pergamon Press, Oxford (1988)).

FIGS. 49A and 49B are graphs of typical compressive and tensile stress-strain response for an elastic-brittle cellular material (Gibson, L. J., et al., *Cellular Solids: Structure and Properties* Pergamon Press, Oxford (1988)).

FIGS. 50A and 50B are illustrations showing typical sandwich structures.

FIGS. 51A to 51F are illustrations showing various periodic cellular sandwich beams and panels.

FIGS. 53A to 53E are illustrations showing various hierarchical cellular sandwich panels.

FIGS. 55A and 55B are illustrations of a schematic of the analysis of a panel with a hierarchical cellular material system.

FIGS. 56A and 56B are photographs of a cellular plate strip, green hemp/polyester, 10% fibers by weight, carbon fiber strip, CP1.

FIGS. 59A and 59B are graphs showing measured and corrected strains in the bottom carbon layer for sample CP1-C.

DESCRIPTION OF THE PREFERRED EMBODIMENTS

The invention has two main objectives: (a) to establish a minimum database for biocomposite materials to assess their current status and evaluate their feasibility for structural applications, and (b) to provide the necessary material characterization for the material systems used in the structural experimental studies. In addition, hybrid material systems using hemp fibers in combination with chopped E-glass, unidirectional carbon, and weaved jute fabrics were also investigated. In all cases, the resin system consisted of unsaturated polyester resin. The performance of the biocomposite material systems are compared with that of E-glass fiber-reinforced composites.

Figures 5A, 5B:
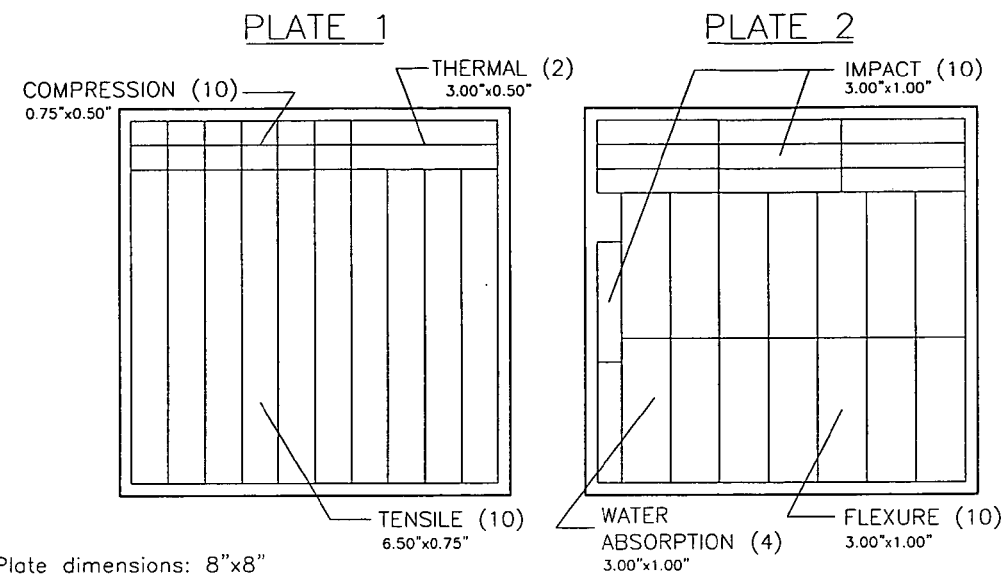
FIGS. 5A and 5B are sample lay-outs for material property tests.
Figure 7A:
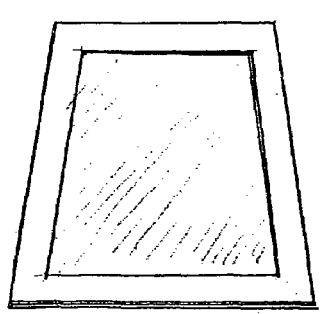
FIGS. 7A to 7H are drawings showing a manufacturing process of composites plates.
Figure 7B:
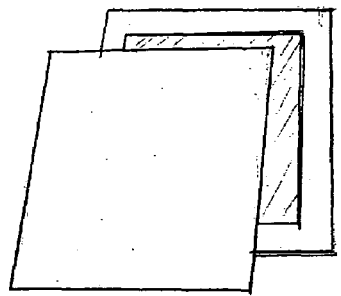
Figure 7C:
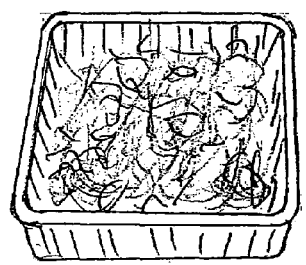
Figure 7D:
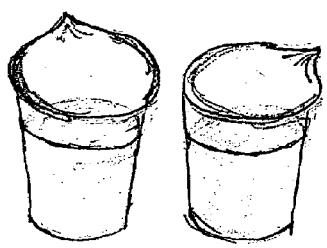
Figure 7E:
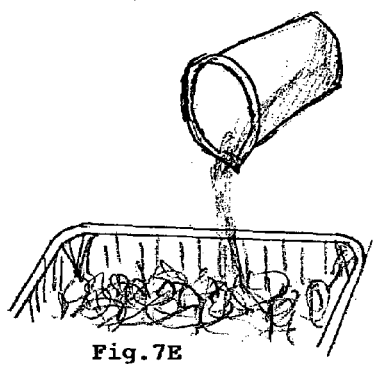
Figure 7F:
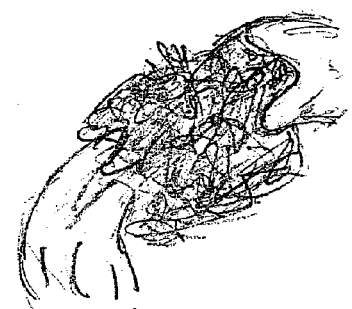
Figure 7G:
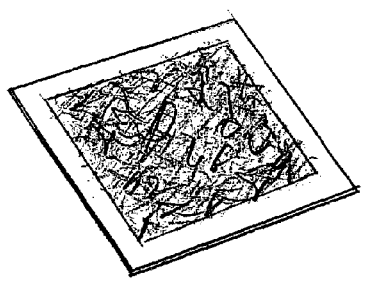
Figure 7H:
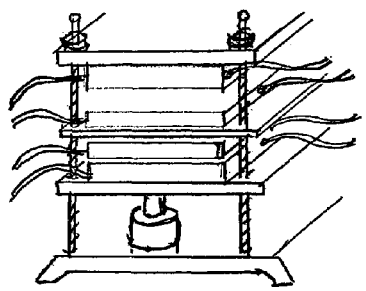

The macro-scale properties of the material systems were studied through ASTM material testing procedures for short fiber reinforced plastics. The evaluated properties were: tensile strength and modulus (D695), flexural strength and modulus (D790), fracture toughness (D256), thermal expansion (D696), water absorption (D570), and combustibility (E136). Test specimens for performing the mechanical property tests will be prepared by manufacturing two 8"×8" compression molded plates for each material system type. The number and size of test specimens required for each test was prepared using the layout show in FIG. 5.

The material test program was initiated by identifying potential biocomposite material systems and performing the required material testing to evaluate their probable use for load-bearing structural components. Hemp fiber was determined to be the stiffest, cheapest and most readily available fiber type for use in load-bearing structural applications. Thus, hemp was used as the base natural fiber reinforcement in the biocomposite material. Flax natural fibers were also considered for specific applications. The fiber content in the material studies was selected to match the fiber content in the cellular beams and plates manufactured for the structural experimental program. In most cases, the fiber content was approximately 10% per weight of the resin in the material system, which corresponds to roughly an 8% fiber volume fraction.

FIRST SET OF EXAMPLES

The biocomposite plates for material characterization were determined to match the material systems used for the cellular beams and plates in the structural testing program. All biocomposite material systems were composed of either green hemp fibers or chopped flax fibers and unsaturated polyester resin with a fiber weight fraction (weight of fibers by weight of resin) of 10%, which corresponds to a fiber volume fraction of 8%. The green hemp fibers (FIG. 6A) were chopped with an average length of 6 mm, and purchased from BioInnova of Germany. The flax fibers (FIG. 6B) were chopped with an average length of 2 mm, contained 50% core material, and were purchased from Flax Craft of New Jersey. The resin system used was ortho unsaturated polyester (Kemlite Co., Inc., Joliet, Ill.) with methyl ethyl ketone peroxide (MEKP, Sigma Aldrich) catalyst (1% by weight of resin), and cobalt naphthenate (CoNap, Sigma Aldrich) promoter (0.03% by weight of resin). A summary of the average mechanical properties of the material systems used in the material and structural (cellular beams and plates) characterization studies is presented in Table 2.

TABLE 2

Average properties of natural fiber and unsaturated polyester composites

| Fiber Type | Fiber Volume Fraction (%) | Density (g/cm$^3$) | Elastic Modulus (GPa) | Tensile Strength (MPa) |
|---|---|---|---|---|
| Green Hemp | 10 | 1.18 | 3.81 | 14.47 |
| Green Hemp | 13 | 1.19 | 4.4 | 14.91 |
| Green Hemp | 20 | 1.22 | 5.23 | 16.79 |
| Unprocessed Green Hemp | 25 | 1.14 | 8.65 | 10.08 |
| Raw Hemp | 15 | 1.21 | 6.15 | 19.49 |
| Flax | 35 | 1.10 | 3.38 | 13.31 |
| E-Glass | 15 | 1.36 | 7.8 | 34.7 |

The characterization of the biocomposite material systems was done by fabricating compression molded plates of the material systems a fiber weight fraction of 10%, which corresponds to a fiber volume fraction of 8%. The typical manufacturing process of the hybrid compression molded plates is summarized in the photograph sequence shown in FIG. 7.

Material property tests were performed on the following fiber types: a) green, b) unprocessed green hemp, c) raw hemp, d) flax, and e) E-glass. Unsaturated Polyester (UPE) was used for the matrix of all the composites.

Each material type tested was given a sample identification depending on the material and the fiber weight fraction used. The first letter of the ID, P, stands for compression molded plaque. The next two digits of the ID stand for the material type as shown in Table 3. The final two digits stand for the weight percentage of fibers used in the sample. The physical characteristics of the fiber types used for each material, including: fiber weight fraction, fiber volume fraction, density, fiber lengths, and aspect ratio, are given in Table 4.

TABLE 3

Biocomposite material system naming convention

| ID label | Fiber Type[e | Fiber Physical Description |
|---|---|---|
| 01 | Green hemp | short chopped fibers, low core content |
| 02 | Unprocessed green hemp | long fibers, high core content |
| 03 | Raw hemp | long fibers, low core content |
| 04 | Chopped flax | short fibers, 50% fibers, 50% core |
| 05 | E-glass | short chopped fibers sized for polyester |

TABLE 4

Physical characteristics of reinforcing fibers

| SAMPLE | ID | Fiber Wt. (%) | Fiber Vol. (%) | Density (g/cc) | Fiber Length (mm) | Fiber L/d |
|---|---|---|---|---|---|---|
| Green Hemp/UPE - 13% | P-01-13% | 13 | 0 | 1.18 | 2–10 | 60 |
| Green Hemp/UPE - 17% | P-01-17% | 17 | 13 | 1.19 | 2–10 | 60 |
| Green Hemp/UPE - 25% | P-01-25% | 25 | 20 | 1.22 | 2–10 | 60 |
| Unprocessed Green Hemp/UPE | P-02-25% | 25 | 25 | 1.14 | 5–20 | 125 |
| Raw Hemp/UPE | P-03-20% | 20 | 15 | 1.21 | 8–12 | 100 |
| Flax/UPE | P-04-33% | 33 | 35 | 1.10 | 1–2 | 15 |
| E-Glass/UPE | P-05-29% | 29 | 15 | 1.36 | 6–8 | 467 |

The tensile stress-strain properties of each material were measured using the ASTM D638 testing procedure. The tensile tests were used to determine the following material properties: modulus of elasticity, ultimate tensile strength, and the tensile elongation at break. Tensile tests were performed on eight "dog-bone" samples from each material type, except the unprocessed green hemp samples where three samples were damaged during the test set-up. A summary of the tensile test results is given in Table 5.

TABLE 5

Tensile test results summary for biocomposite material systems

| SAMPLE | ID | MOE (GPa) | Tensile Str. (MPa) | Tensile Elong (%) |
|---|---|---|---|---|
| Green Hemp/UPE - 13% | P-01-13% | 3.81 | 14.47 | 0.32 |
| Green Hemp/UPE - 17% | P-01-17% | 4.40 | 14.91 | 0.30 |
| Green Hemp/UPE - 25% | P-01-25% | 5.23 | 16.79 | 0.33 |
| Unprocessed Green Hemp/UPE | P-02-25% | 8.65 | 10.08 | 0.16 |
| Raw Hemp/UPE | P-03-20% | 6.15 | 19.49 | 0.33 |
| Flax/UPE | P-04-33% | 3.38 | 13.31 | 0.33 |
| E-Glass/UPE | P-05-29% | 7.80 | 34.70 | 0.50 |

Figure 8:
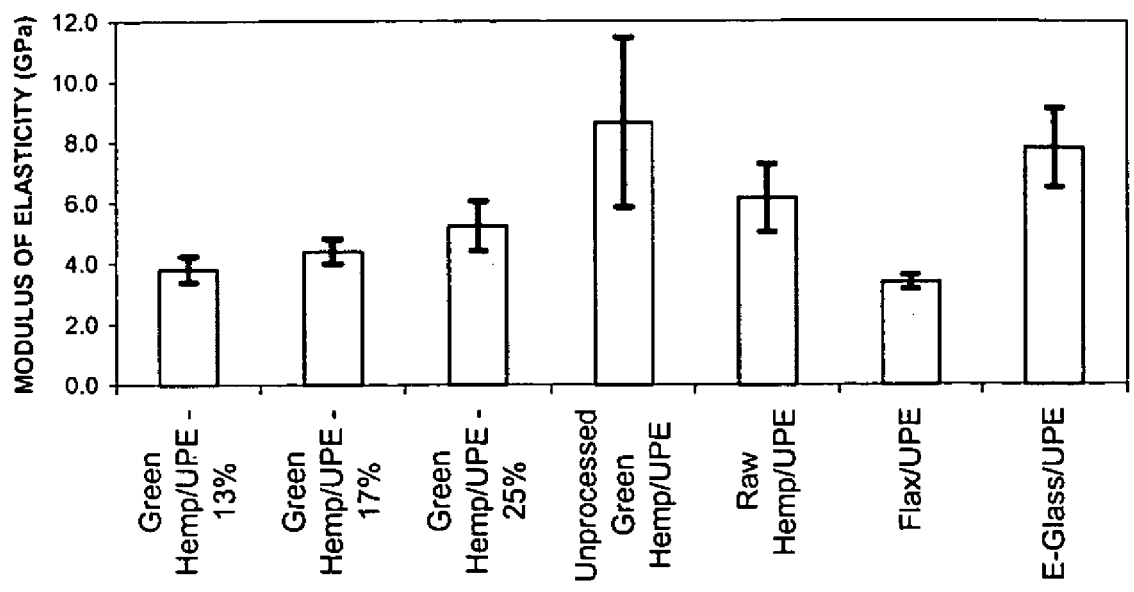
FIG. 8 is a graph showing modulus of elasticity (MOE) test results, for example composite material systems.

The results for the modulus of elasticity are given in Table 6 and shown in FIG. 8.

TABLE 6

Modulus of elasticity test results for biocomposite material systems

| SAMPLE | ID | MOE (GPa) | Std. Dev. (GPa) | Coeff. of Variation |
|---|---|---|---|---|
| Green Hemp/UPE - 13% | P-01-13% | 3.811 | 0.434 | 11.39% |
| Green Hemp/UPE - 17% | P-01-17% | 4.396 | 0.414 | 9.42% |
| Green Hemp/UPE - 25% | P-01-25% | 5.233 | 0.816 | 15.60% |
| Unprocessed Green Hemp/UPE | P-02-25% | 8.646 | 2.804 | 32.43% |
| Raw Hemp/UPE | P-03-20% | 6.151 | 1.123 | 18.26% |
| Flax/UPE | P-04-33% | 3.375 | 0.240 | 7.11% |
| E-Glass/UPE | P-05-29% | 7.802 | 1.295 | 16.60% |

Figure 9:
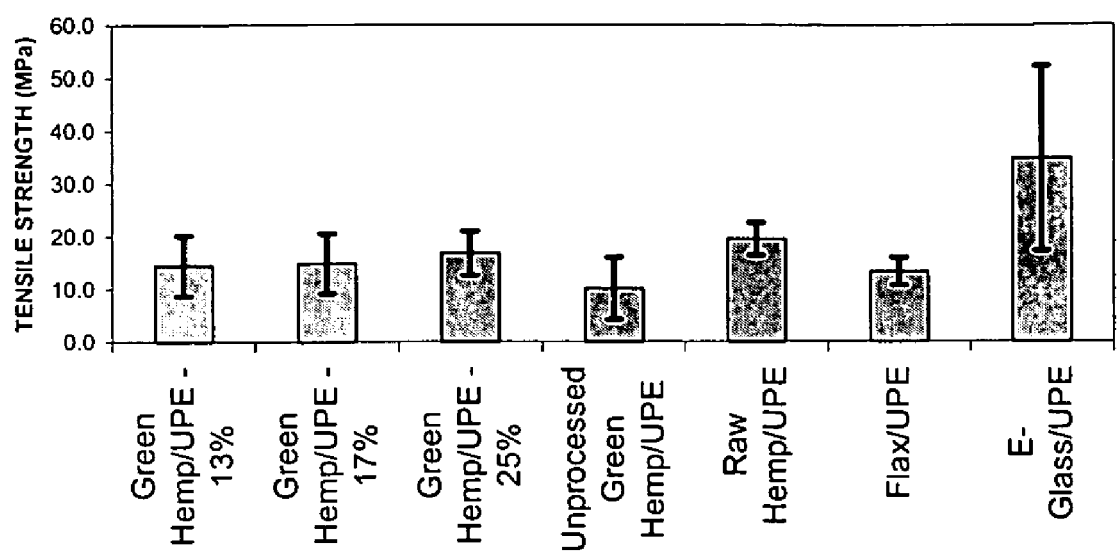
FIG. 9 is a graph showing an ultimate tensile strength (UTS) test results for biocomposite material systems.

The results for the tensile strength are given in Table 7 and shown in FIG. 9. All samples failed in a sudden brittle manner with little noise from fiber cracking before failure.

TABLE 7

Ultimate tensile strength test results for biocomposite material systems

| SAMPLE | ID | Tensile Str. (MPa) | Std. Dev. (MPa) | Coeff. of Variation |
|---|---|---|---|---|
| Green Hemp/UPE - 13% | P-01-13% | 14.47 | 5.74 | 39.67% |
| Green Hemp/UPE - 17% | P-01-17% | 14.91 | 5.67 | 38.04% |
| Green Hemp/UPE - 25% | P-01-25% | 16.79 | 4.19 | 24.97% |
| Unprocessed Green Hemp/UPE | P-02-25% | 10.08 | 5.89 | 58.41% |
| Raw Hemp/UPE | P-03-20% | 19.49 | 3.10 | 15.91% |
| Flax/UPE | P-04-33% | 13.31 | 2.63 | 19.76% |
| E-Glass/UPE | P-05-29% | 34.70 | 17.49 | 50.41% |

Elongation at Break

Figure 10:
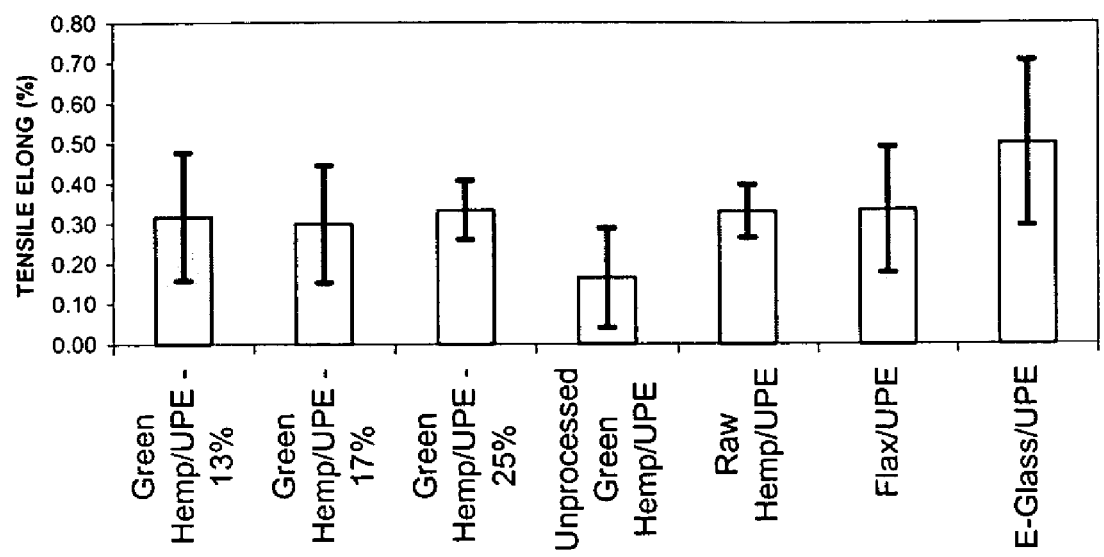
FIG. 10 is a graph showing elongation at break test results for biocomposite material systems.

The results for the elongation at break are given in Table 8 and shown in FIG. 10.

TABLE 8

Elongation at break test results for biocomposite material systems

| SAMPLE | ID | Tensile Elong (%) | Std. Dev. (MPa) | Coeff. of Variation |
|---|---|---|---|---|
| Green Hemp/UPE - 13% | P-01-13% | 0.32 | 0.16 | 50.41% |
| Green Hemp/UPE - 17% | P-01-17% | 0.30 | 0.15 | 48.98% |
| Green Hemp/UPE - 25% | P-01-25% | 0.33 | 0.07 | 22.25% |
| Unprocessed Green Hemp/UPE | P-02-25% | 0.16 | 0.12 | 75.37% |
| Raw Hemp/UPE | P-03-20% | 0.33 | 0.07 | 20.04% |
| Flax/UPE | P-04-33% | 0.33 | 0.16 | 46.95% |
| E-Glass/UPE | P-05-29% | 0.50 | 0.21 | 41.17% |

The specific properties for all materials tested are summarized in Table 9. The measured density for each sample was used to compute the specific stiffness (E/p), and specific strength ($\alpha$/p) as shown in FIG. 11A, and FIG. 11B. Due to the low fiber weight (and volume) fraction used for the E-glass sample, the density of the material is relatively low. Thus, the specific properties of the biocomposite materials may not compare well with E-glass. If higher volume fractions were used for both the E-glass and biocomposite samples, improvement in specific properties of the biocomposite materials may be clearer. This can be investigated theoretically using analytical material models.

TABLE 9

Specific properties for biocomposite material systems

| Sample | ID | Density (g/cc) | MOE (GPa) | E/ρ (GPa/g/cc) | Tensile Str. (MPa) | σ/ρ (Mpa/g/cc) |
|---|---|---|---|---|---|---|
| Green Hemp/UPE - 13% | P-01-13% | 1.18 | 3.81 | 3.23 | 14.47 | 12.26 |
| Green Hemp/UPE - 17% | P-01-17% | 1.19 | 4.4 | 3.69 | 14.91 | 12.53 |
| Green Hemp/UPE - 25% | P-01-25% | 1.22 | 5.23 | 4.29 | 16.79 | 13.76 |
| Unprocessed Green Hemp/UPE | P-02-25% | 1.14 | 8.65 | 7.58 | 10.08 | 8.84 |
| Raw Hemp/UPE | P-03-20% | 1.21 | 6.15 | 5.08 | 19.49 | 16.11 |
| Flax/UPE | P-04-33% | 1.1 | 3.38 | 3.07 | 13.31 | 12.10 |
| E-Glass/UPE | P-05-29% | 1.36 | 7.8 | 5.74 | 34.7 | 25.51 |

The impact strength of each material was measured using the ASTM D256 izod testing procedure. Impact tests were performed on ten notched samples from each material type. A summary of the test results is given in Table 10 and shown in FIG. 12A. The test results for only the biocomposite materials are shown in FIG. 12B to better compare the results from these materials.

TABLE 10

Impact test results for biocomposite material systems

| SAMPLE | ID | Impact Str. (J/m) | Std. Dev. (J/m) | Coeff. of Variation |
|---|---|---|---|---|
| Green Hemp/UPE - 13% | P-01-13% | 6.86 | 1.88 | 27.4% |
| Green Hemp/UPE - 17% | P-01-17% | 7.54 | 2.06 | 27.3% |
| Green Hemp/UPE - 25% | P-01-25% | 10.40 | 2.07 | 19.9% |
| Unprocessed Green Hemp/UPE | P-02-25% | 17.45 | 3.41 | 19.5% |
| Raw Hemp/UPE | P-03-20% | 13.52 | 5.01 | 37.1% |
| Flax/UPE | P-04-33% | 5.28 | 0.76 | 14.4% |
| E-Glass/UPE | P-05-29% | 67.29 | 7.55 | 11.2% |

The Thermal Mechanical Analysis machine in the CMSC was used to determine the coefficient of thermal expansion (CTE) of each material type. The samples were heated to 140° C. at a rate of 4° C. per minute. A plot of the change in length of the sample versus the temperature was tracked by the software and used to compute the CTE of the material. Test results are summarized in Table 11, and are graphically shown in FIG. 13B. The CTE of green hemp/UPE at 25% fibers by weight is compared with conventional building materials in FIG. 13B. The comparison shows the CTE of biocomposite material is approximately 3 times larger than that of steel and concrete.

TABLE 11

Thermal coefficient of expansion test results for biocomposite material systems

| SAMPLE | ID | CTE (μm/m °C.) | Std. Dev. (μm/m °C.) | Coeff. of Variation |
|---|---|---|---|---|
| Green Hemp/UPE - 13% | P-01-13% | 59.0 | 10.7 | 18.18% |
| Green Hemp/UPE - 17% | P-01-17% | 45.0 | 7.2 | 15.94% |
| Green Hemp/UPE - 25% | P-01-25% | 34.1 | 3.4 | 9.89% |
| Unprocessed Green Hemp/UPE | P-02-25% | 35.2 | 3.4 | 9.70% |
| Raw Hemp/UPE | P-03-20% | 23.2 | 2.8 | 12.10% |
| Flax/UPE | P-04-33% | 67.6 | 10.8 | 16.00% |
| E-Glass/UPE | P-05-29% | 30.7 | 8.8 | 28.67% |

Figure 14:
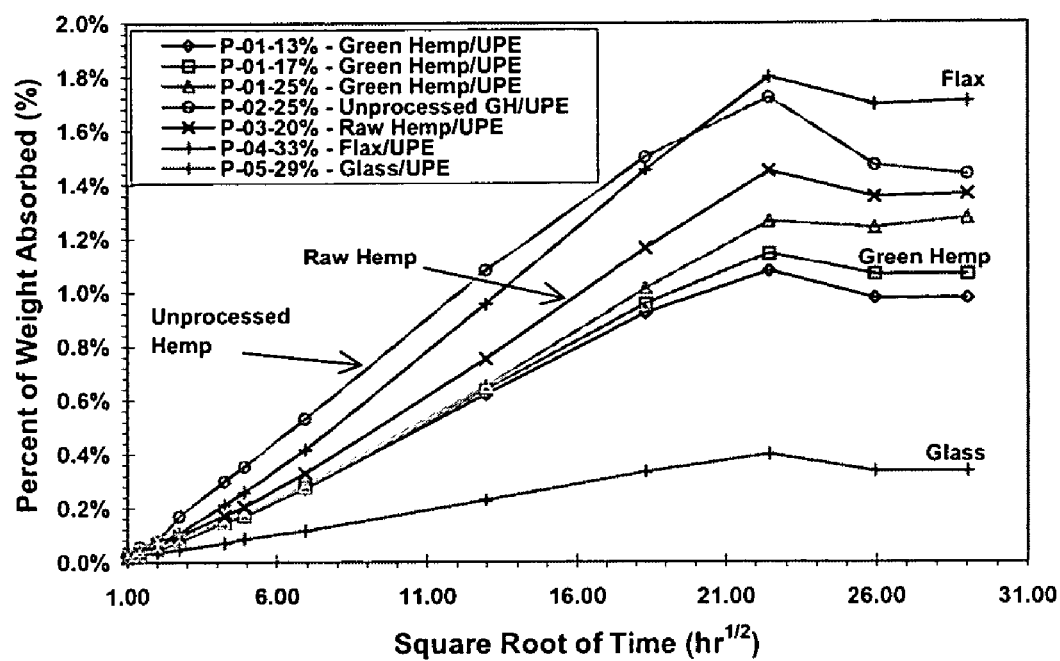
FIG. 14 is a graph showing the results of moisture absorption test results.
Figure 17A:
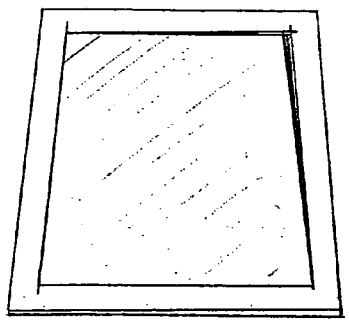
FIGS. 17A to 17I are drawings showing the method of manufacturing the plates.
Figure 17B:
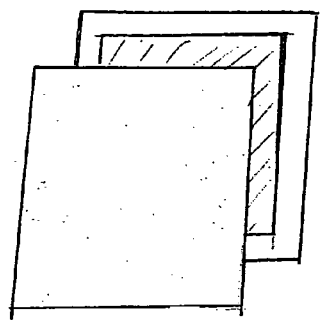
Figure 17C:
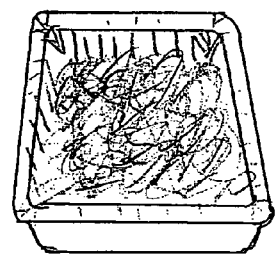
Figure 17D:
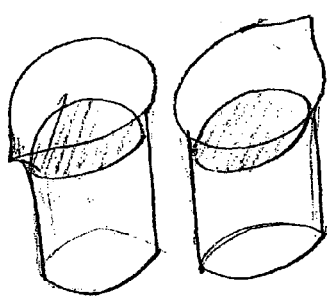
Figure 17E:
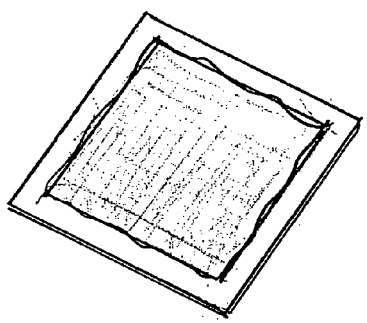
Figure 17F:
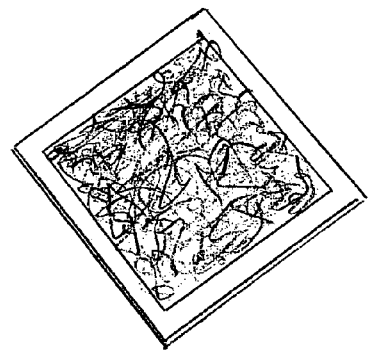
Figure 17G:
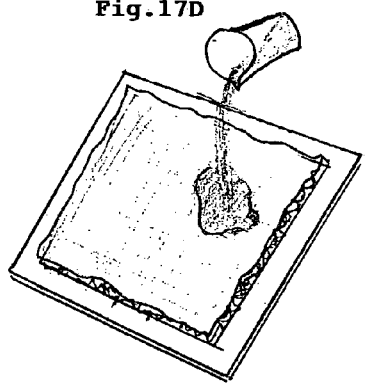
Figure 17H:
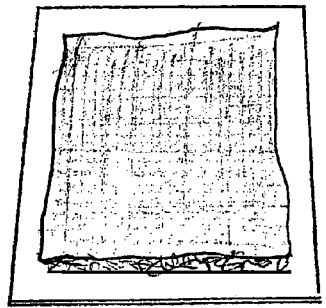
Figure 17I:
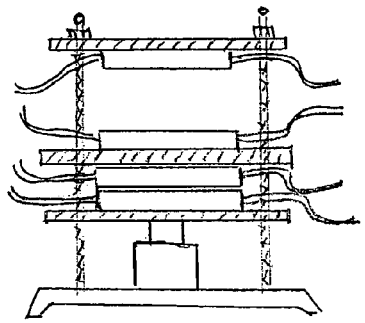

Moisture absorption tests to determine the rate of absorption of each material were performed. The samples are kept in a humidity chamber at 90% humidity and 30° C. On the first days of testing measurements were taken at 1 hr, 2 hr, 4 hr, 7.5 hr, 18 hr, 24 hr, and 48 hrs. After these initial readings, measurements were taken once a week until the material reaches a steady state (no longer absorbing moisture). The moisture absorption test results are shown in FIG. 14. The data shows all samples are stable and no longer absorbing moisture. Readings will be continued to ensure the samples are stable.

Improvement on structural performance of biocomposite material systems and cellular structures through the use of hybrid biocomposite material systems was investigated both at the material and structural level. The hybrid material system is defined here as the combination of chopped natural fibers with synthetic and natural fiber weaves. The hybrid material systems were conceptualized for both face sheets of cellular structures as well as hierarchical walls in all-hybrid cellular panels.

Materials and Constituents

Three types of fiber fabrics (FIG. 15) were used for the hybrid material systems: (a) unidirectional carbon, (b) randomly orientated glass, and (c) woven jute fabric. Each of these fabrics were considered as face sheets for hybrid cellular plates as described hereinafter. Engineered hybrid fabric/biofiber blends for use in all-hybrid cellular systems consisted of: (a) chopped strand glass mat/green hemp fibers/chopped strand glass mat and (b) jute weave/green hemp fibers/jute weave. Unsaturated Polyester (UPE) was used for the matrix of all the composites.

The characterization of the hybrid material systems was done by fabricating compression molded plates of the sandwiched material systems as well as composite systems of the individual natural and synthetic fabrics. Two hybrid compression molded plates were manufactured one with top and bottom Jute fiber mats, the other with top and bottom glass strand mats, as shown in FIG. 16. Both plates were manufacturing with a core of raw hemp fibers, and a fiber weight fraction of 15%. Because the samples were not to be used for pre-peg sheets, all the resin was added to the samples before pressing. Due to resin squeeze-out during pressing, the actual fiber weight fraction of the plates was higher then 15%.

The typical manufacturing process of the hybrid compression molded plates is summarized in the photograph sequence shown in FIG. 17. The manufacturing process is very similar to the regular compression molded plates (FIG. 7) with the only difference being that no face sheets are used in manufacturing the regular compression molded plates.

Each material type tested was given a sample identification label (ID) depending on the material and the fiber weight fraction used as shown in Table 12. The first letter of the ID, P, stands for compression molded plaque. The next two digits of the ID stand for the material type. The final two digits stand for the sample number of the particular material type. The results from previous green hemp, and E-glass material tests are used for comparison with the results from the hybrid plates throughout. The green hemp, and E-glass materials used for comparison have similar fiber weight fractions to the hybrid plates.

TABLE 12

Hybrid biofiber/fabric plate naming convention

| ID label | Plate Typ[e | Constituents |
|---|---|---|
| 11 | Hybrid plate | top and bottom glass and face sheets & green hemp core |
| 31 | Hybrid plate | top and bottom jute fabric face sheets & green hemp core |
| 10 | Randomly oriented glass strand mat plate | randomly oriented glass strand mat |
| 20 | Unidirectional carbon fiber mat plate | unidirectional carbon with nylon stitching |
| 30 | Woven jute fabric mat plate | woven jute fabric |

Tensile Test Results

Tensile Characteristic Values

The tensile stress-strain properties of each material were measured using the ASTM D638 testing procedure. The tensile tests were used to determine the modulus of elasticity, the ultimate tensile strength, and the tensile elongation at break. Tensile tests were performed on eight "dog-bone" samples for the hybrid plates (see FIG. 5) and five for the face sheet materials. A summary of the tensile test results is given in Table 13.

TABLE 13

Tensile test results summary

| SAMPLE | ID | MOE (GPa) | Tensile Str. (MPa) | Tensile Elong (%) |
|---|---|---|---|---|
| Green Hemp/UPE T&B Jute - 27 wt. % | P-31-02 | 10.78 | 28.19 | 0.39 |
| Green Hemp/UPE T&B Glass - 31 wt. % | P-11-02 | 11.92 | 43.37 | 0.61 |
| Green Hemp/UPE - 25 wt. % | P-01-25% | 5.23 | 16.79 | 0.33 |
| E-Glass/UPE - 29 wt. % | P-05-29% | 7.80 | 34.70 | 0.50 |
| Glass Strand Mat/UPE | P-10-01 | 13.46 | 67.02 | 0.91 |
| Unidirectional Carbon Mat/UPE | P-20-01 | 37.92 | 585.12 | 1.67 |
| Woven Jute Mat/UPE | P-30-01 | 4.03 | 22.01 | 0.68 |

Modulus of Elasticity

The results for the modulus of elasticity are given in Table 14, and show in FIG. 19A, and FIG. 19B. The results show a high variation in the results for the hybrid plates (Table 14). This may be due to voids in the green hemp core material from placement of the material during manufacturing. The results from the modulus of elasticity for the glass strand mat also show a high variation (Table 14). This may simply due to the random nature of the strand mat.

The addition of fiber face sheets in the hybrid plates clearly improved the modulus of elasticity over the solid plates (FIG. 19A). However, the hybrid plates show more deviation in the results compared to the material plates. This is mainly due to defects in the samples from manufacturing.

TABLE 14

Modulus of elasticity (MOE) test results

| SAMPLE | ID | MOE (GPa) | Std. Dev. (GPa) | Coeff. of Variation |
|---|---|---|---|---|
| Green Hemp/UPE T&B Jute - 27 wt. % | P-31-02 | 10.78 | 6.12 | 57% |
| Green Hemp/UPE T&B Glass - 31 wt. % | P-11-02 | 11.92 | 7.30 | 61% |
| Green Hemp/UPE - 25 wt. % | P-01-25% | 5.233 | 0.816 | 16% |
| E-Glass/UPE - 29 wt. % | P-05-29% | 7.802 | 1.295 | 17% |
| Glass Strand Mat/UPE | P-10-01 | 13.46 | 10.74 | 80% |
| Unidirectional Carbon/UPE | P-20-01 | 37.92 | 3.69 | 10% |
| Woven Jute/UPE | P-30-01 | 4.03 | 0.64 | 16% |

The results for the ultimate tensile strength are given in Table 15, and shown in FIG. 20. The two hybrid plates failed in different manners under tensile loading to failure. The hybrid plates with jute fabric face sheets failed in a sudden brittle manner, with little noise from fiber cracking before failure. The hybrid plates with top and bottom glass strand mats also failed in a brittle manner, but the glass face sheets delaminated from the core before failure, which was visibly noticeable. There was also noticeable cracking noise from the plate near failure. At failure the green hemp core was fractured, while the glass strand face sheets were not completely fractured.

The face sheet materials also failed in different manners under tensile loading to failure. Both the glass strand mat and woven jute mat failed in a sudden brittle manner with cracking noise near failure. The unidirectional carbon mat failed in a more gradual manner with noticeable matrix cracking and debonding near failure. The matrix cracking was in longitudinal direction, and the cracks spanning from the top to the bottom of the sample. The matrix cracking was accompanied with loud cracking noises, followed by an even larger noise at failure.

TABLE 15

Ultimate tensile strength (UTS) test results

| SAMPLE | ID | Tensile Str. (MPa) | Std. Dev. (MPa) | Coeff. of Variation |
|---|---|---|---|---|
| Green Hemp/UPE T&B Jute - 27% wt. | P-31-02 | 28.2 | 4.5 | 16% |
| Green Hemp/UPE T&B Glass - 31% wt. | P-11-02 | 43.4 | 3.3 | 8% |
| Green Hemp/UPE - 25 wt. % | P-01-25% | 16.79 | 4.19 | 25% |
| E-Glass/UPE - 29 wt. % | P-05-29% | 34.70 | 17.49 | 50% |
| Glass Strand Mat/UPE | P-10-01 | 67.0 | 12.2 | 18% |
| Unidirectional Carbon/UPE | P-20-01 | 585.1 | 152.8 | 26% |
| Woven Jute/UPE | P-30-01 | 22.0 | 1.3 | 6% |

The results for the elongation at break are given in Table 16 and show in FIG. 21. The hybrid plates showed improved elongation at break (Table 16), and ultimate tensile strength (Table 15) compared to the solid material plates. The increase in strength and elongation at break may be a result of the face sheet mats bridging and preventing cracks in the hemp material, which lead to sudden propagation and failure of the material. The carbon fiber mat showed the largest elongation at break, 1.67% (Table 16), which is consistent with typical unidirectional carbon fiber material.

TABLE 16

Tensile elongation at break test results

| SAMPLE | ID | Tensile Elong (%) | Std. Dev. (%) | Coeff. of Variation |
|---|---|---|---|---|
| Green Hemp/UPE T&B Jute - 27% wt. | P-31-02 | 0.39 | 0.24 | 60% |
| Green Hemp/UPE T&B Glass - 31% wt. | P-11-02 | 0.61 | 0.32 | 53% |
| Green Hemp/UPE - 25 wt. % | P-01-25% | 0.33 | 0.07 | 22% |
| E-Glass/UPE - 29 wt. % | P-05-29% | 0.50 | 0.21 | 41% |
| Glass Strand Mat/UPE | P-10-01 | 0.91 | 0.60 | 66% |
| Unidirectional Carbon/UPE | P-20-01 | 1.67 | 0.11 | 6% |
| Woven Jute/UPE | P-30-01 | 0.68 | 0.07 | 11% |

Figure 22:
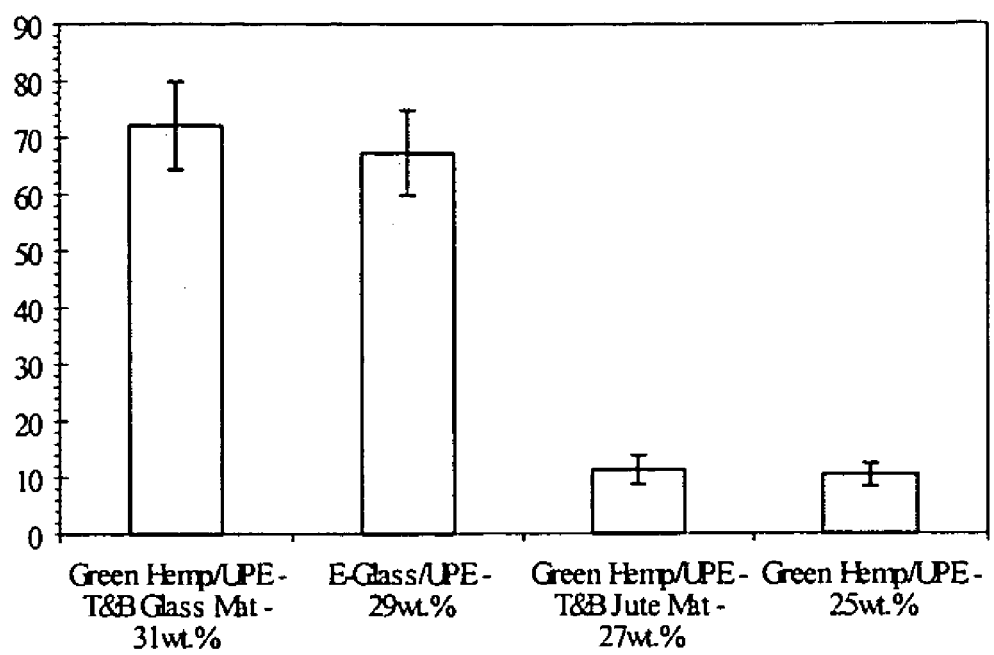
FIG. 22 is a graph showing the impact strength for hybrid material systems and face sheets.

The impact strength of each material was measured using the ASTM D256 izod testing procedure. Impact tests were performed on ten notched samples from each material type. A summary of the test results is given in Table 17, and show in FIG. 22. The hybrid plates show improved impact strength over the results from solid biocomposite plates (FIG. 22). The hybrid plate with glass strand mat face sheets is even higher than the solid E-glass material. This may be due to the quality of the glass strand mats. It should be noted that the glass strand mat and the E-glass material are from different sources.

TABLE 17

Izod impact test results for hybrid and face sheet materials

| SAMPLE | ID | Impact Str. (J/m) | Std. Dev. (J/m) | Coeff. of Variation |
|---|---|---|---|---|
| Green Hemp/UPE T&B Jute - 27 wt. % | P-31-02 | 11.28 | 2.57 | 23% |
| Green Hemp/UPE T&B Glass - 31 wt. % | P-11-02 | 72.11 | 7.82 | 11% |
| Green Hemp/UPE - 25 wt. % | P-01-25% | 10.40 | 2.07 | 20% |
| E-Glass/UPE - 29 wt. % | P-05-29% | 67.29 | 7.55 | 11% |

Figure 23:
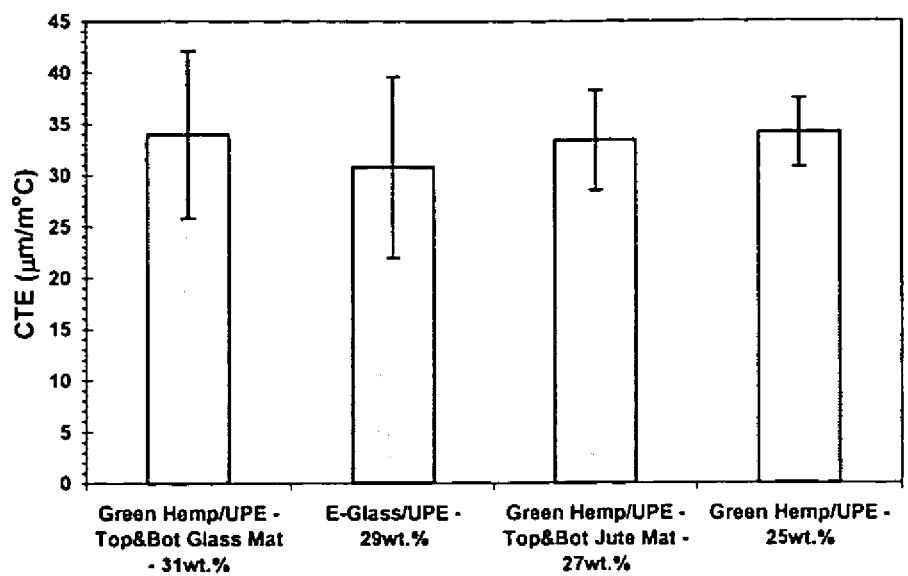
FIG. 23 is a graph showing the coefficient of thermal expansion for hybrid material systems and face sheets.

The Thermal Mechanical Analysis machine in the CMSC was used to determine the coefficient of thermal expansion (CTE) of each material type. The samples were heated to 140° C. at a rate of 4° C. per minute. A plot of the change in length of the sample versus the temperature was tracked by the software and used to compute the CTE of the material. Test results are summarized in Table 18, and shown in FIG. 23. The hybrid plates showed little or no difference in CTE compared to the solid materials (Table 18).

TABLE 18

Coefficient of thermal expansion (CTE) test results for hybrid and face sheet materials

| SAMPLE | ID | CTE (μm/m° C.) | Std.Dev. (μm/m° C.) | Coeff. of Variation |
|---|---|---|---|---|
| Green Hemp/UPE T&B Jute - 27 wt. %. | P-31-02 | 33.38 | 4.86 | 15% |
| Green Hemp/UPE T&B Glass - 31 wt. % | P-11-02 | 33.93 | 8.15 | 24% |
| Green Hemp/UPE - 25 wt %. | P-01-25% | 34.10 | 3.37 | 10% |
| E-Glass/UPE - 29 wt. % | P-05-29% | 30.73 | 8.81 | 29% |

Structural experiment were conducted with the aim of developing and evaluating the aforementioned concepts that would allow biocomposites to be used for load-bearing structural applications. The examples included manufacturing and testing of cellular beams and plates with varying cellular structures and hybrid material systems.

Figure 24:
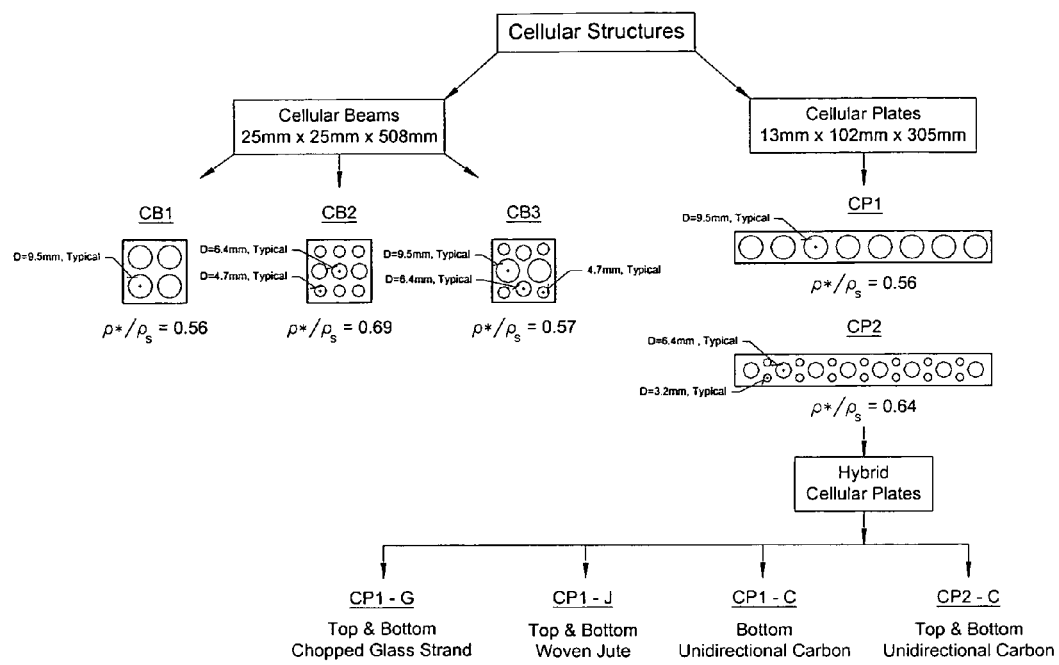
FIG. 24 is a schematic illustration of sample matrix of the Examples.
Figure 25A:
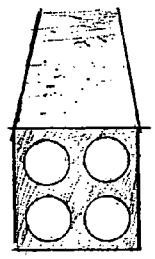
FIGS. 25A to 25L are drawings of cellular beam and plate test units.
Figure 25B:
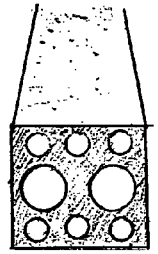
Figure 25C:
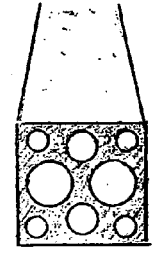
Figure 25D:
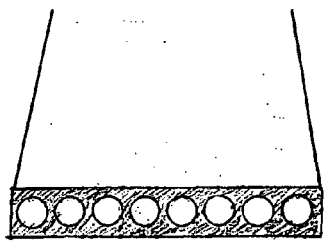
Figure 25E:
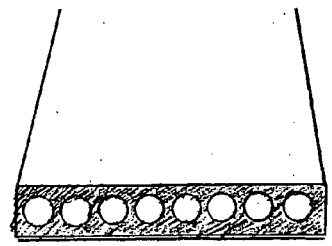
Figure 25F:
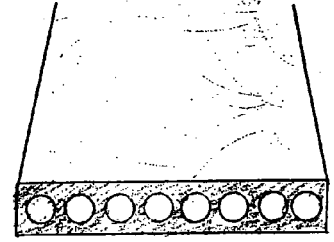
Figure 25G:
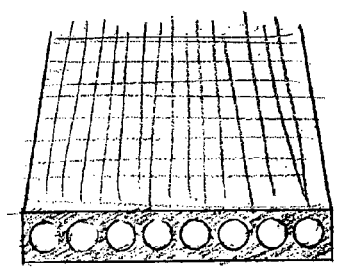
Figure 25H:
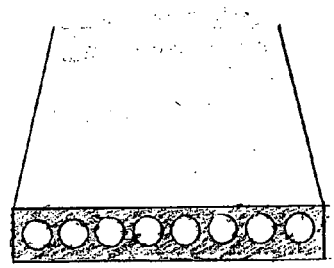
Figure 25I:
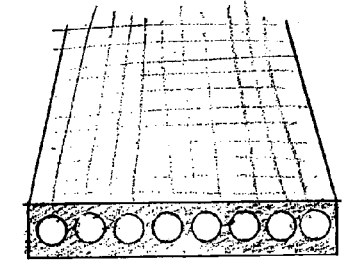
Figure 25J:
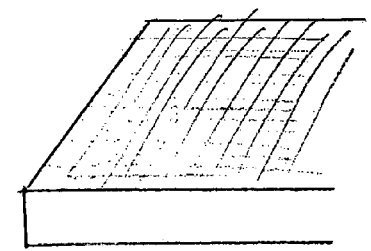
Figure 25K:
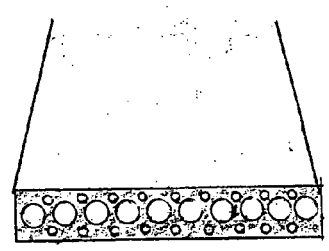
Figure 25L:
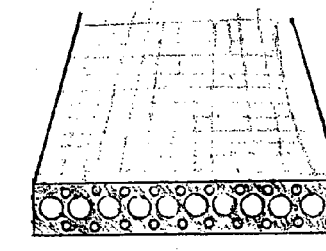

The use of hierarchical cellular sandwich structures to improve the performance of biocomposites was experimentally investigated through flexural tests on laboratory-scale beams and plates. The objective was to evaluate the flexural performance of the developed biocomposite cellular concepts and to assess the effects of hierarchical cellular architectures and material hybrid designs. Three cellular beams with varying cellular structures, two cellular plates with varying cellular structures, and four hybrid cellular plate systems. Aspect ratios susceptible to flexural response were chosen. The test matrix with dimensions, cellular structures, and relative densities of all the samples is schematically depicted in FIG. 24 and a pictorial summary of the built samples is given in FIG. 25.

All beams and plates used natural fibers and unsaturated polyester resin. The material design for all the test units is summarized in Table 19. The influence of the hierarchical arrangement of the cellular structure was evaluated through different cellular designs as shown in FIG. 24. Improvement on structural performance through hybrid cellular sandwich panels was investigated by the provision of synthetic and natural fiber fabrics cured integrally with the cellular core.

TABLE 19

Test matrix of cellular beams and plates with unsaturated polyester resin

| Fiber | Material ID | Fiber Volume (%) | Test Unit ID |
|---|---|---|---|
| Cellular Beams | | | |
| Green Hemp | 01 | 8 | CB1, CB2, CB3 |
| Cellular Plates | | | |
| Green Hemp | 01 | 8 | CP1, CP1-G, CP1-J, CP1-C |
| Raw Hemp | 02 | 8 | CP1, CP2, CP2-C |
| Flax | 03 | 10 | CP1, CP1-J |

The cellular beams and plates were manufactured using biocomposite materials with either green hemp fibers or chopped flax fibers and unsaturated polyester resin with a fiber weight fraction of 10% (see Table 19). The resin system used was ortho unsaturated polyester resin(composition source). All cellular beams and plates were manufactured with 10% fibers by weight of resin, which corresponds to a fiber volume fraction of 8%. A summary of the average mechanical properties of the material systems used in the cellular beams and plates is presented in Table 2.

The hybrid cellular plates were manufactured with integral top and bottom layers of either synthetic or natural fabrics. Three types of fiber fabrics (FIG. 15) were used for these layers: unidirectional carbon, randomly orientated glass, and woven jute fabric. A summary of the average mechanical properties of the material systems used as skins in the hybrid cellular beams plates is presented in Table 13.

Figure 26B:
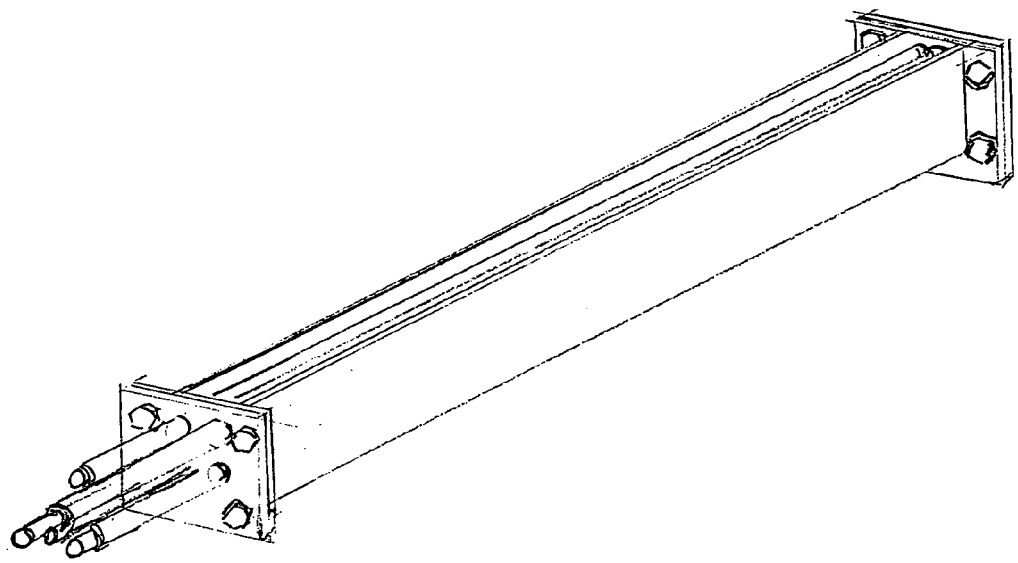
Figure 26D:
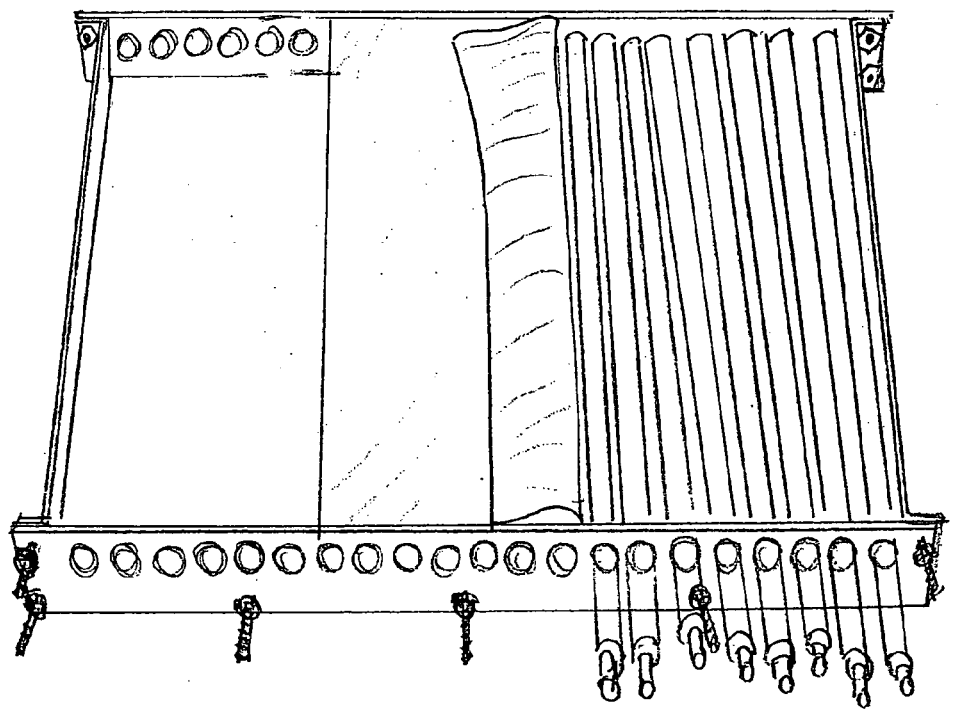

The cellular beams and plates were manufactured using specially designed molds with removable faceplates (FIGS. 26A to 26D). The removable faceplates allow faceplates with other cellular configurations to be used with the same mold. Teflon paper was placed inside the mold to allow the samples to be released after curing (FIG. 26D). The cells were created in the samples by placing rubber tubing through the faceplates. Steel rods were placed inside the tubes to ensure the tubing remained straight during manufacturing (FIG. 26). Tubes smaller than 6.4 mm in diameter were held straight by tensioning the tubing and anchoring it to the mold using small nails. A wood block placed inside the plate mold allowed manufacturing of plates with a reduced width of 305 mm (FIG. 26D).

Figure 27A:
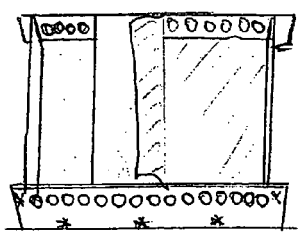
FIGS. 27A to 27L are drawings showing the manufacturing method for a cellular plate.
Figure 27B:
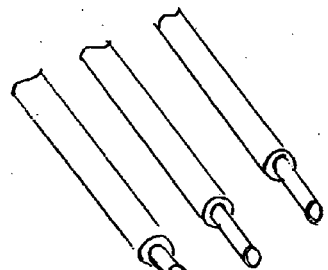
Figure 27C:
Figure 27D:
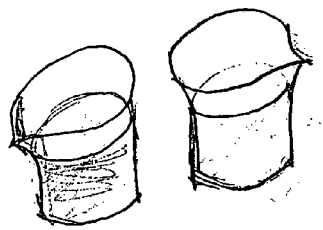
Figure 27E:
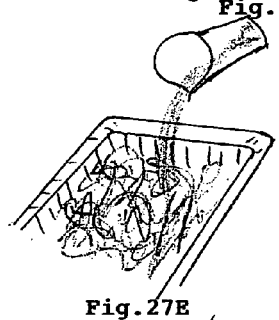
Figure 27F:
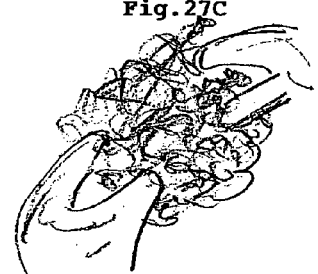
Figure 27G:
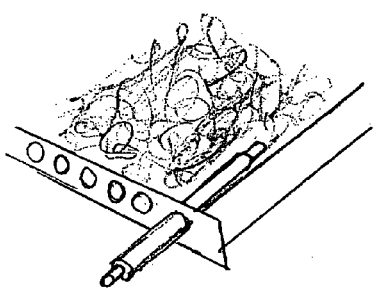
Figure 27H:
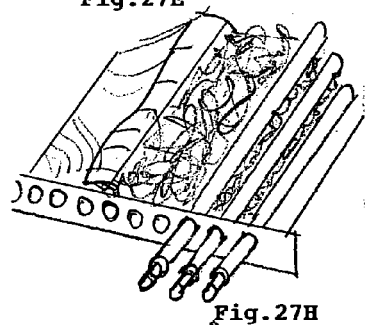
Figure 27I:
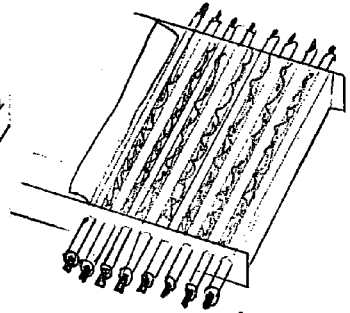
Figure 27J:
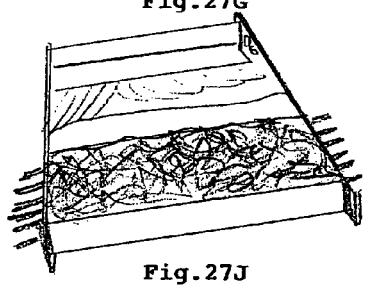
Figure 27K:
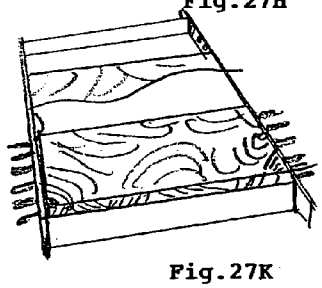
Figure 27L:
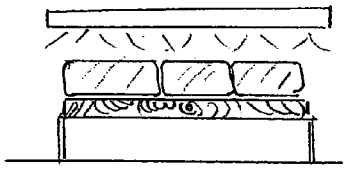

A summary of the manufacturing process for the cellular plates (a similar process was followed for the cellular beams) is shown in FIG. 27A to 27L. The biocomposite material was prepared for manufacturing by pouring the resin over the fibers, and mixing the two materials together by hand until the material was consistent (FIG. 27A). A layer of material was then placed on the bottom of the mold followed by a layer of rods (FIG. 27B). Another layer of material was then placed on top of the rods, and compacted in the voids between the rods. This procedure was repeated until all the layers of rods had been placed in the mold. Because of the small size of the voids between the rods a low fiber weight fraction was required for the material so the material could be evenly distributed throughout the sample and properly wet-out. For the hybrid plates, the fiber fabrics were initially placed inside the mold after they were impregnated with resin. Once all the material and rods were positioned in the mold, a top layer of Teflon paper was placed on top of the sample. Steel plates and weights were then placed on the mold to uniformly compact the top layer of the sample, and to obtain a flattop surface. All samples were oven cured using a cycle of 100° C. for 2 hours, followed by 150° C. for 2 hours. Three-dimensional cellular arrangements can be achieved by incorporation of hollow spheres or other pre-shaped void spacers into the fiber/resin mix and placement into the mold.

The flexural characterization of the cellular beams and plates was done through flexural test setups mounted on an MTS loading frame. The beams were tested in four-point bending with a total span of 457 mm, using an actuated loading fixture that applied the two point loads 102 mm apart, with 178 mm shear spans (FIG. 28A). The plates were tested in three-point bending with a shear span of 267 mm (FIG. 28B). The samples were supported using a fixture made of a steel I-beam and adjustable roller supports. To avoid local deformations (crushing), aluminum strips were placed underneath each sample at the roller supports. The laboratory testing setups used for both the cellular beams and plates are shown in FIG. 29. All test units were loaded monotonically up to failure in displacement control at a deformation rate 0.01 mm/sec. The deflection of the beams and plates was measured at mid-span using an externally mounted extensometer, and the internal LVDT of the loading frame. The applied load was measured using an internal 12 kN load cell.

Figure 31:
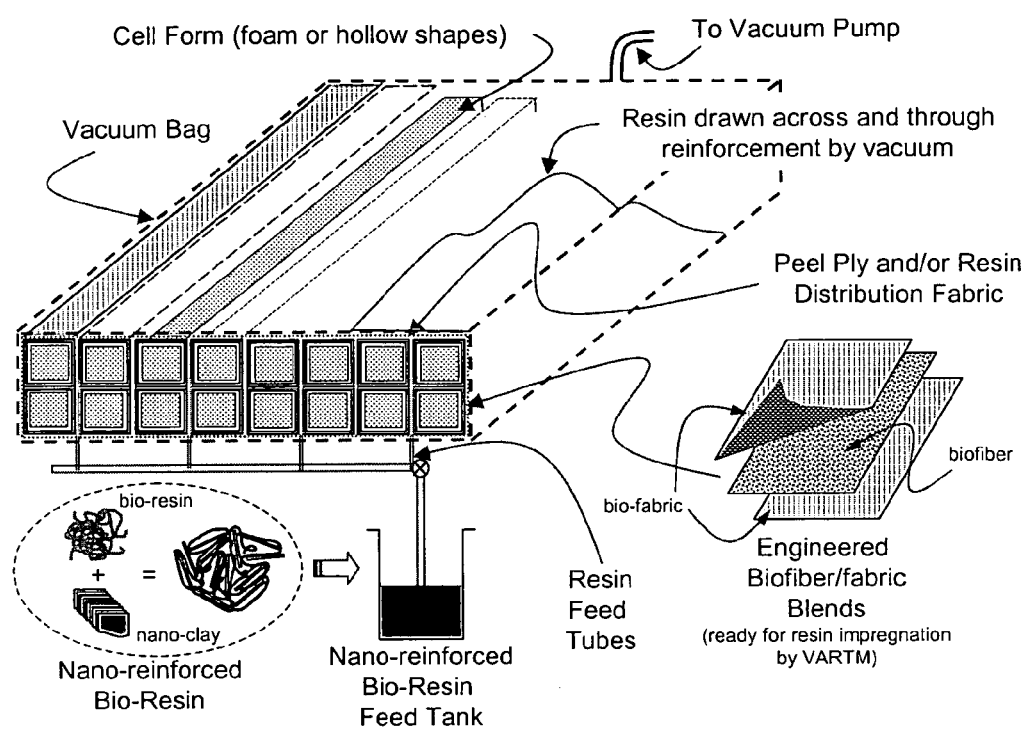
FIG. 31 is a schematic drawing of VARTM manufacturing of full-scale composite panels.

All cellular beam and plate samples behaved linear-elastically up to failure (FIG. 30), failing in a sudden and brittle manner with no cracking or noise before failure. The mode of failure was tensile rupture of the bottom layer of material of the structure for all samples, including the hybrid plates. All beams and plates exhibited small deformations up to failure with exception of the hybrid cellular plate with a bottom layer of unidirectional carbon (see FIG. 31). The plate with unidirectional carbon showed large deflections near failure due to the large strength capacity provided by the carbon fibers. The increase in strength is a result of the high properties of the carbon fibers, efficient placement of the material, and casting of the layer of fibers continuously with the cellular plate. There were no problems with crushing due to localized stress concentrations in any of samples.

The use of hybrid cellular plate systems improved both the stiffness and strength of the plates, as seen in FIG. 30. The hybrid plates with top and bottom layers of glass, and jute increased the strength of the cellular plate by 50%, while the stiffness remained constant (FIG. 30). The increase of strength due to the addition of top and bottom jute fiber layers is almost equal to the increase due to the use of glass fibers-layers (FIG. 30). This suggests the strength of the plate can be increased by adding natural, fiber layers, which maintains the "green" appeal of the biocomposite plates. The use of unidirectional glass or a closer weave natural fiber fabric may result in a stiffer fiber mat, thus increasing the stiffness of the plate as well as the strength.

The results in FIG. 31A show by adding only a bottom layer of carbon fiber to the cellular plate both the strength and stiffness are improved significantly. The carbon fiber is most efficient on the bottom of the plate because it prevents the progressive tensile rupture of the biocomposite material in this region, and improves the structural stiffness of the plate. Thus, the hybrid carbon plate increased the strength of the cellular plate by seven times, and almost doubled the stiffness (FIG. 31A). The hybrid carbon plate also improved the strength of the plate four and a half times over the hybrid glass and jute plates (FIG. 31B). The results show that by placing only a small amount of high performance material in the most efficient location the properties of the plate can be dramatically increased.

In addition to the improvement in strength and stiffness due to the use of hybrid systems, the casting of the fiber layers continuously with cellular plate eliminates failure due to delamination. Delamination failure typically occurs in sandwich panels where the top and bottom face sheets are bonded to the core material. The bond between the face sheet and the core creates a plane of weakness, which can lead to premature failure of the panel (Jones, *Mechanics of Composite Materials*. Taylor and Francis, Philadelpha, Pa. (1999)). None of the samples tested showed signs of delamination failure. Thus, by casting the top and bottom layers of fiber continuously with the cellular plate the strength is improved by eliminating delamination failure.

The effect of the cellular structure used for the cellular beams and plates is not clearly evident in the force-displacement results. The effect of the cellular structure on the performance of the beams is discussed in the following Examples. Clearly, the beams and plates with higher relative density, i.e. more solid material, will have a higher flexural stiffness. This trend is consistent with the results (FIG. 30).

SECOND SET OF EXAMPLES

A manufacturing pilot study was conducted with the objective of developing and evaluating an automated/industrial manufacturing method suitable for making large-scale biocomposite cellular beams and plates. The selected manufacturing method is the vacuum assisted resin transfer molding (VARTM) process. The study implemented the VARTM process in the manufacturing of hybrid biocomposite material sheets and hybrid biocomposite cellular plates.

The hand lay-up manufacturing methods for making the biocomposite material systems and cellular beams and plates were found adequate for laboratory-scale specimens. However, continuous and industrial manufacturing methods are needed to create full-size components suitable for actual use of cellular beams and panels. Of the several large-scale manufacturing methods available for conventional synthetic composite materials, vacuum assisted resin transfer molding (VARTM) is one of the most versatile and economical for the production of large composite components of arbitrary shape. The method allows for the manufacturing of solid pieces as well as components with voids, or cells and was thus identified as a suitable method for the manufacturing of the biocomposite cellular beams and panels.

In the VARTM process (FIG. 32), the dry reinforcement material is laid up dry on an open mould or preformed with the aid of templates or non-structural foams. Natural fibers are difficult to use in continuous manufacturing methods since they are short, typically intertwined, and "springy." However, proper treatment and separation of the fibers can allow use of conventional manufacturing methods for fiber-reinforced composites to be used. The short biofibers were stabilized through a novel concept by using engineered biofiber/fabric blends (FIG. 32). The engineered biofiber/fabric stack of materials can then covered with a peel ply, a resin transfer media, and a breather cloth. The dry stack is then vacuum bagged and resin is allowed to flow into the part. The resin distribution over the whole laminate is aided by resin flowing easily through a resin distribution layer, or resin transfer media. VARTM is a well-established cost-effective tooling process as it reduces tooling costs, allows large components to be fabricated and cellular structures can be produced in one operation leading to integral cellular sandwich panels (Stoll et al., "Manufacture of Fiber-Reinforced-Foam Composite Sandwich Structures," Proceedings of the ASC 16$^{th}$ Annual Technical Conference, Blacksburg, Va. (9-12 Sep. 2001)). The method is relatively simple and large construction projects can be manufactured on-site. The use of VARTM for natural fiber composites using non-woven reinforcement mats has been documented in the literature (O'Dell 1997).

Figure 33A:
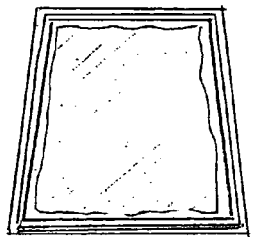
FIGS. 33A to 33L are drawings of a VARTM setup for hybrid biofiber/fabric plates.
Figure 33B:
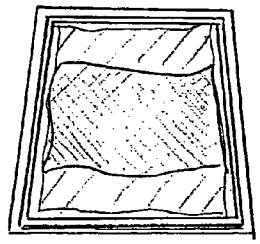
Figure 33C:
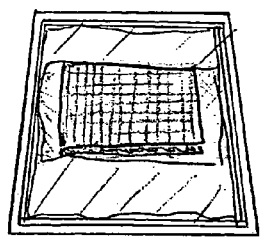
Figure 33D:
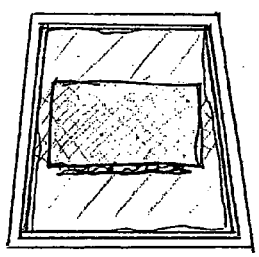
Figure 33E:
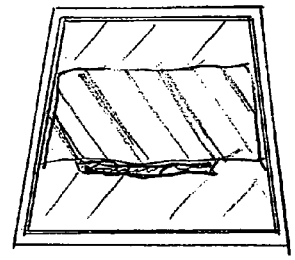
Figure 33F:
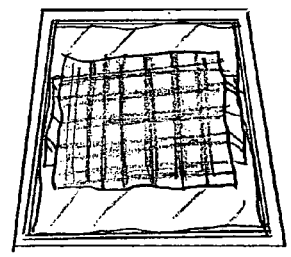
Figure 33G:
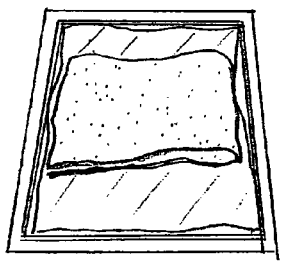
Figure 33H:
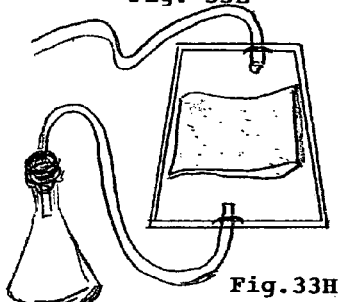
Figure 33I:
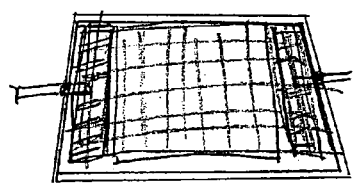
Figure 33J:
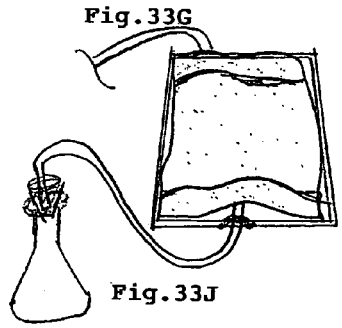
Figure 33K:
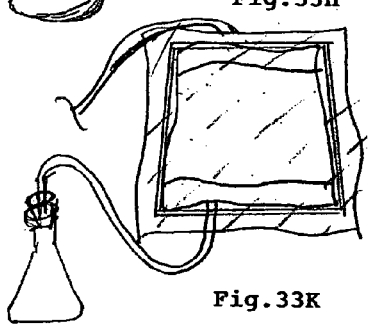
Figure 33L:
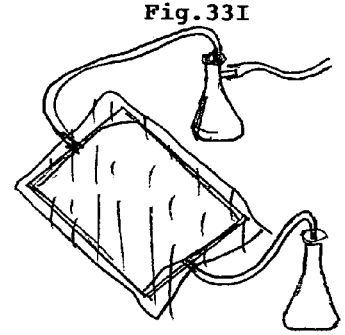

As previously mentioned, a problem for the use of biofibers is their "springy" nature, which makes it difficult to align and to impregnate with resin in a controlled manner. Pre-formed dry hybrid hemp/jute biofiber/fabric (hemp core with top and bottom fiber mat face sheets) engineered blend were thus prepared (FIG. 33A). In addition, it was found that adequate fiber placement, high fiber volume fraction, and compact manageable fabrics could be obtained through preforming of the engineered biofiber/fabric material stack. Preforming was achieved by compressing the assembled biofiber/fabric blend under 80 psi of pressure at 100° C. for 5 minutes (FIG. 33B and FIG. 33C). The pressure forces the release of lignin, the natural binding compound in natural fibers, and the temperature cures this natural adhesive. This procedure compacts and binds the short hemp fiber core to the biofabric thus reducing the overall thickness, increasing fiber volume, and holding the short fibers in place for ease of handling.

Figure 34A:
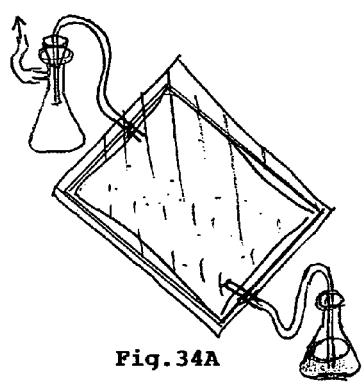
FIGS. 34A to 34F are drawings of the method of resin infusion in hybrid biofiber/fabric plate.
Figure 34B:
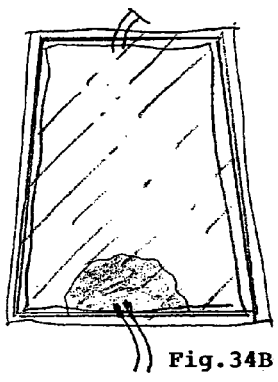
Figure 34C:
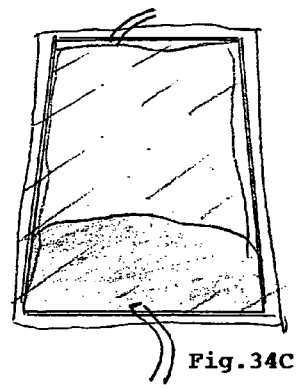
Figure 34D:
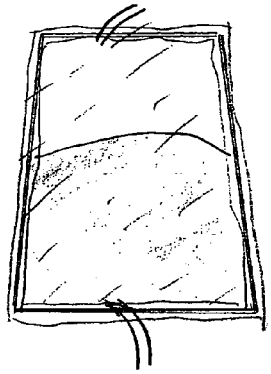
Figure 34E:
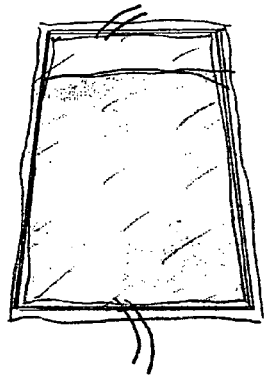

The VARTM setup was prepared on a movable cart with a vacuum pump on the bottom of the cart, and the mold and sample on the top surface. The mold was prepared by first placing a strip of sealant tape on the edge of the steel plate mold (FIG. 34A). A layer of non-porous Teflon release ply was placed over the mold to prevent the sample from sticking to the mold after curing (FIG. 34A). The paper backing was left on the tape so additional bagging materials could be added to the mold without sticking to the tape. A porous Teflon peel ply was placed on top of the release ply where the sample was positioned (FIG. 34B). The dry hemp/jute hybrid bio-fabric pre-form was then place on the porous peel ply (FIG. 34C). Another layer of porous peel ply was then placed on top of the bio-fabric to allow excess resin to be squeezed out under vacuum pressure (FIG. 34D). A porous bleeder ply (polyester cloth) was placed on top of the peel ply to absorb excess resin from the sample (FIG. 34E).

Figure 34F:
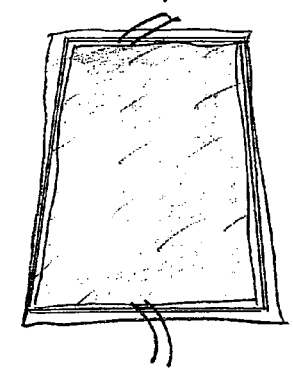

Resin transfer media (high density polyethylene, green house shade cloth) was place on top of the bleeder ply to promote uniform flow of the resin through the sample (FIG. 34F). A breather ply was then placed over the resin transfer media to absorb excess resin from the sample (FIG. 34G).

After the sample was layered in the vacuum bagging materials, the resin and vacuum ports were connected to the sealant tape by splicing the sealant tape cover and attaching the tubes with additional sealant tape (FIG. 34H). The resin and vacuum ports were covered with additional resin transfer media to improve transfer and prevent the vacuum bag from blocking the ports (FIG. 34I). The additional resin transfer media was covered with breather cloth to further prevent the vacuum bag from blocking the ports (FIG. 34J). The sealant tape cover was then removed and the vacuum bag was attached to the mold (FIG. 34K). Polyester resin was added to the resin reservoir, and the resin trap was connected to a pressure gauge, which was connected to a cryogenic trap (FIG. 34L). Finally, the cryogenic trap was filled with dry ice and acetone to condense and trap any vapors (styrene) from traveling to the pump. An overview of the complete setup is shown in FIG. 34L.

The sample was compressed under full vacuum pressure before the resin was injected into the mold (FIG. 35A). This was possible by using a control valve for the resin supply. The viscosity of the resin was reduced by adding 10% styrene by weight of resin to improve the flow and distribution of the resin through the sample. Additional catalyst was added to the resin (3% MEKP by weight of resin) to decrease the resin gelling time, and to allow the sample to gel while under vacuum pressure in the mold. The progress of the resin flow front through the sample is shown in FIG. 35B-F.

At the beginning of resin transfer the entire sample was already under full vacuum pressure (FIG. 35B). The initial resin flow front followed a fan like pattern from the resin port (FIG. 35B). As the flow front approached the middle of the sample the flow became more uniform (FIG. 35C), and as the resin moved through the sample the flow became uniform across the sample (FIG. 35D). The flow front of resin remained uniform as it passed through the sample, and remained within the bound of the resin transfer media (FIG. 35E). The resin supply was shut of one 75% of the sample had been infused with resin. Complete impregnation of the sample was achieved in eight minutes (FIG. 35F).

Once the sample was completely impregnated with resin, the sample was left under vacuum pressure until the resin began to gel (~40 minutes). The sample was removed from the VARTM setup for curing by detaching the ports from the mold. The sample was cured in an oven with the mold and the vacuum bagging materials for 6 hours at 100° C. A lower curing temperature was used to avoid melting the resin transfer media, which is made of high-density polyethylene. Steel plates were placed on the sample during curing to improve the density and quality of the sample.

The resulting VARTM manufactured hybrid plate sample is shown in FIG. 36. The entire sample was uniformly wet out with resin, and contained a uniform distribution of core fiber material. The sample had a fiber weight fraction of 45%, which was much higher than the reinforcement content obtained through compression molding (27%). These performing technique in combination with the VARTM manufacturing process led to a high quality (high fiber content) hybrid biofiber plate. The use of a pre-compressed bio-fabric resulted in a more compact and flat sample compared to un-preformed fabrics (FIG. 33C). By shutting off the resin supply once ¾ of the sample was infused with resin the fiber weight percentage of the sample was reduced. In addition, by leaving the sample under vacuum pressure after injection excess resin was removed from the sample.

Two cellular plates were manufactured through VARTM using the same hybrid hemp/jute biofiber/fabric performs described previously. The hybrid performs, composed of loose hemp fibers sandwiched between to layers of material (micro-sandwich material system), helped to control the placement of the material in the mold before resin infusion. It should be noted that the micro-sandwich material system composed of the hybrid biofiber/fabric blend could be composed of or other natural fibers with mats of either natural or synthetic fibers.

Figure 37A:
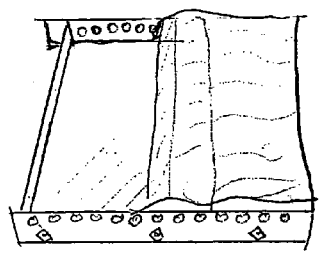
FIGS. 37A to 37L are drawings of a sample preparation for VARTM manufacturing of a hybrid biocomposite cellular plate.
Figure 37B:
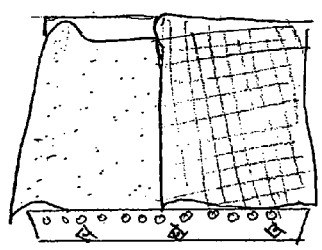
Figure 37C:
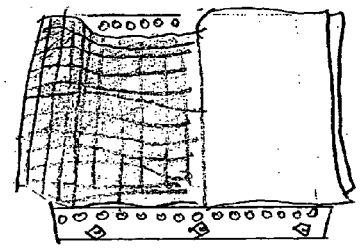
Figure 37D:
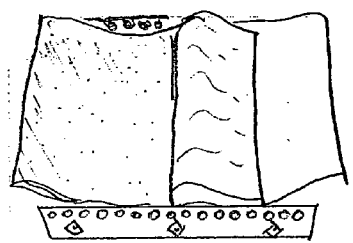
Figure 37E:
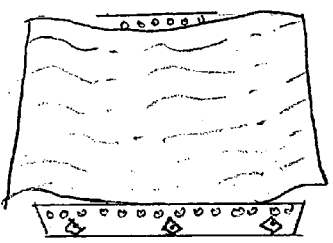
Figure 37F:
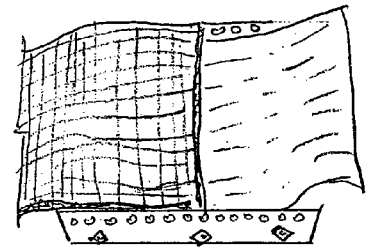
Figure 37G:
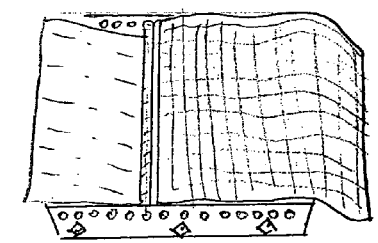
Figure 37H:
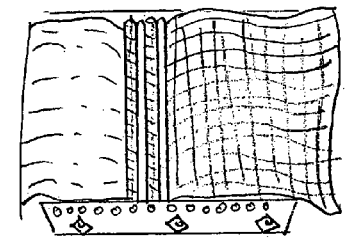
Figure 37I:
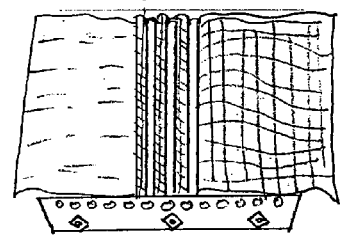
Figure 37J:
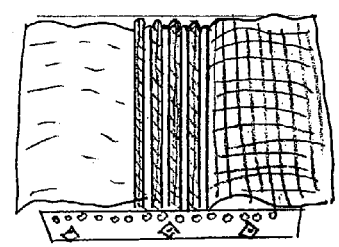
Figure 37K:
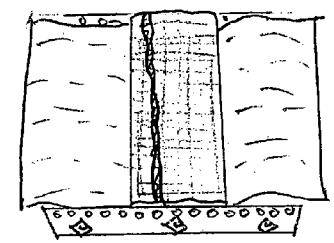
Figure 37L:
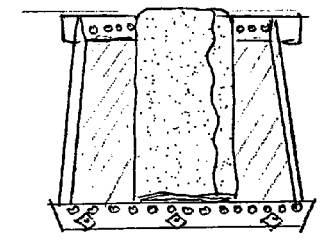
Figure 38A:
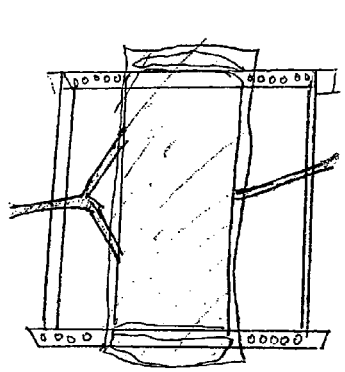
FIGS. 38A to 38F are drawings of a setup for VARTM of hybrid biocomposite cellular plate.
Figure 38B:
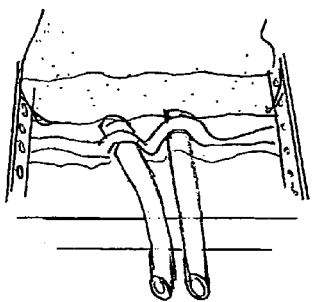
Figure 38C:
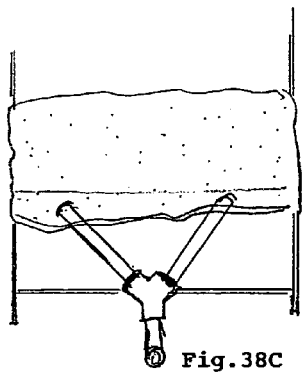
Figure 38D:
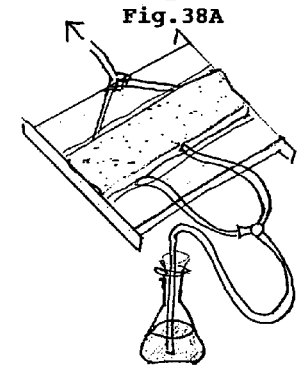
Figure 38E:
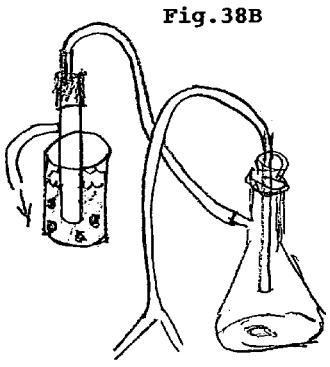
Figure 38F:
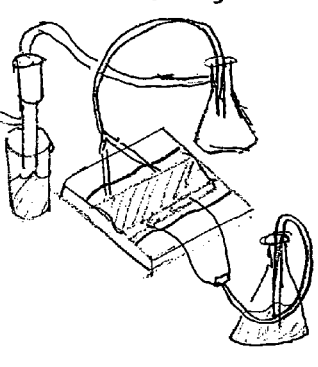

For the pilot VARTM studies, a cellular geometry with standard circular cells was chosen. The same mold as that used in the hand lay-up procedure was used (see FIG. 26D). The cells were created by draping the engineered perform around the rods of the removable rods in the mold and extending a straight segment in the top and bottom of the section to create the face sheets (see FIG. 37). The two manufactured cellular plates differed only in the arrangement of the fabric blends around the cells (FIG. 37). One design used separate fabrics for the web core, and the to and bottom face sheets (FIG. 37A), while another concept used a continuous fabric blend that from the face sheets into the sample core (FIG. 37B). The use of pre-compressed biofabric strips improved the workability of the material when wrapping around the rods to make the core of the sample. In weaving the hybrid fiber mats in the core, areas not filled by the mat could be filled using short loose fibers (such as flax) to fill any voids in the sample and avoid resin-rich areas at corners.

The same setup procedure and arrangement of vacuum bagging materials as that used for the flat plates was used for the cellular plates (FIG. 38A-L). However, the distribution media, and the corresponding peel and breather plies were placed both at the top and bottom of the sample to ensure proper resins infusion of the sample core. The resin infusion materials were thus wrapped around the sample and lapped over each other on the top of the sample (see FIG. 38A-L).

Figure 39A:
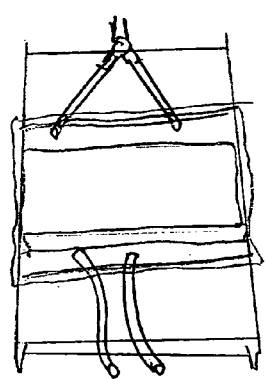
FIGS. 39A to 39F are drawings of a vacuum assisted resin infusion of cellular biocomposite plate.
Figure 39B:
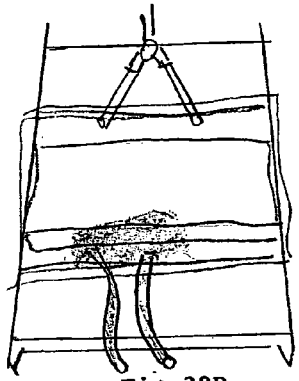
Figure 39C:
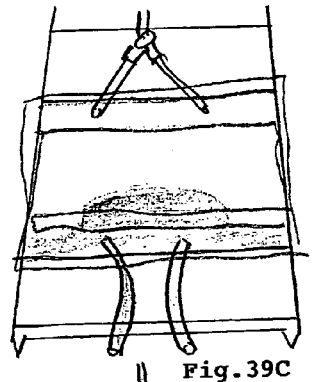
Figure 39D:
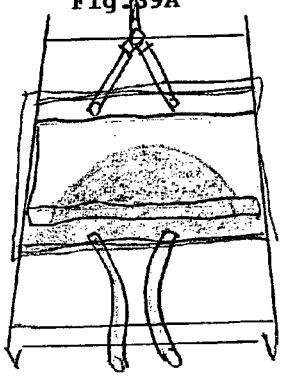
Figure 39E:
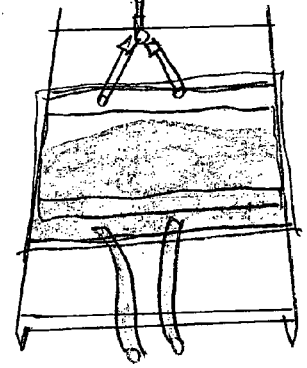
Figure 39F:
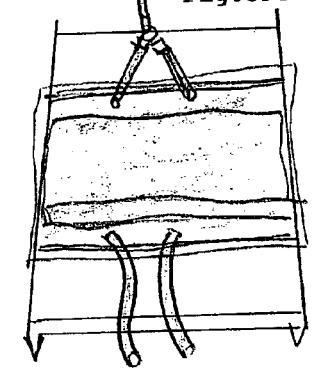

The vacuum bag was taped to the body of the cellular plate mold, and around the faceplate and rods. The faceplates were attached to the body of the mold using sealant tape to achieve vacuum pressure in the bag. To ensure the rods did not puncture the bag when vacuum pressure was applied, the rods were wrapped in breather cloth (FIG. 39A). Two ports were used for both the resin supply and for the vacuum (FIG. 39A). The resin and vacuum ports were covered with additional resin transfer media to improve transfer and prevent the vacuum bag from blocking the ports (FIG. 39B and FIG. 39C). Resin flow was controlled by means of a valve on the resin supply tube (FIG. 39D). A cryogenic trap with filled with dry ice and acetone was used to condense and trap any vapors (styrene) from traveling to the pump (FIG. 39E). An overview of the complete setup is shown in FIG. 39F.

Figure 40A:
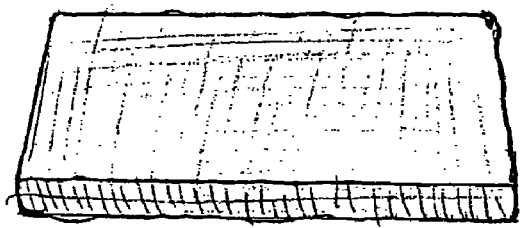
FIGS. 40A and 40B are drawings of a VARTM cellular plate with standard cell arrangement (40% fibers by weight).

The samples were compressed under full vacuum pressure before the resin was injected into the mold (FIG. 40A). This was possible by using a control valve for the resin supply. The viscosity of the resin was reduced by adding 10% styrene by weight of resin to improve the flow and distribution of the resin through the sample. No catalyst was added to the resin since early gelling of the resin is not needed due to the slower resin flow through the cellular plate due to the higher fiber content. The progress of the resin flow front through one of the samples is shown in FIG. 40A-F.

Figure 40B:
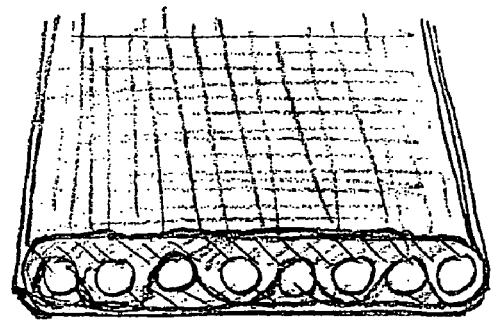

At the beginning of resin transfer the entire sample was already under full vacuum pressure (FIG. 40B). The initial resin flow front followed a fan like pattern from the resin ports (FIG. 40C-E). Once the sample was completely impregnated with resin (FIG. 40F.), the samples were left under vacuum pressure until the resin began to gel (~25 minutes). The samples were removed from the VARTM setup for curing by detaching the ports from the mold. The samples were cured in an oven with the mold and the vacuum bagging materials for 6 hours at 100° C. Again, a lower curing temperature was used to avoid melting the resin transfer media, which is made of high-density polyethylene. Steel plates were placed on the sample during curing to improve the density and quality of the samples.

Figure 41:
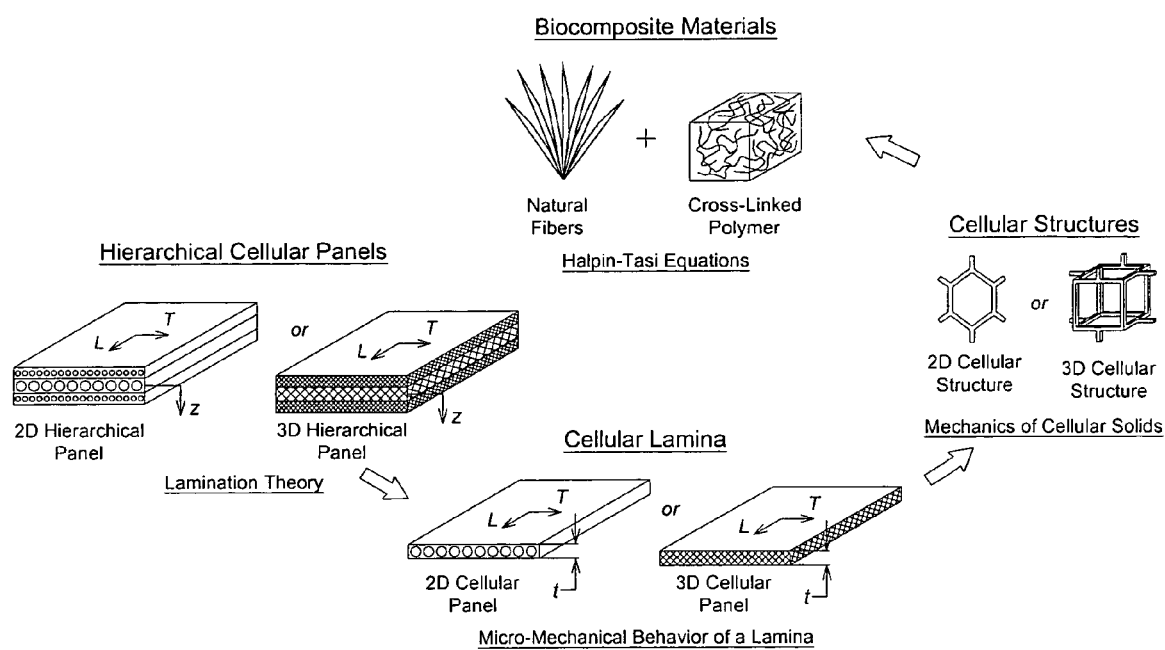
FIG. 41 illustrates an overview of analysis method for hierarchical hybrid cellular composite beams and panels.

The resulting cellular plates had a fiber weight fraction of 40% and 37% (FIG. 41). Using the VARTM process allowed using approximately 150 grams of fibers, compared to only 50 grams used to produce a typical hand lay-up cellular plate. Adequate fiber wet-out throughout the sample was observed through the entire depth. The top surfaces of the jute fabric did not have a neat resin layer. The reason is that the vacuum pressure removes any excess resin in the grid spaces of the coarse jute fabric. A neat resin layer is usually desired for durability purposes. Since this layer is not structural, it can be easily added after the component is manufactured through a brush or spray-on process. Alternatively, the use of a denser outer fabric will ensure uniform resin wet-out and a more uniform outer resin layer distribution.

This section has summarized a pilot study to prove the feasibility of using automated/industrial manufacturing methods for the fabrication of the developed hybrid cellular biocomposite beams and panels. The VARTM process was selected as the most efficient method for this purpose and manufacturing laboratory-scale flat hybrid biocomposite plates as well as hybrid cellular biocomposite plates proved the feasibility of using this method. The scale-up of the VARTM process to large-scale components was discussed in the concept overview and shown schematically in FIG. 32. Based on the success experienced in manufacturing the laboratory-scale samples through VARTM, the scale-up of the process to full-size components is deemed both practical and realistic. Finally, it should be noted that while the discussion and feasibility demonstration above deal with a flat panel, the process can be applied to any desired three-dimensional contoured configuration.

The material and structural experimental characterization efforts described were accompanied by the development and calibration of analytical tools with the objective of serving as preliminary tools for: a) validation of the experimental studies, b) parametric and feasibility studies, and c) design optimization. As discussed in the introduction section, the proposed concept makes use of cellular architectures to enhance the properties of natural fiber reinforced composites for structural applications. The analytical tools were thus developed through the material discretization continuum present in the cellular biocomposite beams and panels.

Figure 42:
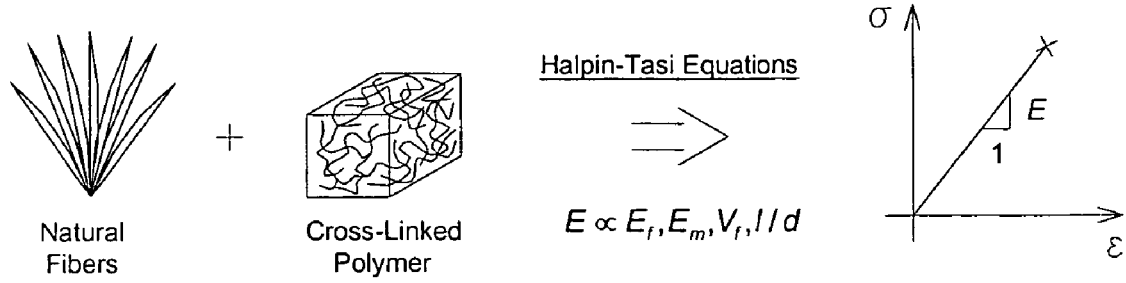
FIG. 42 is a schematic of the analytical determination of micro-material system properties.

As shown in FIG. 42, a hierarchical cellular biocomposite panel can be thought of as being composed of a series of bonded layers, or lamina, each of them featuring a particular material cellular architecture. Thus, the properties of the entire hierarchical cellular panel, or laminate, can be determined by integrating the properties of each one of the representative cellular material lamina. Each of the cellular lamina layers is considered to feature a predominant cellular architecture such that its properties can be determined. The properties of a two- or three-dimensional cellular material can be determined from consideration of the cell microstructure, which includes the material properties of the solid material making the cellular solid and the architecture of the cells. Finally, the properties of the solid material are those of the base biocomposite material, which is composed of randomly oriented short fibers embedded in a polymer matrix. The properties of the biocomposite will depend on the individual properties of the fibers and resin as well as the geometry of the fibers and the percentage of fibers to resin in the composite.

The performance of the resulting cellular biocomposite panels can thus be determined by integrating the above mentioned analysis levels (FIG. 42). A brief summary of each of these levels of analysis and their influence on the response and efficiency of the proposed hybrid cellular biocomposite beams and panels is provided.

Randomly Oriented Short Fiber Composites

Overview of Analytical Models

The properties of the base biocomposite material system are determined by a micro-material system analysis of the natural fiber reinforced composite system. The material properties of fiber-reinforced composites are dependent on the individual properties of the fiber and polymer, the percentage content of each component (neglecting voids and other impurities), and the aspect ratio (i.e., the length to diameter ratio) of the fiber reinforcement. This concept is schematically depicted in FIG. 41. Of course, other issues not considered here such as curing temperature, fiber adhesion characteristics, temperature, moisture, long term response, etc., will also impact the properties of the composite.

Figure 43:
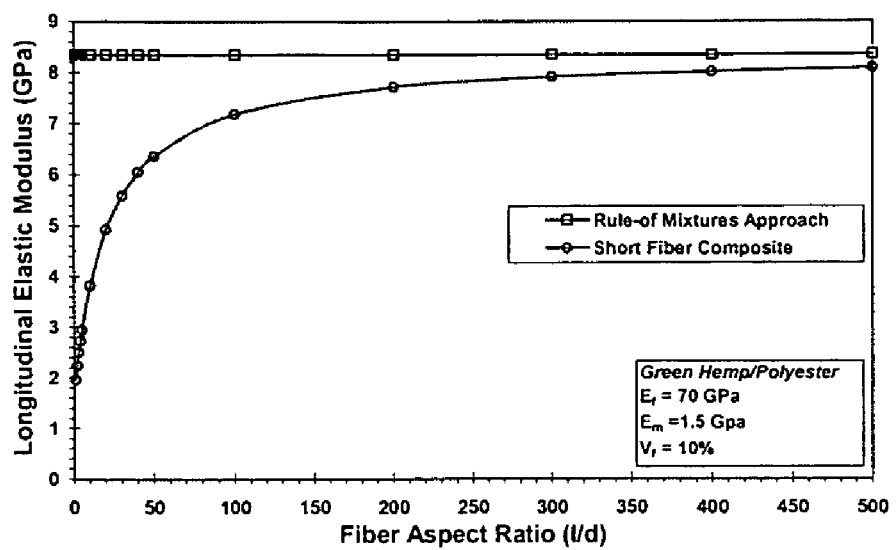
FIG. 43 is a graph showing the effect of fiber aspect ratio on the longitudinal stiffness of short fiber composites.

The micro-material system properties for short fiber composites were studied with available mechanics models for fiber composites. The first issue to be addressed for the biocomposite material systems under consideration is the effect of the fiber geometry on the material properties of the composite. The effect of the fiber aspect ratio on the elastic modulus of a unidirectional composite can be modeled using the Halpin-Tsai equations. This effect is shown in FIG. 43, where the modulus of elasticity, in the fiber or longitudinal directions, is plotted against the fiber aspect ratio using both the Halpin-Tsai equations, and the "rule of mixtures". The material modeled in FIG. 43 is the green hemp/polyester composite used for cellular beam and plate manufacturing. The plot shows that for low fiber aspect ratios there is a significant reduction in the modulus of elasticity, where as for large aspect ratios (l/d>500) the Halpin-Tsai equations approach the results from the rule of mixtures.

Figure 44:
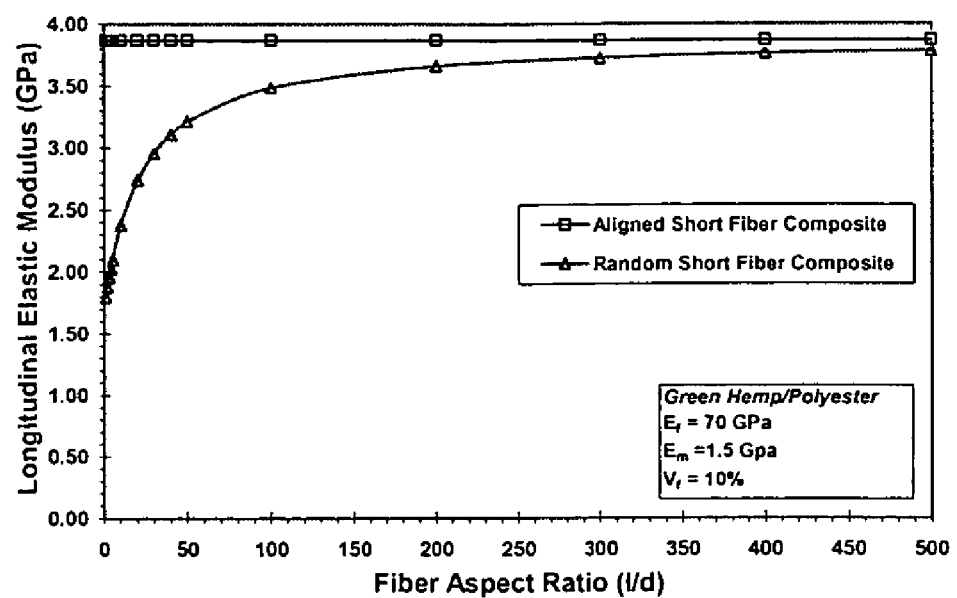
FIG. 44 is a graph showing the effect of fiber aspect ratio on the longitudinal stiffness of randomly oriented short fiber composites.

Random fiber orientation is modeled using the "laminate approximation" by Halpin and Pagano. This approach models a randomly orientated fiber composite as a quasi-isotropic laminate. The laminate approximation model is simple compared to more rigorous models, but yields results close to the measured results for the materials tested in this study. The Halpin-Tsai equations that account for the fiber aspect ratio were used to model the properties of the unidirectional material from which the "laminate" is made. Thus, the effect of the fiber aspect ratio on the modulus of the randomly orientated material is similar in trend to the effect in a unidirectional material (FIG. 44). Notice the reduction in modulus when the fiber orientation is random. For the unidirectional material the modulus (using the rule of mixtures) is 8.3 GPa, while for the randomly oriented material the modulus is 3.85 GPa. Thus, the modulus of a randomly oriented composite decreases by a factor of 2.

Figure 45:
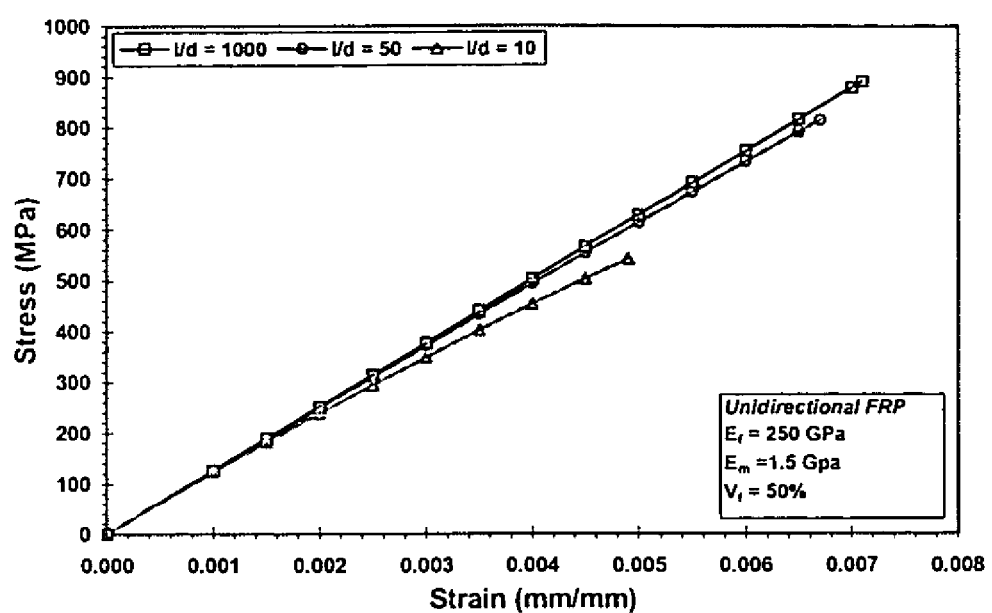
FIG. 45 is a graph showing the effect of fiber aspect ratio on the stress-strain response of short fiber composites.

The effect of the fiber aspect ratio on the stress-strain response of a unidirectional fiber composite can be accounted for using the model by Piggott. This stress-strain model accounts for slip between the fibers and the matrix, which is dependent on the aspect ratio of the fibers. The model by Piggott was used to generate stress-strain curves for three unidirectional composites, with varying fiber aspect ratios (FIG. 45). A stiff fiber composite is used for this figure because the effect of the fiber aspect ratio on strength and stiffness is more clearly shown. As the fiber aspect ratio decreases, both strength and stiffness decrease (FIG. 45). The stress-strain curve also becomes non-linear near failure, as the fiber aspect ratio decreases, due to slip between the fibers and the matrix. For a large fiber aspect ratio (l/d>1000) the results approach a linear curve, as predicted by a "rule of mixtures" approach.

The strength of a unidirectional fiber composite can be calculated using the modeled by Piggott. This unidirectional strength can then be used in calculating the strength of a randomly orientated fiber composite. This is accomplished using a "rule of mixtures" type approach for a randomly orientated fiber composite. For this model, the Tsai-Hill equation for the strength of a unidirectional fiber composite at any given orientation is used. The strength equation is then integrated over all possible orientation, and then averaged over the orientation range used. Because of the complexity of the strength function used, integration must be performed numerically. Of course, this model assumes an equal amount of fibers are orientated at every orientation, which may not be the case. Thus, the strength predictions may be largely above or below measured results.

Comparison with Measured Values

Figure 46:
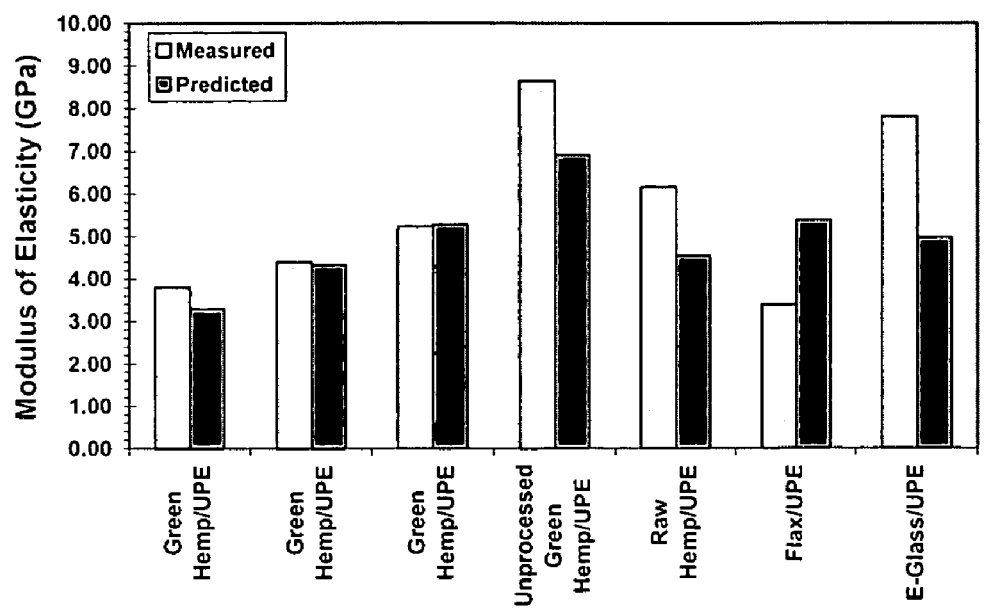
FIG. 46 is a graph showing the comparison of measured and predicted modulus of elasticity.

The above analytical models were used to predict the stiffness (modulus of elasticity), and ultimate strength of the material tests. The Halpin-Tsai model for the stiffness of short fiber composites used with the Halpin-Pagano model for randomly orientated fiber composites predicts the measured results well (Table 20). The only large deviation between the two is in the flax and E-glass materials (FIG. 46), which may be due to issues not considered by the models such as adhesion between the fibers and the matrix.

TABLE 20

Measured and predicted modulus of elasticity

| Sample | E measured (GPa) | $V_f$ (%) | L/d (—) | E predicted (GPa) | % Error (%) |
|---|---|---|---|---|---|
| Green Hemp/UPE | 3.81 | 10 | 60 | 3.29 | 14% |
| Green Hemp/UPE | 4.40 | 13 | 60 | 4.34 | 1% |
| Green Hemp/UPE | 5.23 | 20 | 60 | 5.27 | 1% |
| Unprocessed Green Hemp/UPE | 8.65 | 25 | 125 | 6.90 | 20% |
| Raw Hemp/UPE | 6.15 | 15 | 100 | 4.54 | 26% |
| Flax/UPE | 3.37 | 30 | 15 | 5.37 | 59% |
| E-Glass/UPE | 7.80 | 15 | 467 | 4.96 | 36% |

The Piggott model for the strength of a unidirectional fiber composite was used with a rule of mixtures approach to predict the measured strength values. The randomly orientated fiber composite strength model used poorly predicted the measured strength values (Table 21). In all cases the strength is overestimated by 3 to 4 times the measured values. Errors may be due to defects in the tested samples, which may cause low measured strength values, or overestimation of the strengths of the fibers and matrix.

TABLE 21

Measured and predicted ultimate tensile strength

| Sample | $\sigma_{ult}$ measured (MPa) | $V_f$ (%) | L/d (—) | $\sigma_{ult}$ predicted (GPa) | % Error (%) |
|---|---|---|---|---|---|
| Green Hemp/UPE - 13% | 14.47 | 10 | 60 | 63.00 | 335% |
| Green Hemp/UPE - 17% | 14.91 | 13 | 60 | 66.28 | 344% |
| Green Hemp/UPE - 25% | 16.79 | 20 | 60 | 72.85 | 334% |
| Unprocessed Green Hemp/UPE | 10.08 | 25 | 125 | 77.29 | 667% |
| Raw Hemp/UPE | 19.49 | 15 | 100 | 68.70 | 253% |
| Flax/UPE | 13.31 | 30 | 15 | 76.10 | 472% |
| E-Glass/UPE | 34.70 | 15 | 467 | 69.14 | 99% |

Cellular Materials

Figure 47:
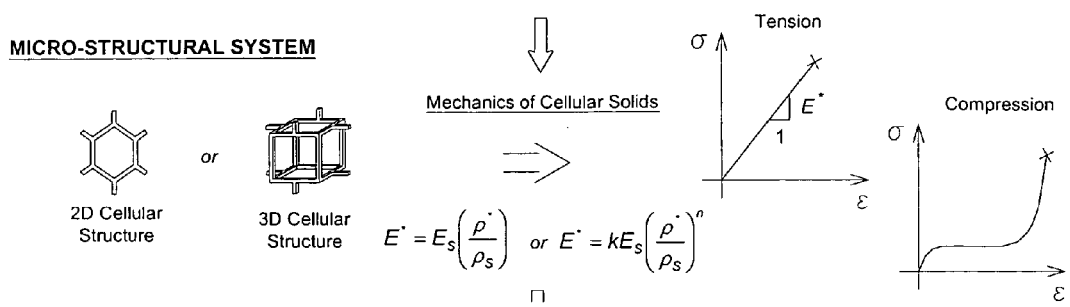
FIG. 47 is a schematic of the analytical determination of micro-structural cellular material system.

Once the properties of the base material system have been determined, the properties of a lamina with characteristic cellular structure in the cellular biocomposite panel can be determined through the mechanics of cellular solids as schematically depicted in FIG. 47.

Figure 3A:
FIGS. 3A to 3C are photographs of sandwich structures and cellular materials in nature.
Figure 3B:
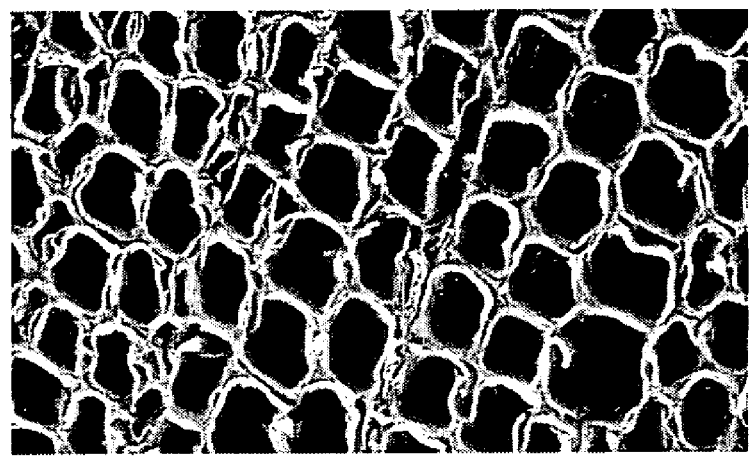
Figure 3C:
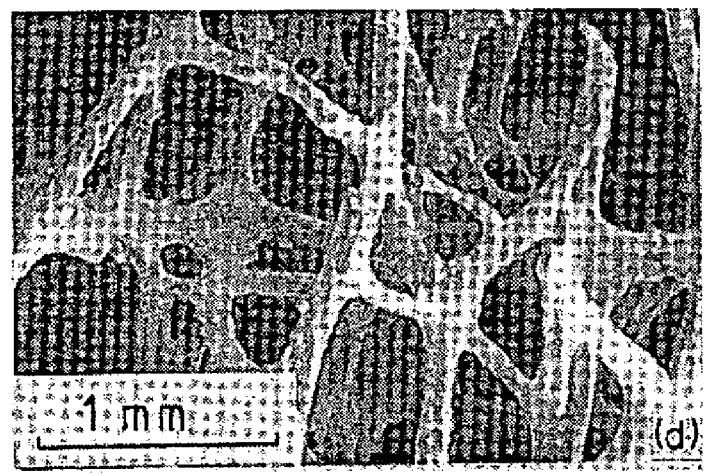

A cellular solid is one made up of an interconnected network of solids struts or plates that form the edges and faces of the cells (FIG. 3). Polymers, metals, ceramics, glasses, and even composites can be fabricated into cells. The cell structure of cellular solids ranges from the near-perfect order of the bee's honeycomb to the disordered three-dimensional networks of sponges and foams. Proper design requires detailed modeling and understanding of the cell structure and the material response.

While there are several approaches to the mechanics of cellular solids, Ashby and Gibson (1988) have effectively shown that the mechanical properties of cellular solids can be described using structural mechanics to determine their properties such as stiffness and strength. The properties of a 2D honeycomb can be described by analyzing the response of a unit hexagonal cell (see FIG. 48A) while the behavior of the more complex 3D foam-like materials has been shown to be adequately described by the response of the unit cubic cell shown in FIG. 48B and FIG. 48C (Gibson and Ashby 1988).

The mechanical response of cellular solids can then be studied by consideration of its interconnected array of one-dimensional members (FIGS. 48A, 48B and 48C). In the elastic response, it has been shown that the properties are governed by bending of the cell edges. Certain cellular materials can be stretched or compressed to very high strains thus exceeding the assumptions of linear elasticity. This nonlinear elastic response, or densification, can be quantified by considering the elastic buckling of the cell struts and/or walls in the cell structure. Cellular structures made from materials which have a plastic yield point (rigid polymers or metals) will collapse plastically when loaded beyond the linear-elastic regime. This plastic collapse and densification can be quantified by considering the formation of plastic hinges in the cell struts (2D cells) or cell edges (3D cells). On the other hand, the densification of brittle materials (ceramics or brittle polymers) is governed by the brittle crushing oracture of the cell struts or walls.

The mechanical modeling as described above has led to the development of expressions to describe the properties (i.e., density, stiffness) and capacities (i.e, stability, strength) of open-cell solids. In their simplest form, these expressions have been shown to have the general form (Gibson and Ashby 1988):

$$\frac{S^*}{S_s} = K\left(\frac{\rho^*}{\rho_s}\right)^m \quad (1)$$

where S* is the property (i.e., stiffness, strength, Poisson's ratio, etc.) of the cellular solid and $S_s$ is the property of the solid from which the cell walls are made, and $\rho^*$ is the density of the cellular material and $\rho_s$ is the density of the solid from which the cell walls are made. The constant of proportionality K is typically determined from experimental data (Gibson and Ashby 1988).

Typical stress-strain curves for an elastic-brittle (as is typically the case for fiber-reinforced composites) cellular material is shown in FIG. 49 (Gibson and Ashby 1988). In compression, the cellular structure responds linear-elastically until the cells fail due to brittle fracture followed by a plateau of brittle crushing leading to densification (cell collapse) of the material. In tension, cellular materials made from brittle materials will exhibit abrupt failures in tension due to fracture, which is controlled by the largest defect (a crack, or notch) which then propagates through consecutive cells. Cellular structures composed of elastomeric or elastic-plastic materials will exhibit a smoother plateau of cell collapse in compression, and a plateau and stiffening in tension due to cell strut/wall alignment.

The most important characteristic of a cellular structure affecting its mechanical properties is its relative density, $\rho^*/\rho_s$, i.e. the density of the cellular material, $\rho^*$, divided by the density of the solid from which the cell walls are made, $\rho_s$. The higher the relative density for a cellular structure, the more solid material in the structure, resulting in increased mechanical properties. Despite their simplicity, these models have been shown to successfully model honeycombs as well as open and closed cell foams and they have provided the basis for more complex modeling assumptions and failure theories (Gibson and Ashby 1988).

Cellular Sandwich Structures

A sandwich structure (FIG. 50) is typically a low-density core material sandwiched between two high modulus face sheets to produce a lightweight panel with excellent stiffness (Allen 1969). The face sheets act like the flanges of an I-beam carrying the tensile and compressive loads due to bending. The core acts like the web of an I-beam carrying the shear loads. The core material provides the panel thickness, and is typically made of a cellular structure to minimize the weight of the panel (FIG. 51). Separation of the face sheets by the core increases the moment of inertia of the panel with little increase in weight. The thicker the core of the panel, the higher the stiffness and strength, for minimum weight gain. These concepts of cellular structures and sandwich plates are thus used to provide an efficient material arrangement for biocomposite structures.

Analysis

The analysis of periodic cellular beams and panels can be achieved by employing conventional mechanics of beams and plates with corresponding average properties of the cellular material. The properties of the cellular solid are obtained by the micro-mechanics concepts for cellular solids. Depending on the cell architecture of the cellular solid, the resulting properties may be isotropic (equal cells in all directions), orthotropic (two unique directions of performance) or anisotropic.

Flexural Performance

The efficiency of cellular sandwich structures depends on individual and collective behavior of the dense skins, the core and their connection (Evans et al. 2000 and Ashby and Gibson 1988). Engineering design generally seeks to maximize some aspect of performance. While performance can include a number of criteria, it is taken here to mean maximum stiffness or strength per weight. The performance for a load-bearing component depends on three things: the mode of loading, i.e. tension, bending, twisting (bending about the longitudinal axis in the case of beams), the properties of the material, and the shape of the section (Ashby 1991).

The performance of materials for a given design criteria can be compared by combining material properties to form material indices (Ashby 1991). Material indices are groupings of material properties which, when maximized, maximize some aspect of performance. The shape of a beam will affect the performance of the beam in bending. That is, hollow box or tube sections are more efficient than solid sections. The efficiency of different shapes can be quantified by defining a dimensionless shape factor (Ashby 1991). The value of the shape factor is not dependent size, only on the shape of the section.

Performance Indices

Material properties can be combined to form material performance indices, which are ratios of material properties that, when maximized, maximize some aspect of performance. The indices are derived from the design requirements for a component based on the function, objective, and constraint. For a beam where the objective is minimum weight for a given stiffness (light stiff beam), the material index is $$M_B^e = \frac{E^{1/2}}{\rho}, \qquad (2)$$

whereas for a beam where the objective is minimum weight for a given strength (strong light beam), the performance index is $$M_B^f = \frac{\sigma_f^{2/3}}{\rho}. \qquad (3)$$

Similarly, for a plate loaded in bending the performance indices for maximum stiffness per weight and maximum strength per weight are, respectively:

$$M_B^e = \frac{E^{1/3}}{\rho} \qquad (4)$$

$$M_B^f = \frac{\sigma_f^{1/2}}{\rho} \qquad (5)$$

The best material for the given design requirements is that with the largest value of the material index.

A comparison of the performance of common materials in bending is given in Table 22. Material performance indices work well for comparing materials, but they ignore the shape of the component. Thus, for materials with different cross-sectional shapes other factors must be used to quantify the efficiency.

TABLE 22

Material properties and performance indices for minimum weight.

| Material | Density ρ (kg/m³) | Modulus E (GPa) | Strength σ_f (MPa) | $E^{1/2}/\rho$ (—) | $\sigma_f^{2/3}/\rho$ (—) |
|---|---|---|---|---|---|
| Wood (spruce) | 490 | 15 | 45 | 7.9 | 25.8 |
| Concrete | 2300 | 25 | 30 | 2.2 | 4.2 |
| Carbon FRP | 1600 | 100 | 450 | 6.3 | 36.7 |
| Glass FRP | 1780 | 28 | 300 | 3.0 | 25.2 |
| Steel | 7850 | 210 | 1100 | 1.8 | 13.6 |
| Aluminum | 2700 | 69 | 130 | 3.1 | 9.5 |

Shape Factors

Sections of shaped material carry load more efficiently than solid sections do, where efficiency means that for a given loading condition the section uses as little material as possible, and is therefore as light as possible. To measure the shape and efficiency of a section, for a given mode of loading, shape factors have been developed by Ashby (1999).

A shape factor is a dimensionless number that characterizes the efficiency of the shape of a section, regardless of scale, for a given mode of loading. When the design is based on stiffness the shape factor for elastic bending is $$\phi_B^e = \frac{4\pi I}{A^2} \qquad (6)$$

where the superscript e means elastic and the subscript B means bending, I is the moment of inertia, and A is the area. When the design is based on strength (i.e., fracture or the onset of plastic yielding) the shape factor is $$\phi_B^f = \frac{4\sqrt{\pi}\, S}{A^{3/2}} \qquad (7)$$

where the superscript f means failure, and S is the section modulus (I/y). The two expressions for $\phi_B^e$, and $\phi_B^f$ have the same form, and are often similar in value.

Both shape factors are dimensionless, and depend only on shape. That is, large and small beams have the same shape factor value if their sections have the same shape, and are proportional. Solid, symmetric sections (circles, squares, etc.) will have shape factors close to 1, but elongated or I-shapes can have shape factor values of 15 or more (Table 23).

TABLE 23

Section shape factors (equal area)

| Shape | $\Phi_B^e$ | $\Phi_B^f$ |
|---|---|---|
| ● | 1.0 | 1.0 |
| ⊖ | 17.4 | 6.2 |
| ▨ | 1.1 | 1.2 |
| ▢ | 13.8 | 6.3 |
| ▯ | 18.0 | 6.8 |
| I | 17.0 | 7.8 |

Hollow sections thickness (t) is constant.
Asymmetrical sections long axis is 1.5 x the short axis These shaped sections are more efficient than the solids shapes in that less material is required to achieve the same bending stiffness and strength.

Performance Indices with Shape Factors

The performance-maximizing combination of material and shape, for a given mode of loading, involves both material indices and shape factors. Ashby (1999) derived indices for comparing the performance of beams of different material and shape. Thus, the best material-shape combination for a light stiff beam is that with the greatest value of the index:

$$M_1 = \frac{(E\phi_B^e)^{1/2}}{\rho}. \tag{8}$$

The best material-shape combination for a light strong beam is that with the greatest value of the index $$M_2 = \frac{(\sigma_f \phi_B^f)^{2/3}}{\rho}. \tag{9}$$

For constant shapes the indices will reduce to the corresponding material index. When beams differ in both the material and shape, the full indices in Equations 8 and 9 must be used.

Micro-Structural Shape Factor

The efficiency of a macroscopic shape can be improved by introducing shape on a small scale, microscopic shape. For example, a rectangular section made of a cellular material (microscopic shape) will have higher efficiency than a solid rectangular section (macroscopic shape). The additional efficiency of the micro-structural shape is characterized by microscopic shape factors (Ashby 1999).

Microscopic shape can be achieved through cellular structures. As previously discussed, the most important characteristic of a cellular structure affecting its mechanical properties is the relative density, $\rho^*/\rho_s$, i.e. the density of the cellular material, $\rho^*$, divided by the density of the solid from which the cell struts or walls are made, $\rho_s$. The higher the relative density for a cellular structure, the more solid material in the structure, resulting in increased mechanical properties but at an increased weight.

The efficiency of a micro-structural shape is characterized by microscopic shape factors. When the design is based on stiffness the microscopic shape factor for elastic bending is $$\psi_B^e = \frac{\rho_s}{\rho^*}. \tag{10}$$

In other words, the microscopic shape factor here is the inverse of the relative density. Note that, in the limit, for a solid micro-structure ($\rho^* = \rho_s$) $\psi_B^e$ takes the value of 1, as it clearly should.

When the design is based on strength the microscopic shape factor is $$\psi_B^f = \left(\frac{\rho_s}{\rho^*}\right)^{1/2}. \tag{11}$$

Shape factors ($\phi$) and microscopic shape factors ($\psi$) multiply for cross-sectional shapes that are made of a microscopic shape. Hence, light and efficient materials can be developed by introducing micro-structuring.

The effect of micro-structure can also be shown by including the microscopic shape factor into the material performance indices. Considering a cellular structure and using the microscopic shape factor, the performance index for maximum stiffness for a given weight for a cellular beam is given by rearranging equation 4 to give:

$$M_B^e = \frac{E^{1/2}}{\rho} = \frac{(E^*)^{1/2}}{\rho^*} = \frac{E_s^{1/2}}{\rho_s}\left(\frac{\rho_s}{\rho^*}\right), \tag{11}$$

while the performance index for maximum stiffness per weight for a plate or panel is similarly obtained by rearranging equation 5 to give:

$$M_B^e = \frac{E^{1/3}}{\rho} = \frac{(E^*)^{1/3}}{\rho^*} = \frac{E_s^{1/3}}{\rho_s}\left(\frac{\rho_s}{\rho^*}\right)^{2/3}. \tag{12}$$

Equations 11 and 12 above indicate that the performance index of a cellular beam and a cellular plate increase with the 1-power and 2/3-power of the microscopic shape factor, respectively (Huang and Gibson 1995).

Figure 52:
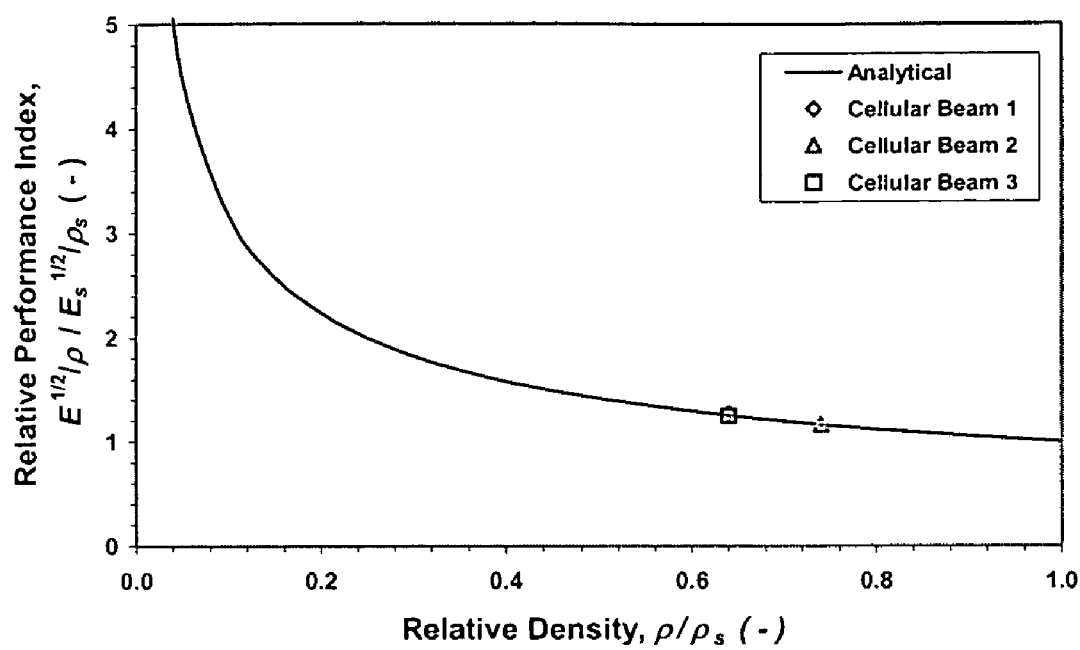
FIG. 52 is a graph showing the effect of relative density on the relative performance index.
Figures 54A, 54B:
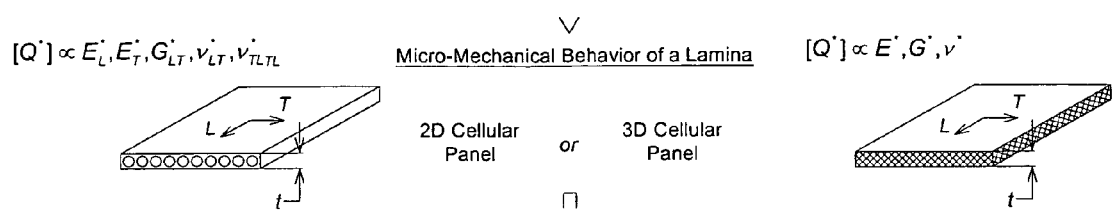
FIGS. 54A and 54B are illustrations showing a schematic of the analysis of a uniform cellular material layer.

The performance index of a micro-structured beam following equation 11 is shown in FIG. 52. The figure shows the theoretical trace for a biocomposite material system. The trace is accompanied by experimental data from the cellular biocomposite beam tests. Due to manufacturing constraints in the pilot study, the relative densities studied were very similar. Thus, the experimental data points are only in a limited region of the analytical trace. Nonetheless, the data has is consistent with the predicted performance.

Hierarchical Cellular Structures

Overview

Hierarchical cellular structures, which can be found in nature, can be used to further increase the stiffness and efficiency of a sandwich structure (Gunderson and Thorp 1993). This concept was analytically illustrated in the previous section by showing how cellular structures with micro-structural shape can further increase the efficiency of a shape in bending. This suggests that lightweight efficient materials and structures can be developed by micro-structuring the material.

While most well known man-made cellular materials are either stochastic or periodic, the scale of the cells is generally kept constant (Evans et al. 2000). In most natural materials this is not the case, as they exhibit structural detail on more than one scale by reducing the size of their characteristic material distribution or featuring structural elements which themselves have a structure (Lakes 1993, Nogata 1997). Human bone is a natural cellular sandwich with a rich hierarchical structure (Gibson and Ashby 1988, Gunderson and Thorp 1993, Nogata 1997). Its outer shell is made of dense, or compact, bone composed of large numbers parallel thin hollow pores. The core, or cancellous, bone is made up on an interconnected network of rods and plates. The overall behavior of bone is then dictated by the relative dimensions of these two mediums and the orientations of the three-dimensional cellular core structure. This structural hierarchy plays a major role in maximizing the efficiency of the resulting material and structural system.

Hierarchical cellular structures are complex microstructures that are designed to place material where most needed, i.e. in areas of high stress. As discussed earlier, combining a material with repeating shape leads to micro-structuring. Repetition of this process, i.e., microstructure of the microstructure to make a doubly-structure material, leads to a hierarchy of structures. Four possible hierarchical structures are shown in FIG. 53, and are developed for bending where the stresses are highest near the top and bottom faces and decrease towards the center of the section. Thus, the material in the section is most densely arranged near the top and bottom of the section, and less densely arranged near the center of the section.

Analysis

Beam and panel structures with repeating layers of cellular material can be treated as laminated structures (Jones 1999) where each layer is defined by a characteristic cell architecture. This idealization applies to cellular beams and panels with periodic cells that oriented in different directions about the longitudinal axis of the element and/or to hierarchical cellular structures which feature different levels of cellular architectures along the member depth.

Assuming a plate stress condition for each characteristic layer of cellular material, a lamina of cellular material can be described using the equivalent properties obtained with the models proposed by Gibson and Ashby (1988). This is schematically shown in FIGS. 55A and 55B.

The stress-strain relation for the single cellular material layer with respect to the material 1-2-3 coordinate system, assuming the response is at most orthotropic, is thus given by:

$$\begin{Bmatrix} \sigma_{11} \\ \sigma_{22} \\ \tau_{12} \end{Bmatrix} = \begin{bmatrix} Q_{11}^* & Q_{12}^* & Q_{16}^* \\ & Q_{22}^* & Q_{26}^* \\ Symm & & Q_{66}^* \end{bmatrix} \begin{Bmatrix} \varepsilon_{11} \\ \varepsilon_{22} \\ \gamma_{12} \end{Bmatrix} \text{ where} \quad (13)$$

$$Q_{11}^* = \frac{E_1^*}{(1 - v_{12}^* v_{21}^*)} Q_{22}^* = \frac{E_2^*}{(1 - v_{12}^* v_{21}^*)} \quad (14)$$

$$Q_{12}^* = \frac{v_{21}^* E_1^*}{(1 - v_{12}^* v_{21}^*)} Q_{66}^* = G_{12}^*$$

$$v_{21}^* = v_{12}^* \frac{E_2^*}{E_1^*}$$

The structural properties of a hierarchical cellular beam or plate can then be found by adding the individual stiffness of the different characteristic cellular material layers over the depth of the structure. Each layer may have different material properties due to their constituent material or due to the different cellular architecture or cell orientation. In order to be able to add the stiffness of each layer, their properties with respect to a common structural coordinate system (x-y-z) must be determined. This is done by rotating the base material properties given by equation 14 through transformation matrix. Thus, the material response for the layer about any coordinate system $[\overline{Q}^*]$ within the plane is defined by:

$$\begin{Bmatrix} \sigma_{xx} \\ \sigma_{yy} \\ \tau_{xy} \end{Bmatrix} = \begin{bmatrix} \overline{Q}_{11}^* & \overline{Q}_{12}^* & \overline{Q}_{16}^* \\ & \overline{Q}_{22}^* & \overline{Q}_{26}^* \\ Symm & & \overline{Q}_{66}^* \end{bmatrix} \begin{Bmatrix} \varepsilon_{xx} \\ \varepsilon_{yy} \\ \gamma_{xy} \end{Bmatrix} \quad (15)$$

where:

$$[\overline{Q}^*] = [T_2']^T [Q^*][T_2'] \quad (16)$$

$$[T_2'] = \begin{bmatrix} \cos^2\theta & \sin^2\theta & -2\cos\theta\sin\theta \\ \sin^2\theta & \cos^2\theta & 2\cos\theta\sin\theta \\ \cos\theta\sin\theta & -\cos\theta\sin\theta & (\cos^2\theta - \sin^2\theta) \end{bmatrix}. \quad (17)$$

Addition, or integration, of all the layer stiffness over the section depth leads to the section properties of the laminated plate, or the so called [A,B,D] matrix. This process is schematically shown in FIG. 55.

The section properties for hierarchical cellular beams and plates can thus be obtained as described above by considering the different scales of the material continuum, form the microstructural mechanics of the randomly oriented short-fiber reinforced biocomposite to the cellular material arrangement, to the arrangement in hierarchical structures for efficient beams and plates. The analysis method has been integrated into a custom program and will be calibrated with the experimental data. The calibrated analysis process will be used in optimization strategies to determine efficient hierarchical structures for improved efficiency of cellular biocomposite structures.

Prestressing of Hybrid Cellular Biocomposite Plates

Temperature Effects on Hybrid Composite Material Systems

Hybrid material systems have been shown to be very effective in increasing the structural properties of engineered material systems or structural components by judicious placement of different reinforcement types at specific locations. However, in polymer matrix composites, hybrid material systems can lead to undesirable consequences. Among them are the stress concentrations between layers due to different elastic modulus, difficulty in assessing failure modes, and perhaps most importantly, the effects of curing temperatures.

Polymer matrix composites rely on a hardened resin system binding the reinforcement fibers. The thermosetting matrix can harden through an exothermic reaction at room temperature or in controlled heat processes in ovens. This implies that the manufactured sample becomes an integral piece at an elevated temperature. After curing, the sample will face a reduction in temperature to the operational conditions. If the sample is made with materials with different thermal coefficients of expansion, differential temperature induced strains will take place. It should be noted that the differential temperature induced strains might not necessarily be caused by a different material system. The same effects are true for a laminated aligned fiber composite that exhibits different material behavior with respect to adjacent material layers due to different angle orientations of the reinforcement.

The effect of prestressing due to temperature effects was observed in the manufacturing of a cellular plate with green hemp/polyester (10% fiber by weight) and a single strip of carbon fiber fabric at the bottom of the plate (see FIG. 56). The plate featured a uniform void layout as shown in FIG. 24. Due to the different coefficients of thermal expansion of the hemp/polyester and carbon/polyester composites, the plate experienced differential shrinkage due to the cooling process after curing. The sample was thus "curled" as seen in FIG. 56. The shape of the deformed plate is due to the fact that the thermal coefficient of expansion for the biocomposite material is approximately 10 times greater than that for the carbon/polyester composite. Thus, due to the cooling process, the biocomposite material shrank considerably more than the carbon composite.

While the deformed shape of the plate would indicate that the carbon composite is in tension, the opposite is true. The precompression in the carbon composite layer, which is meant to take the tensile stresses in the actual service condition of the plate, means that the strength of the carbon composite has been effectively increased by the precompressive state. This concept, known as prestressing, is commonly used in reinforced concrete structures to increase the tensile carrying capacity of concrete, a brittle material with very low tensile properties. In prestressed concrete the precompressed state is achieved by transferring tensile forces from a steel cable in tension to the concrete by either bond or mechanical anchorage. However, in hybrid polymer matrix composites, a state of prestressing can be introduced through controlled manufacturing and curing processes.

Analysis of Temperature Induced Effects

Figure 57:
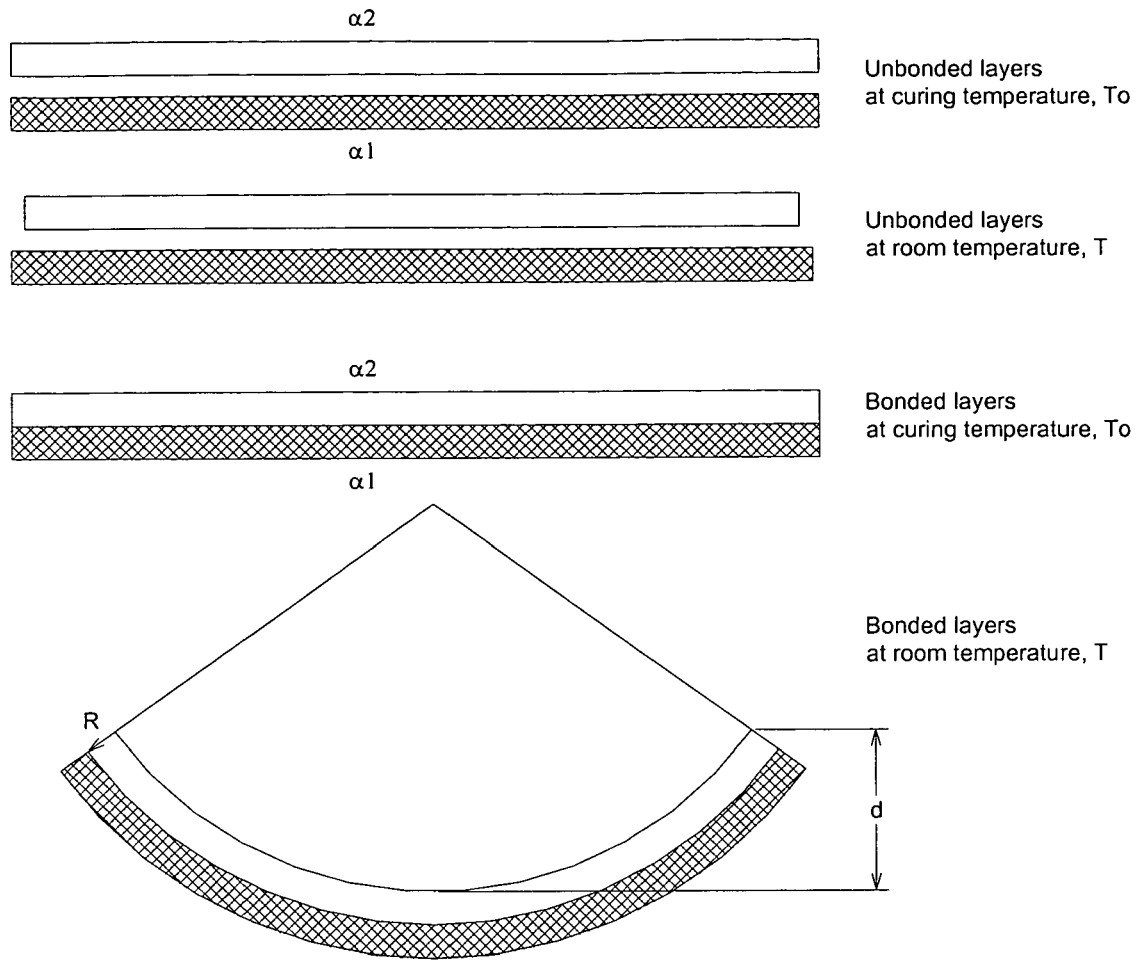
FIG. 57 is an illustration showing temperature deformations in unbonded and bonded materials with $\alpha_2 > \alpha_1$.

When laminates of two different materials that have significantly different coefficients of thermal expansion experience a change in temperature the laminate will deflect and bend at a given radius of curvature as shown in FIG. 57. This situation was encountered in the biocomposite cellular plate that was manufactured with an integral layer of carbon fiber fabric on the bottom of the plate (see FIG. 56).

Figure 1:
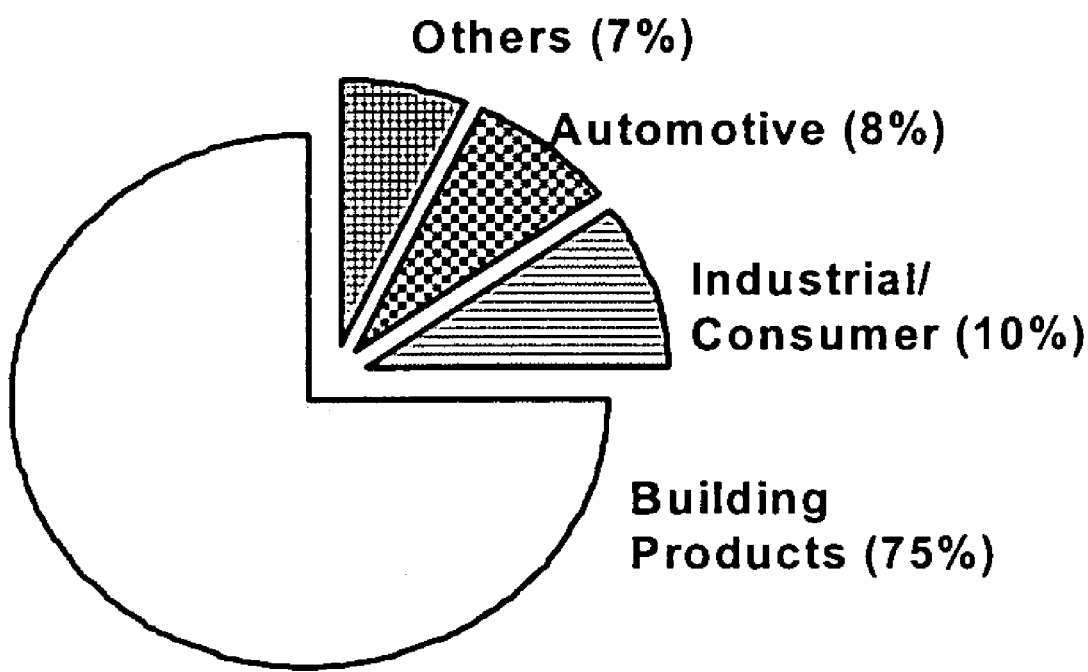
FIG. 1 is a pie chart showing the North America Major End Markets of Natural Fiber Composites.
Figure 2:
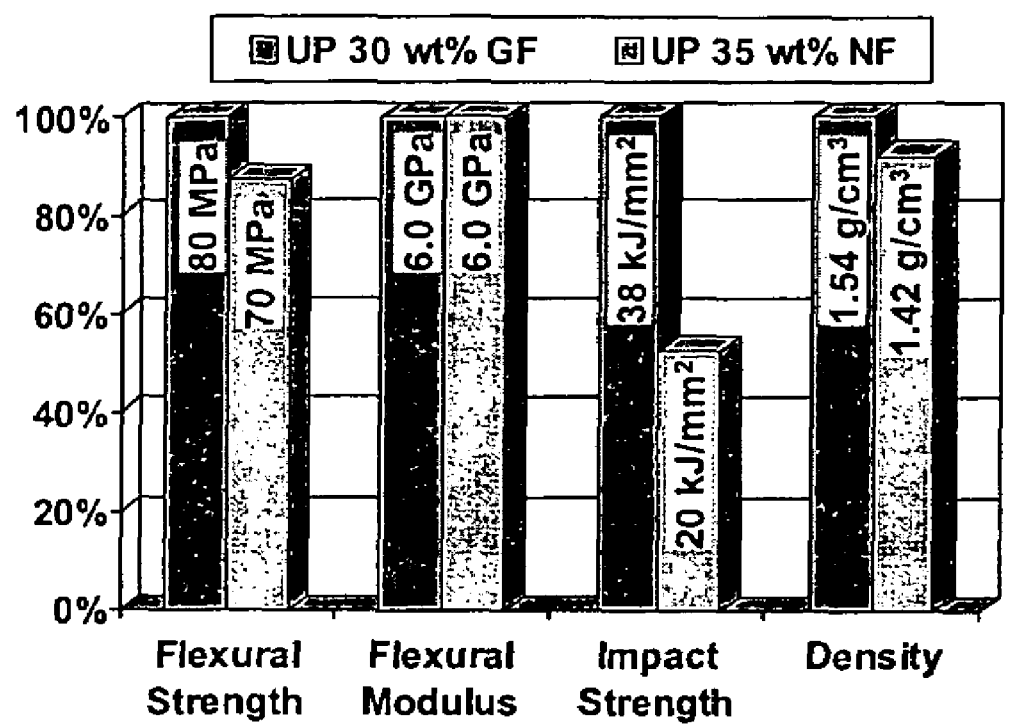
FIG. 2 is a graph showing a comparison of properties of natural fiber (NF) and glass fiber (GF)—unsaturated polyester (UP) composites.

To illustrate this concept, consider the two cases of (1) two unbonded materials and (2) two bonded materials both with materials of different coefficients of thermal expansion as shown in FIG. 1 (where $\alpha_2 > \alpha_1$). For case (1), at curing temperature, $T_o$, the two materials are the same length. When the curing temperature is removed and the two materials cool to room temperature, T, both materials will shrink different amounts. For case (2), at curing temperature, $T_o$, the two materials are the same length. When the bonded materials are cooled to room temperature, T, the top material wants to shrink more than the bottom material, but the two materials are bonded, thus the bonded materials will bend.

The temperature induced curvature and center deformation of a plate can be determined through discrete equations that estimate the principal stresses in the plate that occur due to a nonlinear distribution of strain in the section from a temperature load. This procedure is used for the analysis of nonlinear temperature gradients in a section, which cause nonlinear strain distributions and stress. However, in the case of bonded materials with different coefficients of thermal expansion a nonlinear strain distribution is caused by the different coefficients of thermal expansion in the two materials. The free strains due to temperature cannot occur because the layers are bonded, thus self-equilibrating axial strain and bending curvature occurs in the plate. The resulting axial strain, $\epsilon_o$, and bending curvature, $\phi_o$, are calculated by $$\varepsilon_o = \frac{1}{A}\sum_{i=1}^{n} \alpha_i Ta_i A_i \tag{18}$$

$$\phi_o = \frac{1}{I}\sum_{i=1}^{n}\left[Ta_i \overline{y}_i A_i + \frac{\Delta T_i}{d_i} I_i\right] \tag{19}$$

where,

A=area of the entire cross section
$\alpha_i$=coefficient of thermal expansion of the $i^{th}$ element
$Ta_i$=temperature at the centroid of the $i^{th}$ element
$A_i$=area of the $i^{th}$ element
I=second moment of the area of the entire cross section
$\overline{y}_i$=distance from the centroid of the $i^{th}$ element to the centroid of the entire cross section
$\Delta T_i$=temperature difference from the bottom of to the top of the $i^{th}$ element
$d_i$=depth of the $i^{th}$ element
$I_i$=second moment of the area of the $i^{th}$ element alone The stresses in the plate are calculated using the axial strain and curvature in the plate and the hypothetical free strains by $$\sigma_s = E(\epsilon_0 + \phi_0 y - \alpha T). \tag{20}$$

Once the curvature of the plate is calculated the deflection at the center of the beam can be calculated using geometric relations. From FIG. 57, an expression for the curvature of the plate ($\phi$) can be determined through geometry to be:

$$\phi = \frac{1}{R} = \frac{8d}{L^2 + 4d^2 + 8dt_1}. \tag{21}$$

Making the assumption that the deflection, d, and the thickness, t, are less than 10% of the length of the plate the terms $8dt_1$ and $4d^2$ may be neglected and the expression reduces to $$d = \frac{L^2}{8R}. \tag{22}$$

The axial shrinkage is also assumed to be small and thus neglected in the calculation of the deflection of the center of the beam.

Prestressing Effect on Hybrid Cellular Biocomposite Plates

Two analytical described above was used to calculate the curvature and the deflection of the biocomposite cellular plate with a bottom layer of carbon fiber fabric (FIG. 56). The measured dimensions of the manufactured biocomposite cellular plate with a bottom layer of carbon fiber fabric were used. The elastic modulus and coefficient of thermal expansion of each material were assumed. For the carbon fabric, the elastic modulus was taken as 77.3 GPa, assuming 30% fiber volume fraction, and the coefficient of thermal expansion was taken as $7.238 \times 10^{-6}/°$ C. For the biocomposite material, the elastic modulus was taken as 5 GPa as calculated from three-point bending test results, and the coefficient of thermal expansion was taken as $50 \times 10^{-6}/°$ C. The assumed value for the coefficient of thermal expansion of the biocomposite material was based on other hemp fiber composites properties found on the company web page of TeelGRT-Natural fiber composites and products (http://www.teel-grt.com/technicalinfo.htm). The change in temperature was taken as $-120°$ C., which is the change in temperature from final curing conditions (150° C.) to room temperature (30° C.).

The properties and results using the discrete equations to calculate the axial strain, curvature and deflection of the middle of the beam are shown in Table 24. The calculated deflection agrees with the measured deflection of the plate.

TABLE 24

Properties for temperature deflection calculations using discrete equations

| PROPERTY | SECTION 1 Bio | SECTION 2 Carbon* | TOTAL* |
|---|---|---|---|
| $E_i$ (GPa) | 5.0 | 77.3 | — |
| $E_i$ (ksi) | 725 | 11,209 | — |
| $\alpha_i$ (1/° C.) | 5.00E−05 | 7.24E−06 | — |
| $d_i$ (in) | 0.6235 | 0.0165 | 0.6400 |
| $A_i$ (in$^2$) | 1.6104 | 10.2036 | 11.8140 |
| $I_{bar\ i}$ (in$^4$) | 6.86E−02 | 2.31E−05 | 2.49E−01 |
| $y_{bar\ i}$ (in) | −0.3305 | 0.02135 | 0.6104 |
| $Ta_i$ (° C.) | −120 | −120 | — |
| $\Delta T_i$ (° C.) | 0 | 0 | — |

Figure 58:
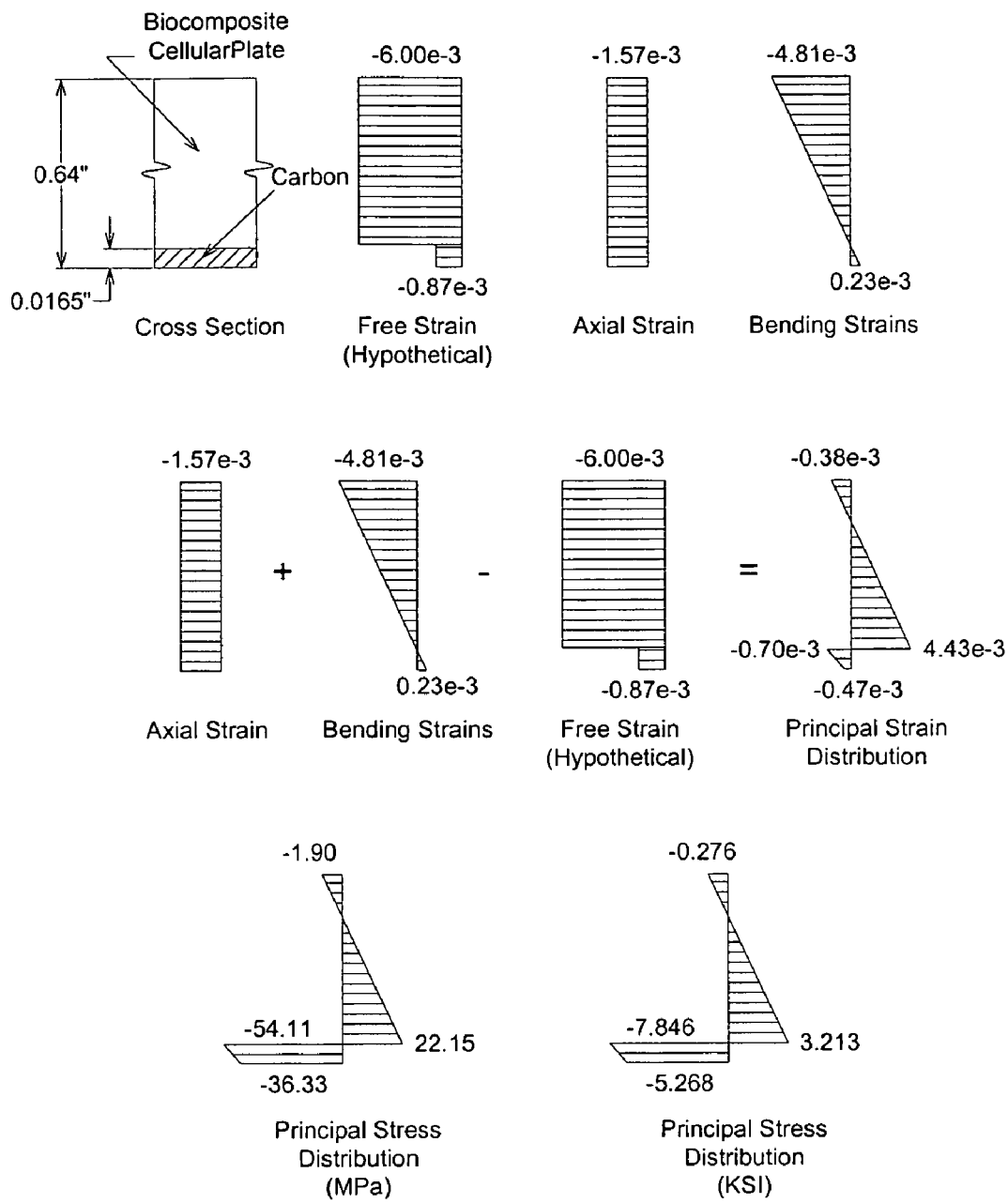
FIG. 58 are illustrations showing strain and stress distributions due to temperature effects.

*Carbon transformed to biocomposite for calculations
L = 12.00 in
$\epsilon_o$ = −0.00157 in/in
$\Phi_o$ = 0.00788 1/in
d = 0.1427 in
$d_{measured}$ = 0.1754 in Based on the free strains in the section if unbonded and the calculated axial strain and bending curvature of the bonded section, the strain and stress distributions in the section were calculated as shown in FIG. 58. The resulting stress distribution shows the biocomposite material is in positive bending due to temperature effects, while the carbon fibers are in compression. This compression in the carbon fibers will allow a larger tensile strain capacity when subjected to positive bending.

While the analysis results may be improved with more accurate values for the elastic modulus and coefficient of thermal expansion for the biocomposite and carbon fiber materials, the results are in close agreement with the measured center plate deformation thus corroborating the applicability of the analysis procedure.

The prestressing effect on the hybrid biocomposite cellular plate with a bottom carbon layer was also assessed by "correcting" the force-strain response of the tested plate sample. The measured displacement values at midspan from the three-point bending test were changed to extreme strains by simple bending theory. The force vs. bottom strain plots at midspan for the sample with a single bottom carbon layer, i.e. CP1-C is shown in FIG. 59A. The figure shows the measured strain in the bottom carbon layer as well as the "corrected," or true strain in the material. It can be seen that due to the precompressing effect, the material can sustain a larger strain value to failure. Thus, the measured failure strain in the carbon layer was 1.87% while the actual strain is estimated at 1.82%.

The same effect was observed for sample CP2-C with top and bottom layers of unidirectional carbon fibers. The force-strain response at midspan is given in FIG. 59B. The residual strains for this sample, although not explicitly reported here, were determined. It can be seen that the prestressing effect is greater (greater shift in force-strain response) than for the single layer sample. The measured and corrected strains in the bottom carbon layer (tension) were 1.82% and 1.66%. Similarly, the measured and corrected strains in the top layer (compression) were 0.595% and 0.431%, respectively. The discontinuity in the curve is due to failure (buckling) of the top fiber layer, which leads to a shift of the bending neutral axis towards the bottom layer.

Full-Scale Extrapolation

Figure 60:
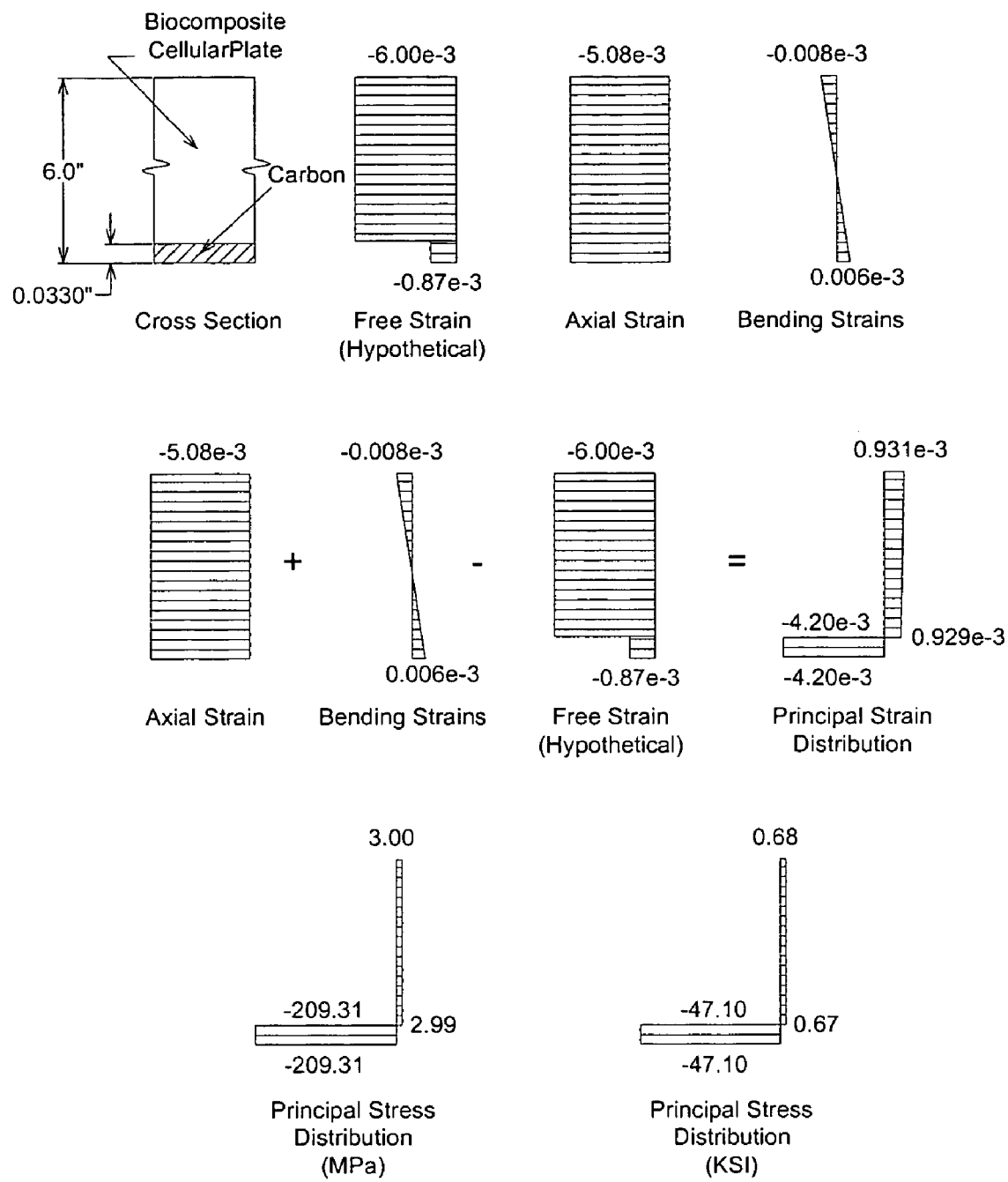
FIG. 60 are illustrations showing the strain and stress distributions due to temperature effects for 6"×48" plate.

The temperature effects of a full-scale cellular plate with integrated carbon fiber fabric were determined and compared with the effects on the small lab scale cellular plate. The full size cellular plate was taken as a 6" deep by 48" wide plate with two layers of carbon fabric on the bottom, assumed to have a total thickness of 0.033". The relative density of the full-scale plate was taken to be the same as the laboratory-scale plate, that is ρ=0.588. The same material properties were used for both plates. Calculations and results for the 0.5"×4" laboratory-scale cellular plate are shown in FIG. 58 and the calculations and results for the 6"×48" cellular plate are shown in Table 25 and FIG. 60.

The results shown the curvature for the full-scale plate, 2.0e-6 1/in, is very small compared to the curvature in the laboratory-scale plate, 788e-6 1/in. However, the axial strain in the full-scale plate, 5.08e-3 in/in, is large compared to the lab scale plate, 1.57e-3 in/in. Because of the large axial strain in the full-scale plate, the stresses are much higher compared to those in the lab scale plate. Moreover, in the full-scale plate the strain in the carbon fibers is 41% of its failure strain, while in the lab scale plate the strain in the carbon fibers is only 0.7% of its failure strain.

The results indicate that the concept of prestressing through controlled manufacturing and temperature loading will be even more effective in full-size components. The locked-in stresses due to temperature effects in the full-scale plate will enhance the strength of the plate by forcing the carbon fibers to go through a larger strain before failure of the fibers. Because of this, the failure mode may move to crushing of the biocomposite material at the top of the plate. Additionally, the small curvature in the full-scale plate will not cause large deflections in the plate as seen in the laboratory-scale sample.

TABLE 25

Properties for temperature deflection calculations for 6" × 48" plate

| PROPERTY | SECTION 1 Bio | SECTION 2 Carbon* | TOTAL* |
|---|---|---|---|
| $E_i$ (GPa) | 5.0 | 77.3 | — |
| $E_i$ (ksi) | 725 | 11209 | — |
| $\alpha_i$ (1/° C.) | 5.00E−05 | 7.24E−06 | — |
| $d_i$ (in) | 5.9690 | 0.0330 | 6.0020 |
| $A_i$ (in$^2$) | 111.565 | 24.489 | 136.0532 |
| $I_{bar\ i}$ (in$^4$) | 6.29E+02 | 2.22E−03 | 8.29E+02 |
| $y_{bar\ i}$ (in) | −0.6767 | 2.4608 | 3.5247 |
| $Ta_i$ (° C.) | −120 | −120 | — |
| $\Delta T_i$ (° C.) | 0 | 0 | — |

Figure 61:
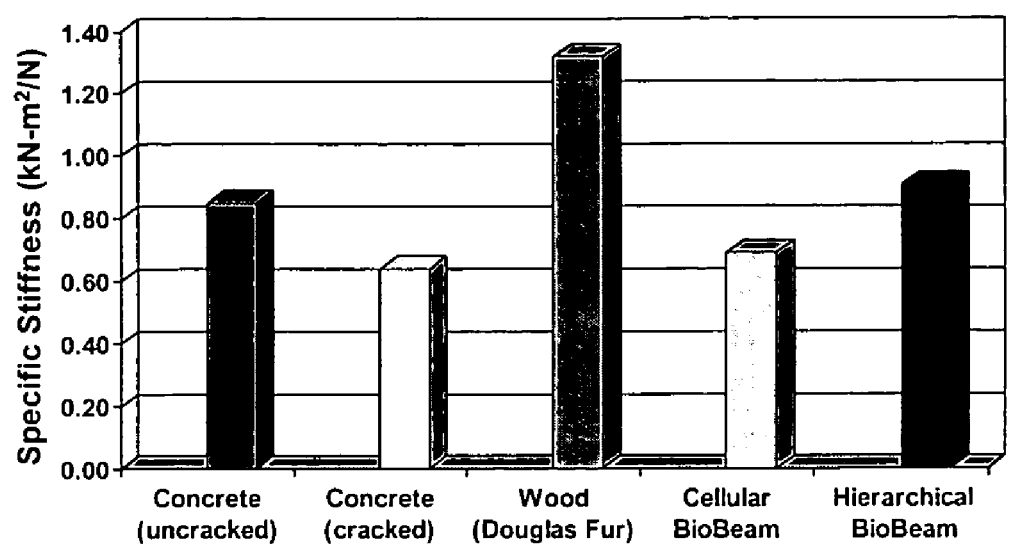
FIG. 61 is a graph showing the performance of pilot cellular biocomposite beams.

*Carbon transformed to properties of the biocomposite
L = 48.00 in
$\epsilon$ = −0.00508 in/in
$\Phi_o$ = 0.000002 1/in
d = 0.0007 in Performance and Feasibility Studies The results from the cellular biocomposite flexural tests were compared with beams of equal size made of conventional construction materials (FIG. 61). The conventional material used for the beam comparison was a Douglas Fur (wood) beam, and a solid reinforced concrete beam (solid RC beam). The RC beam was analyzed as cracked, however RC beams typical crack under low loadings, loosing a large amount of their stiffness. A cellular biocomposite beam (cellular bio-beam) with a relative density of 0.56, and a hierarchical bio-beam with a relative density of 0.57 with green hemp fibers, and a polyester matrix, with a fiber weight fraction of 30% was used for the comparison. All beams were taken as 25 mm by 50 mm by 267 mm, and analyzed in three-point bending. The bio-beams compared very favorably. In addition, it should be noted that the comparison shown does not illustrate the efficiency of the material use as a function of its density.

Figure 62:
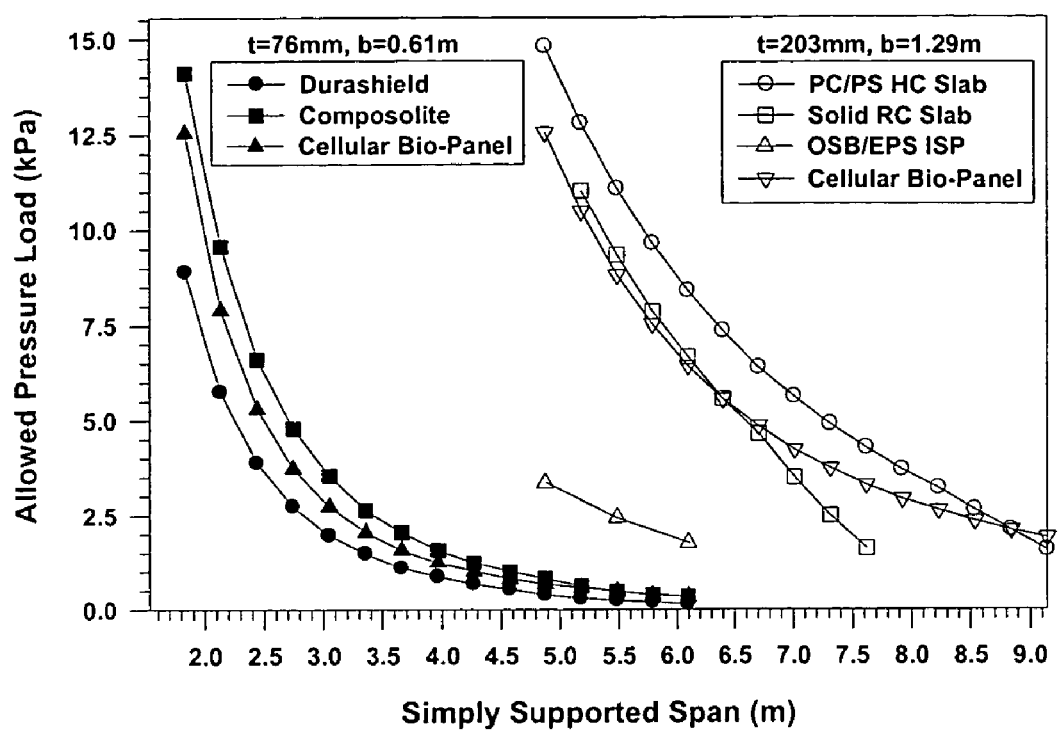
FIG. 62 is a graph showing the performance of full scale cellular biopanel, versus conventional flooring systems.

The results from the experimental studies on the biocomposite plates were used to extrapolate the performance of full-scale structural components, and compare with conventional flooring systems used in the construction industry. FIG. 63 shows the allowable pressure versus the simply supported span length for a panel system. The allowable pressure is the loading (in pressure) the component can withstand while maintaining an allowable deflection. The plot in FIG. 62 compares panels grouped into two sizes. The first set of curves is for a panel size typically used in residential construction, and the second set of curves is for a panel size typically used in residential and commercial construction. A 76×610 mm panel is compared with commercial fiberglass sandwich panel systems (Durashield and Composolite [Strongwell 2003]). A 203 mm×1.29 m panel is compared with a precast prestressed hollow core concrete slab (PC/PS HC slab), a solid reinforced concrete slab (solid RC slab), and an oriented wood strand board ISP (insulated structural panel [Insulspan 2003]). A cellular biocomposite plate (cellular bio-panel) with green hemp fibers, and a polyester matrix, with a fiber weight fraction of 30%, and relative density of 0.56 was used for comparison in both panel size groups.

A simplified view of the results for the 76×610 panel for a 4.57 m span is shown in FIG. 63. The results in FIG. 62 and FIG. 63 show that the cellular biocomposite panels compete well with all of the conventional panels for both panel sizes and that biocomposite panels can compete with, and even outperform, conventional flooring system. It should be noted that the above comparison is for the all-biocomposite panel systems, thus the performance of the hybrid and hierarchical panels is expected to be even better.

The polymers can be thermoset or thermoplastic. The polymers can be for instance, thermosets such as epoxy, polyurethane, polyurea, polysiloxane and alkyds or thermoplastics such as polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactones, polylactides, polyimides, and polyolefins. The unsaturated polyesters and preferred.

It is intended that the foregoing description be only illustrative of the present invention and that the present invention be limited only by the hereinafter appended claims.

We claim:

1. A hybrid composite panel comprising cellular skeletal structure having multiple spaced apart tubular openings providing channels through the composite between spaced apart surfaces of the panel which are defined by a cured matrix comprising a thermoset polymer, and nanoscale clay platelets or a layer of the nano clay platelets dispersed in the matrix of the thermoset polymer wherein there are a plurality of fibers dispersed in the matrix of the thermoset polymer which is greater than 80% by weight of the fibers which are natural, and wherein the panel is adapted for load bearing.

2. The composite panel of claim 1 wherein the natural fiber is selected from the group consisting of hemp, flax, jute, sisal and combinations thereof.

3. The composite panel of claim 1 wherein the fiber in addition comprises carbon and E-glass fiber.

4. The composite panel of claim 1 wherein the polymer comprises a thermoset polyester polymer.

5. The composite panel of claim 1 wherein the skeletal structure has a periodic, uniform arrangement of the tubular openings.

6. The composite panel of claim 1 wherein the skeletal structure has a hierarchy of sets of the tubular openings.

7. The composite panel of claim 1 wherein a geometry of the tubular openings is circular, triangular, trapezoidal, or hexagonal in cross-section.

8. The composite panel of claim 1 as a beam wherein at least one dimension is much larger than other dimensions.

9. The composite panel of claim 1 as a plate or panel.

10. The composite panel of claim 1 as a shell which is curved.

11. The composite panel of claim 8 as the skeletal structure alone.

12. The composite panel of claim 8 wherein the composite comprises a sandwich of with at least one skin on one of the surfaces of the composite panel without covering the openings.

13. The composite of claim 12 wherein the sandwich comprises the two of the skins on opposite of the surfaces of the panel.

14. The composite of claim 12 wherein the panel and the skin are integrally connected by the cured matrix.

15. The composite of claim 12 wherein the skin and the panel each have a different structure.

16. The composite panel of claim 12 wherein the skin on the panel comprises an additional thermoset polymer with an additional natural or synthetic fiber mat.

17. The composite panel of claim 12 wherein the skin on the panel comprises an additional thermoset polymer and an additional natural or synthetic fiber material as a mat and wherein the additional thermoset polymer in the skin is nano-clay reinforced.

18. The composite panel of claim 16 wherein the additional natural fiber is selected from the group consisting of hemp, flax, jute, and sisal fibers and combinations thereof.

19. The composite panel of claim 17 wherein the additional synthetic fiber comprises carbon and E-glass.

20. The composite panel of claim 4 wherein the polymer matrix comprises a polyester cured with a peroxide to provide the thermoset polymer.

* * * * *